US012650629B2

(12) United States Patent
Luan et al.

(10) Patent No.: US 12,650,629 B2
(45) Date of Patent: Jun. 9, 2026

(54) APPARATUS AND METHOD FOR INTENSITY MODULATION IN A PHOTONIC COMPUTING SYSTEM BASED ON INTERFEROMETRIC COUPLING

(71) Applicant: HUAWEI TECHNOLOGIES CANADA CO., LTD., Kanata (CA)

(72) Inventors: Enxiao Luan, Kanata (CA); Armaghan Eshaghi, Kanata (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 387 days.

(21) Appl. No.: 18/212,515

(22) Filed: Jun. 21, 2023

(65) Prior Publication Data

US 2023/0333441 A1       Oct. 19, 2023

Related U.S. Application Data

(63) Continuation of application No. PCT/CA2021/050075, filed on Jan. 25, 2021.

(51) Int. Cl.
| | |
|---|---|
| *G02F 1/225* | (2006.01) |
| *G02F 1/01* | (2006.01) |
| *G02F 1/015* | (2006.01) |

(52) U.S. Cl.
CPC .......... *G02F 1/2257* (2013.01); *G02F 1/0147* (2013.01); *G02F 1/0152* (2021.01); *G02F 1/0154* (2021.01); *G02F 2203/15* (2013.01)

(58) Field of Classification Search
CPC .............................. G02F 1/0147; G02F 1/2257
See application file for complete search history.

(56) References Cited

U.S. PATENT DOCUMENTS

| | | | | |
|---|---|---|---|---|
| 9,291,837 | B1 * | 3/2016 | Yap | G02F 1/21 |
| 2010/0209038 | A1 * | 8/2010 | Popovic | G02F 1/3132 385/27 |
| 2016/0356959 | A1 | 12/2016 | Jayatilleka et al. | |
| 2018/0335570 | A1 * | 11/2018 | Fanto | G02F 1/3132 |
| 2020/0274631 | A1 | 8/2020 | Melloni et al. | |
| 2020/0401012 | A1 * | 12/2020 | Xu | G02F 1/353 |
| 2023/0333441 | A1 * | 10/2023 | Luan | G02F 1/0305 |
| 2025/0258335 | A1 * | 8/2025 | Cho | G02F 1/2257 |

FOREIGN PATENT DOCUMENTS

| | | | | |
|---|---|---|---|---|
| EP | 3703287 A1 | 9/2020 | | |
| WO | WO-2018172183 A9 * | 11/2018 | ......... | H04B 10/5053 |

* cited by examiner

*Primary Examiner* — Rhonda S Peace

(57) ABSTRACT

A waveguide is coupled at both ends to a microring (MRR) modulator in order to form a Mach-Zehnder interferometer out of the resulting unit. The coupled waveguide can be modulated independently from the MRR modulator itself with either an in-resonance photoconductive heater or a geometrically suitable PN junction. During modulation with an applied voltage to the coupler, an independent modulation can be applied to the MRR in order to compensate for wavelength shifting. Ideal lengths for the coupler are identified, as well as a spiral configuration to reduce the coupler's footprint on a photonic integrated circuit. The resulting device has reduced cross-talk between channels of a cascaded MRR system. A second coupler can be coupled to each MRR symmetrically so as to reduce insertion losses, allowing for an increased weight range at the drop and through ports.

18 Claims, 49 Drawing Sheets

(Prior Art)

(Prior Art)

(Prior Art)

530

APPARATUS AND METHOD FOR INTENSITY MODULATION IN A PHOTONIC COMPUTING SYSTEM BASED ON INTERFEROMETRIC COUPLING

CROSS REFERENCE TO RELATED APPLICATION

This application is a continuation of International Application No. PCT/CA2021/050075 filed Jan. 25, 2021 entitled "APPARATUS AND METHOD FOR INTENSITY MODULATION IN A PHOTONIC COMPUTING SYSTEM BASED ON INTERFEROMETRIC COUPLING" the contents of which are incorporated herein by reference.

BACKGROUND

The von Neumann computing architecture has been widely used in personal computing, as its central processor and memory are very suitable for running sequential, procedure-based programs. However, for computational models that are distributed, massively parallel, and adaptive, the von Neumann architecture can be inefficient. Typically, these computational models include neural networks used in machine learning (ML) for artificial intelligence (AI) and neuromorphic computing applications. To address the shortcomings of today's computer architecture in implementing neural networks, by aiming for higher computing speed and lower power consumption, growing efforts from both the academia and the industry have focused on the development of specifically tailored architectures.

Photonic solutions are regarded as a mature industrial reality with regards to high speed, high throughput data communication and switching infrastructures. Over the years, photonic solutions for optical communication and processing have evolved along the same lines, namely aiming at increasing the transmission speed and the energy efficiency. For this reason, optical implementations of neural networks are being investigated in order to exploit large parallelism, through degrees of freedom such as wavelength, polarization, and mode, and the high connectivity achievable with optics.

Large-scale analog optical processors have so far not been widely adopted, in part, because they cannot be integrated to conventional structures. There are still issues that limit the implementation of integrated silicon photonic modulators for large-scale artificial neural network (ANN) systems, including optical cross-talk between different wavelength channels, and the total number of achievable wavelength channel limitation, within one free spectral range (FSR).

For example, tunable microring resonators (MRRs) are proposed for use as photonic modulators. Modulation is conventionally achieved by modulating the refractive index of the MRR, which results in a resonant wavelength drifting. However, when multiple MRRs are used in the same photonic circuit and operated simultaneously, this wavelength shifting can introduce optical cross-talk effects among adjacent resonant peaks, which impact circuit scalability.

Therefore, there is a need for photonic modulation devices and associated methods that obviates or mitigates one or more limitations of the prior art.

SUMMARY

An object of the present invention is to provide a photonic device and associated methods. The photonic device can be used to controllably modulate an optical signal. The photonic device includes a ring waveguide and operates substantially as a controllable MRR. According to some embodiments, the photonic device is balanced, for example in order to limit insertion losses and provide for a structurally and functionally symmetric device. In such embodiments, a first waveguide is operatively coupled to a ring waveguide at a first two coupling sites, and a second waveguide is operatively coupled to the same ring waveguide at a second two coupling sites. The photonic device may be structurally, functionally, or both structurally and functionally symmetric with respect to the first and second waveguides. According to some embodiments, the photonic device is unbalanced, but includes further properties or is coupled to a controller operating in a particular manner. An unbalanced photonic device includes only a first waveguide is operatively coupled to a ring waveguide at two coupling sites, while omitting the second waveguide. In each case the photonic device includes two, three or more control elements operatively coupled to two or more of the waveguides, such as the first waveguide, second waveguide, and ring waveguide. The control elements may be thermal-based or carrier injection-based control elements configured to adjust optical signal propagation characteristics, with respect to frequency, of the photonic device. Control elements can be referred to as controllable tuners or index modulation elements. Control elements are responsive to electronic control signals (e.g. adjustable input voltage or current levels) to adjust an optical characteristic of a waveguide to which it is coupled, for example via temperature adjustment, adjustment to carrier density, or adjustment to another physical characteristic which affects the waveguide's optical properties, such as refractive index.

According to some embodiments, the photonic device, either balanced or unbalanced, includes a first waveguide (and a second waveguide, in the balanced device) which is characterized as follows. The waveguide has two coupling sites as mentioned above, which provide optical coupling to the ring waveguide. The waveguide further has a middle section which extends between these two coupling sites to the ring waveguide, such that the middle section is further away from the ring waveguide than the two coupling sites. Furthermore, the middle section is longer, in length, when compared to prior art implementations. This increased length allows for a long portion of the waveguide to be modulated by a control element. This in turn can allow for an improved modulation efficiency for the photonic device to change the coupling strength. The length can be increased while maintaining a limited footprint by appropriately shaping the middle section. For example, the middle section can have a spiral shape, a meandering shape, etc. The middle section can be shaped as an approximately plane filling curve, or a curve with a length to area ratio of at least a given minimum value which depends on device requirements and spatial requirements. The middle section can achieve the limited footprint by having at least two opposing bends.

According to some embodiments, the photonic device, either balanced or unbalanced, includes a controller which is configured to operate the photonic device by adjusting a coupled power, extinction ratio, or related characteristic, of the photonic device, while maintaining a substantially constant resonant wavelength of the photonic device. The resonant wavelength can be maintained to within one percent, a fraction of a percent, or several percent, for example. This can be performed by operating two control elements in a complementary manner, where one of the control elements is coupled to the first (or second) waveguide and another of the control elements is coupled to the ring waveguide. In more detail, each of the control elements, when adjusted, tends to change the resonant wavelength of the photonic device, and the control elements are operated so that a decrease in resonant wavelength caused by controlling one of the control elements is partially or fully cancelled out by an increase in resonant wavelength caused by controlling the other one of the control elements. Each of the control elements affects the photonic device differently, so that the combined control has an effect on the operation of the photonic device. For example, the extinction ratio of the photonic device can be adjusted in this manner while maintaining the resonant wavelength. This means of control can be advantageously implemented in systems comprising multiple such photonic devices, for example connected in series.

According to an embodiment of the present invention, there is provided a photonic device, also referred to as an MRR-based modulator. The device includes a ring waveguide, also referred to as an MRR part of the device. The device includes a first waveguide coupled to the ring waveguide and a second waveguide coupled to the ring waveguide. The first waveguide is coupled to the ring waveguide at a first site and a second site. The first waveguide has a first section extending from the first site; a second section extending from the second site; and a middle section located between the first section and the second section. The first and second sections can end at ports of the photonic device. The middle section extends between the first site and the second site. The middle section is further from the ring waveguide than the first site and the second site (e.g. bowed outward, and potentially spiral-shaped or otherwise curved). Similarly, the second waveguide is coupled at to the ring waveguide at a third site and a fourth site. The second waveguide has a third section extending from the third site; a fourth section extending from the fourth site; and a second middle section located between the third section and the fourth section and extending between the third site and the fourth site. The second middle section is further from the ring waveguide than the third site and the fourth site. The first and second waveguides can be substantially symmetric. The device also includes a first control element operatively coupled to the middle section, a second control element operatively coupled to the second middle section, and a further control element operatively coupled to the ring waveguide. The control elements may be PN junction based or IRPH-based index modulation elements. The control elements can be operated in a complementary manner to adjust an extinction ratio of the photonic device (or otherwise adjust an intensity variation in the photonic device transfer function), while maintaining a resonant wavelength of the photonic device at a substantially constant value.

In various embodiments, the middle section and the first control element interface along an extended portion of the middle section having a length. The length is configured to provide for a coupling efficiency, of the first control element, which is sufficient to control an amount of optical power coupled from the first waveguide to the ring waveguide between a minimum value and a maximum value, the minimum value being substantially zero and the maximum value being substantially equal to all of optical power input to the photonic device. In some cases the length can be several times (e.g. 20 times) the circumference of the ring waveguide. The middle section may be shaped to have a compact footprint at least in part by incorporating at least two opposing bends.

According to an embodiment of the present invention, there is provided a photonic device having a ring waveguide and a first waveguide coupled to the ring waveguide at a first site and a second site, for example as described above. The second waveguide may be, but is not necessarily, present. If it is present, the second waveguide may be configured symmetrically to the first waveguide. The photonic device includes a first section extending from the first site. The photonic device includes a second section extending from the second site. The photonic device includes a middle section located between the first section and the second section and extending between the first site and the second site, the middle section being further from the ring waveguide than the first site and the second site. The photonic device includes a first control element operatively coupled to the middle section, and a further control element operatively coupled to the ring waveguide. The middle section and the first control element interface along an extended portion of the middle section having a length. The length is configured to provide for a coupling efficiency, of the first control element, which is sufficient to control an amount of optical power coupled from the first waveguide to the ring waveguide between a minimum value and a maximum value, the minimum value being substantially zero and the maximum value being substantially equal to all of optical power input to the photonic device.

According to an embodiment of the present invention, there is provided a photonic device having a ring waveguide and a first waveguide coupled to the ring waveguide at a first site and a second site, for example as described above. Again, the second waveguide may be, but is not necessarily, present. If it is present, the second waveguide may be configured symmetrically to the first waveguide. As above, the photonic device includes a first section extending from the first site, a second section extending from the second site, and a middle section located between the first section and the second section and extending between the first site and the second site. As above, the middle section is further from the ring waveguide than the first site and the second site. Also as above, the device includes a first control element operatively coupled to the middle section, and a further control element operatively coupled to the ring waveguide. In the present embodiment, the device includes a controller configured to operate the first control element and the further control element in a complementary manner to adjust an extinction ratio applied by the photonic device at a resonant wavelength of the photonic device. The extinction ratio is between an input to the first waveguide and an output of the first waveguide, while maintaining the resonant wavelength. In some embodiments, the first control element is operated to adjust a coupling strength between the first waveguide and the ring waveguide. The adjusting of coupling strength tends to change the resonant wavelength and wherein the further control element is operated to counteract said change in the resonant wavelength.

In some embodiments, the device includes a second waveguide, and also a second control element operatively coupled to the second middle section. In such embodiments, the controller is further configured to operate the second control element and the further control element or another further control element in a complementary manner to adjust a second extinction ratio applied by the photonic device at the resonant wavelength of the photonic device. The second extinction ratio is between an input to the second waveguide and an output of the second waveguide, while maintaining the resonant wavelength.

Embodiments of the present invention provide for a method of controlling a photonic device. The photonic device is as described above, and the method comprises operations which correspond to operations of the controller as described above.

Embodiments of the present invention provide for a system comprising multiple photonic devices as described above, for example connected at least in part in series or cascade. Such a system can be integrated into a photonic neural network or other photonic computation device.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

Further features and advantages of the present invention will become apparent from the following detailed description, taken in combination with the appended drawings, in which:

FIG. 10aa is another view of an interferometric coupling-based MRR modulator having two coupler arms, according to an embodiment.

It will be noted that throughout the appended drawings, like features are identified by like reference numerals.

DETAILED DESCRIPTION

Silicon photonics is an emerging technology that can be used to build large-scale photonic integrated circuits (PICs) into a single package. These silicon PICs can be used for multiple applications, and most of them can be manufactured with mature fabrication facilities, including complementary metal oxide semiconductor (CMOS) foundries, which can be cost effective with mass production. The transmission of optical signals can be modulated through tunable waveguide elements such as microring resonators (MRR), through carrier density tuning, by adding either a PN-doping region (a junction between a positively-doped material and a negatively-doped material) in the waveguide core, or alternatively by thermal tuning, realized by adding a metal heater near (e.g. on top of) the waveguide. By biasing an intensity modulator with an AC signal, the transmitted output signal of a waveguide element can be utilized for data communication.

Figure 1A:
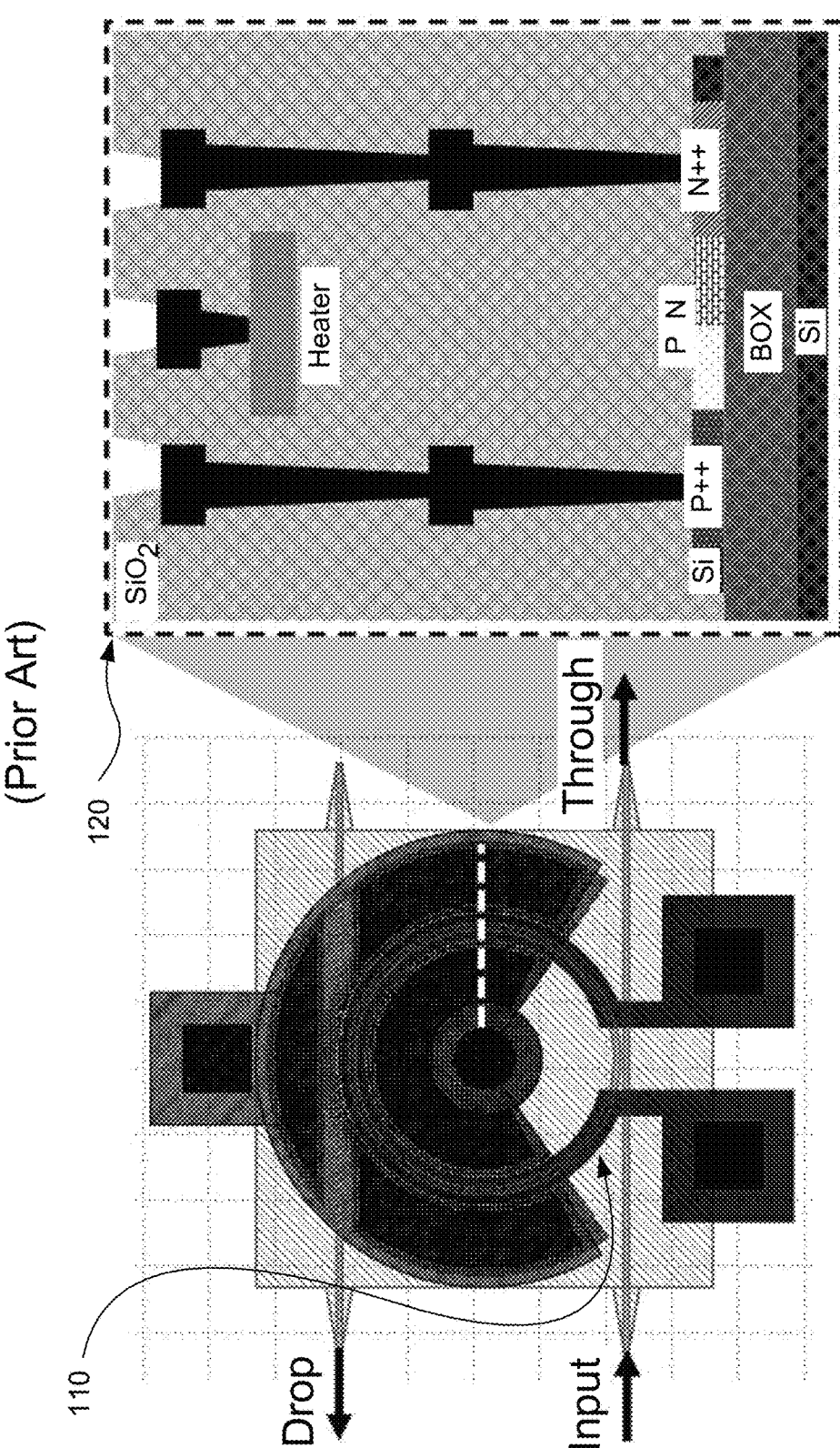
FIG. 1a shows a microring resonator (MRR) modulator with carrier density tuning and thermal tuning, according to prior art.

FIG. 1a shows a MRR modulator 110 in which the refractive index can be changed with carrier density tuning and thermal tuning. The cross-section image 120 shows fabrication details of the modulator, both the PN junction doped in the waveguide and the metal heater can be applied for optical signal modulation. One tuning technology, out of both the carrier density control element and the thermal control element, may be sufficient.

Figure 1B:
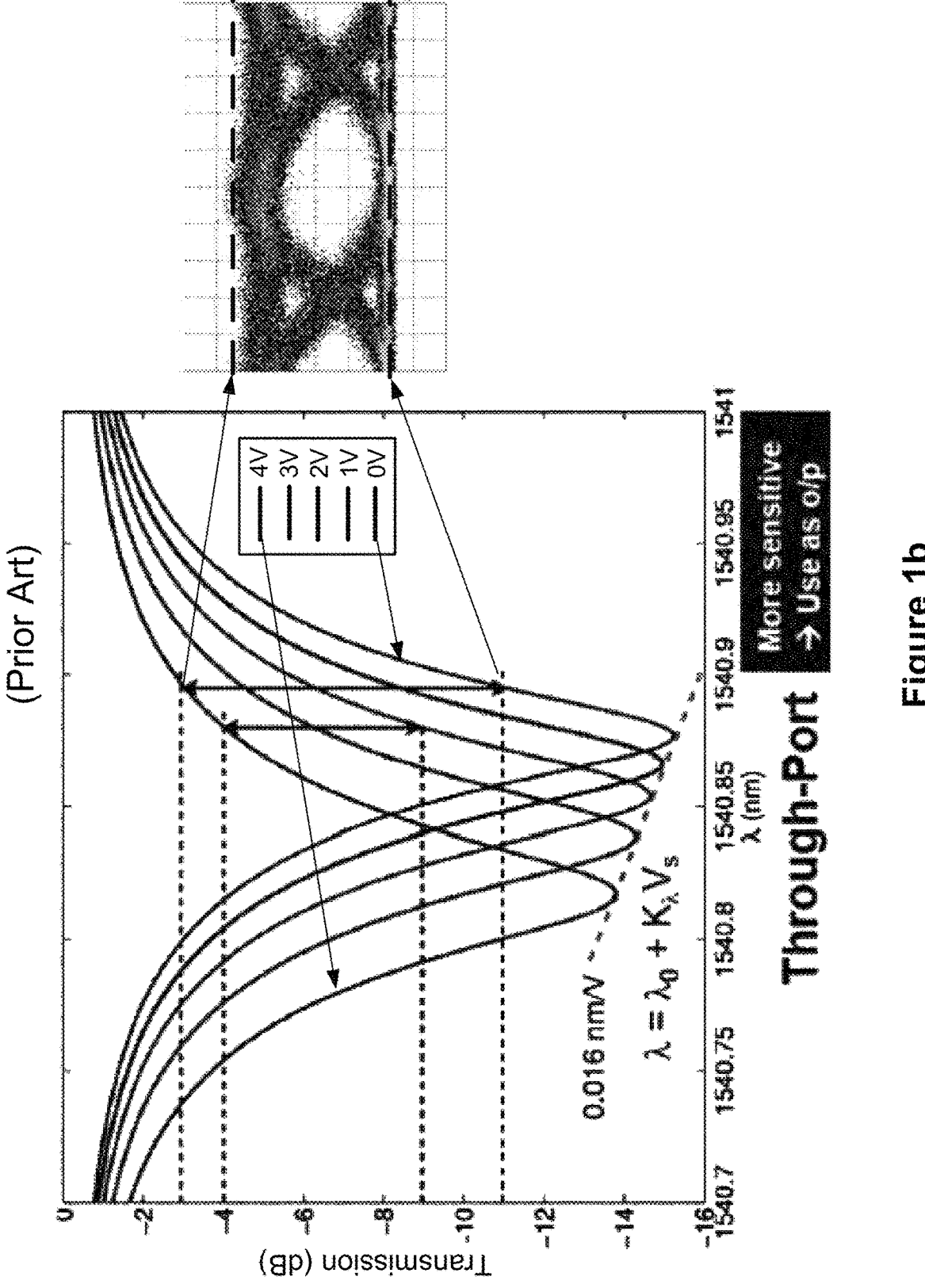
FIG. 1b is a set of transmission spectra for a MRR modulator tuned with voltages from 0V to 4V, according to prior art.

FIG. 1b is a set of transmission spectra for a MRR modulator tuned with voltages from 0V to 4V. Notably, in a typical (e.g. prior art) system, as the voltage applied to the control element is adjusted, the resonant wavelength of the MRR shifted.

Neuromorphic computing can be implemented using a "broadcast-and-weight" architecture. This architecture is usable for implementing neuromorphic processors to PICs using MRR modulators, which in turn is usable for implementing generalized fully programmable network models. In this approach, the output of each neuron is assigned a unique wavelength carrier, which is wavelength division multiplexed (WDM) and broadcasted. An input WDM signal is first weighted by a set of continuous-valued filters acting as reconfigurable photonic weight banks and the outputs of the weight banks are then summed by total power monitoring. The architecture can be implemented using a bank of tunable add-drop MRR modulators that recreate on-chip synaptic weights and emulate biological neurons. By modulating the refractive index (RI) of the waveguide core in each modulator, the transmission intensity at their drop and through ports will change accordingly. This changes the weight, i.e. the difference in intensity between the input and output of a MRR intensity ($I_{Drop}-I_{Thru}$), individually in the weight bank array.

Figure 2A:
FIG. 2a illustrates the "broadcast-and-weight" configuration, with a MRR modulator as a weight bank, a balanced photodetector for output summation, and another MRR modulator operating as part of a non-linear activation function, according to prior art.
Figure 2A:
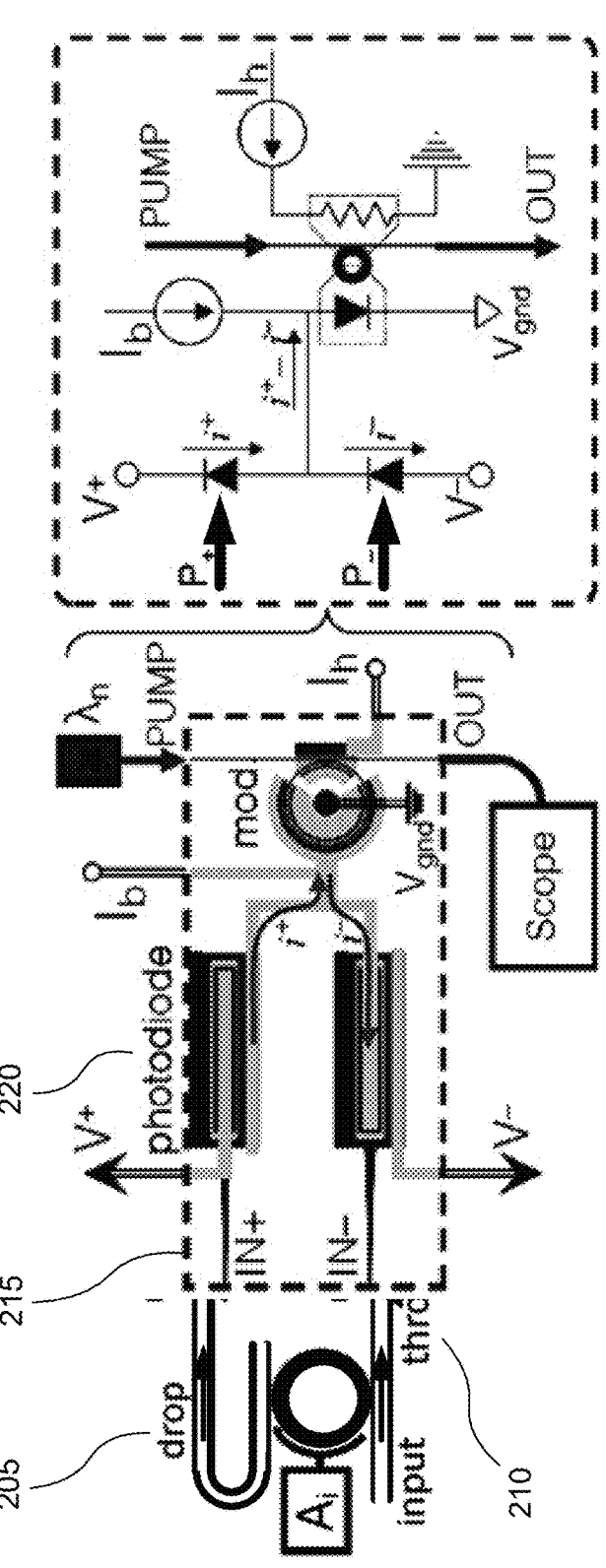

FIG. 2a illustrates the "broadcast-and-weight" configuration, with a MRR modulator as a weight bank. The MRR has a drop port 205 and a through port 210, each of which is connected to the inputs 215 of balanced-photodetectors (BPD) 220, serving as a subtractor between the two ports (each individual PD sums the total optical power in an operational optical-band).

Figure 2B:
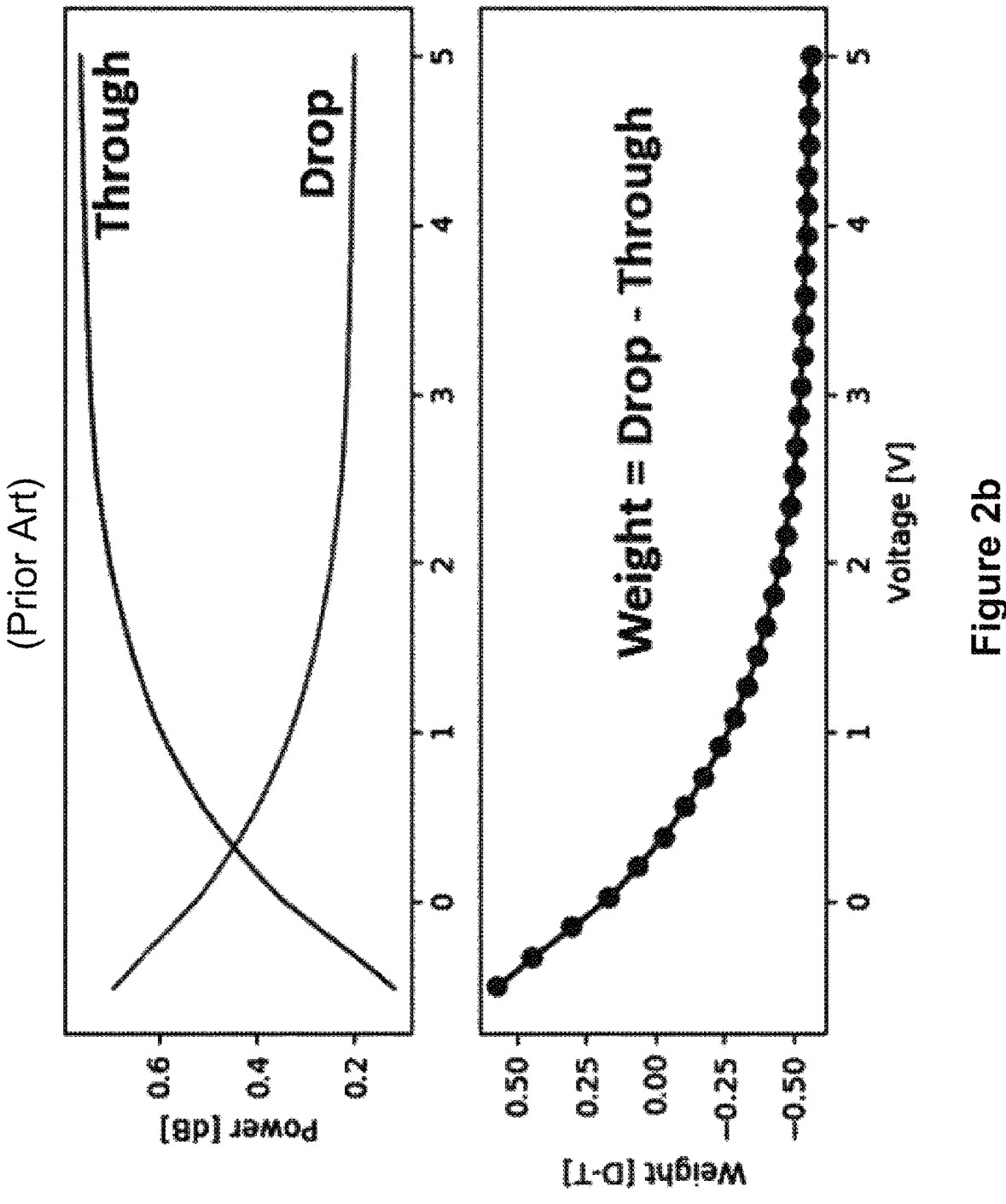
FIG. 2b shows power at the drop port and the through port of a MRR modulator, as well as the weight value of the MRR modulator as a function of a bias voltage, according to prior art.

FIG. 2b shows transmission power at the drop port and the through port of a MRR modulator, as well as the weight value as a function of a bias voltage.

Microring resonator (MRR) and Mach-Zehnder interferometer (MZI) modulators, as well as their derivatives and variants, are important optical modulation architectures that can be investigated for the high-speed, high-throughput data communication required in modern data centers. They can also be employed in neural network systems as key elements of a neuron emulator.

Many modulator architectures can be investigated for high-speed optical interconnects in data centers and high-performance computing systems. Among them, MRR modulators using in-resonator photoconductive heaters (IRPH) show advantages in applications requiring control of large-scale optical systems. The control element in the IRPH-MRR modulator can be based on a doped silicon waveguide. By combining the doped waveguide's photoconductive effects with its thermo-optic tuning capabilities, an IRPH-MRR modulator according to embodiments can be utilized for respectively monitoring and tracking a MRR's resonance conditions. This can mitigate or eliminate fabrication steps for extra components fabrication steps, such as Ge depositions or Si+ implantations for on-chip PDs, and such an architecture can allow for a reduced number of electrical inputs/outputs to the system. IRPH-MRR modulators can be investigated as weight banks in the application of large-scale artificial neural network (ANN) as weight banks and accuracies in the order of 4.2 bits have been obtained without any direct transmission measurements.

Figure 3:
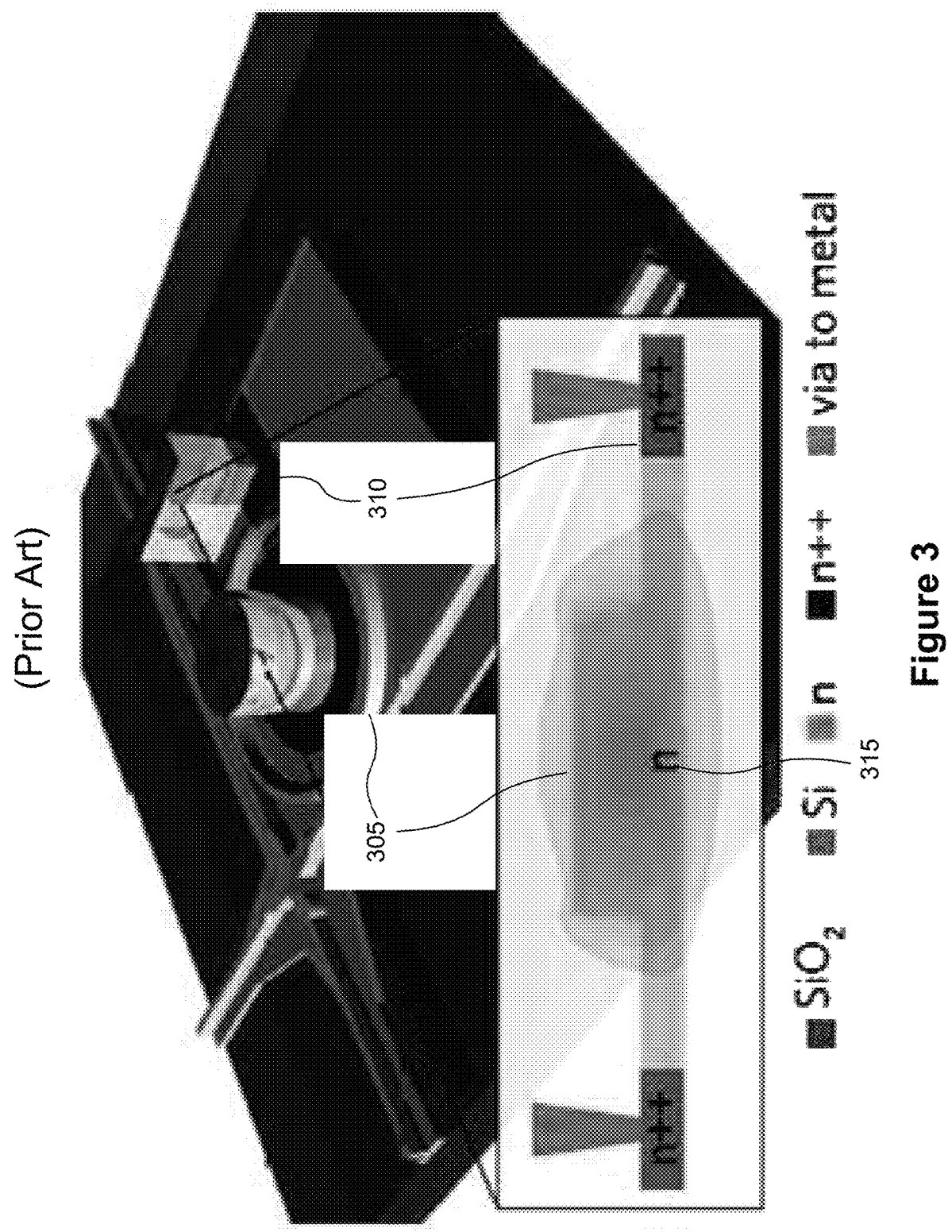
FIG. 3 illustrates an in-resonator photoconductive heater (IRPH) MRR modulator (IRPH-MRR) with a doped waveguide cross-section, according to prior art.

FIG. 3 is a schematic of an in-resonator photoconductive heater (IRPH) MRR modulator 305 with an in-resonator photoconductive heater 310 (IRPH; IRPH-MRR as combined) with an n-doped waveguide cross-section 315.

However, because the refractive index (RI) tuning scheme of an IRPH-MRR modulator is mainly based on a thermo-optics modulation, the tuning bandwidth is only about 175 kHz, which is significantly below the requirements for high-speed, high-throughput communication in a neural network. Therefore, a carrier density modulation inside of the waveguide core, using a PN-junction, can be employed for a modulator implemented in the weight bank array. This can present an electro-optic (EO) modulation bandwidth as high as GHz. In addition, by optimizing the optical mode overlapping with the depletion region in the waveguide, by using for example L-shaped or U-shaped vertical PN-junctions, the tuning efficiency, and therefore the optical modulation amplitude (OMA) can be effectively improved. For either IRPH-MRR or PN-MRR modulators, the output intensity modulation depends on the resonant wavelength peak drifting when a bias voltage is applied, which unfortunately, influences the OMA of adjacent resonant peaks, thus causing optical cross-talk.

Figure 4A:
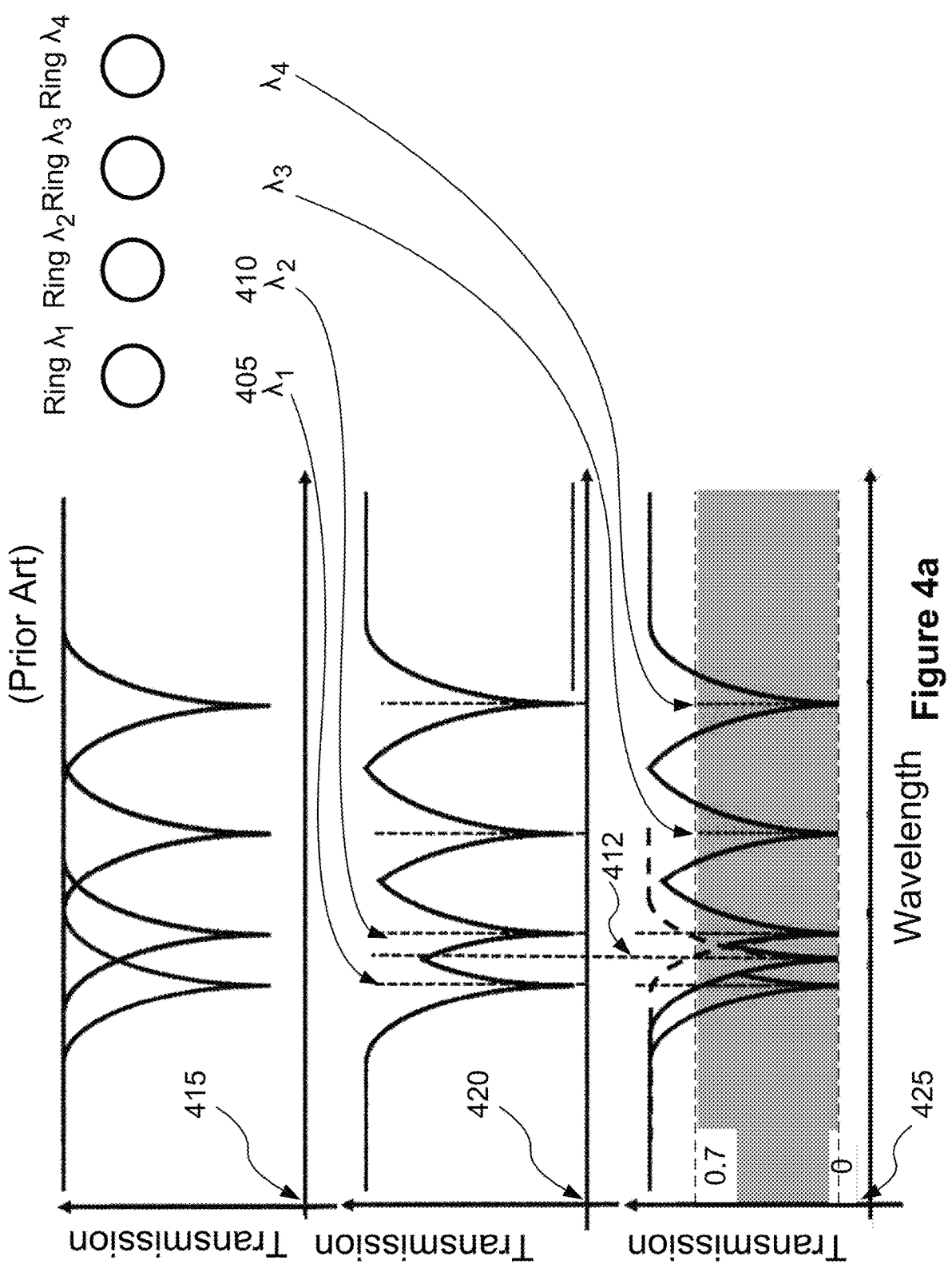
FIG. 4a illustrates the resonance spectrum of cascade of four MRRs and how modulation of one of the MRRs can cause cross-talk in the output of an adjacent MRR, according to prior art.

FIG. 4a shows four transmission spectra at three different stages, particularly with respect to a signal at an operating wavelength $\lambda_2$. When cascading multiple MRR modulators in a row, each modulator's transmission spectrum has a peak (corresponding to maximum attenuation) centered at a different wavelength. As illustrated, a wavelength shifting (usually a wavelength decrease, also referred to as a red shift) of a peak at $\lambda_1$ 405 influences the OMA of a peak at $\lambda_2$ 410. This is referred to as optical cross-talk. The greater the number of MRR modulators cascaded in a row, the greater the cross-talk influence.

The top graph 415 of FIG. 4a illustrates the individual transmission spectra of each of four MRRs, overlaid on the same graph. The middle graph 420 illustrates the overall transmission spectrum of the four MRRs when coupled together for example in series. Because the bandwidths of the peaks are non-zero and the peaks are relatively close together, there is a cross-talk issue inhibiting the transmission spectrum from achieving maximum value in between peaks. This affects characteristics such as extinction ratio and potentially negatively impacts operation of the corresponding optical circuit. The bottom graph 425 illustrates further degradation of these characteristics due to optical cross talk, when the resonant wavelength of one of the MRRs is adjusted. This illustrates a problem with the conventional operation of circuits involving multiple MRRs, namely that when different MRRs have similar resonant wavelengths, wavelength shifting of one MRR can impact the operation of other MRRs.

As shown in the bottom graph 425, when the resonant peak from $\lambda_1$ moves to the location 412 between $\lambda_1$ and $\lambda_2$, the corresponding MRR will affect adjacent wavelengths, as illustrated by the dashed curve extending from the peak at location 430. This will interfere with the operation of the next MRR by degrading the height of the curve (other dashed curve) leading into the peak at $\lambda_2$ position 410. So if the first MRR is operated with a resonant peak at location 412, and the second MRR is operated with a second resonant peak modulated from $\lambda_2$, no matter how much the second resonant peak is drifted, the maximum power will only be the overlap point of dashed curve leading from the resonant peak 412 and the dashed line of leading to the resonant peak at $\lambda_2$ 410.

Figure 4B:
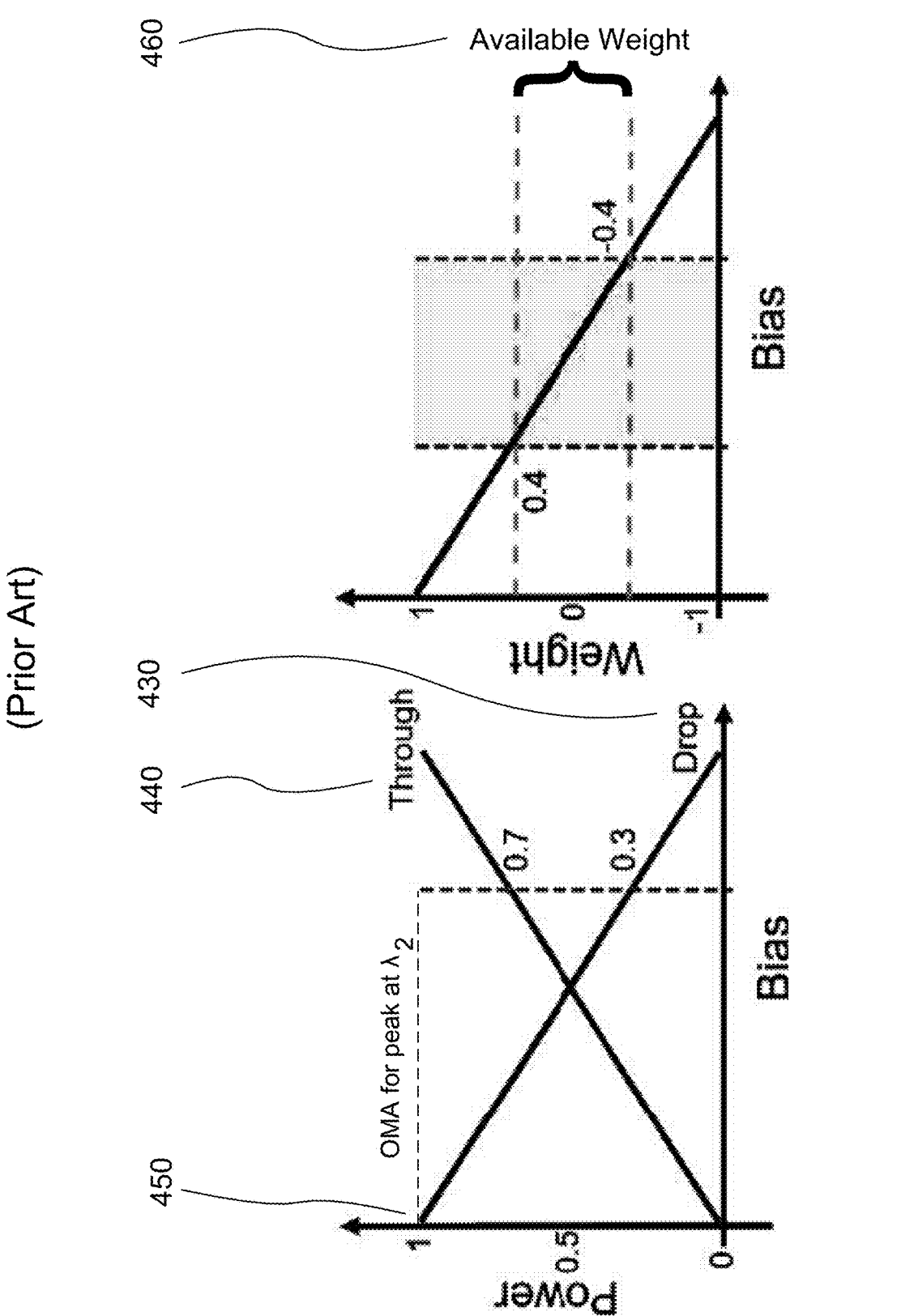
FIG. 4b is a graph illustrating how the bias voltage applied to an MRR modulator can affect the optical modulation amplitude (OMA) of an adjacent MRR, according to prior art.

FIG. 4b shows the optical modulation amplitude (OMA) of a MRR's resonance peak as the resonance peak of an adjacent MRR is shifted. As the resonance peak $\lambda_1$ is shifted, the power transmitted at the $\lambda_2$ MRR drop port decreases 430 and the power transmitted at the $\lambda_2$ MRR through port increases 440, but the detectable power difference for $\lambda_2$ cannot be greater than OMA 450 and available weigh 460, which decrease.

To address the cross-talk issue, absorption-based modulation schemes can be used. For example, an MRR modulator fabricated on a silicon-on-insulator (SOI) platform can utilize a graphene-based electro-absorption mechanism for tuning the intensity at a fixed wavelength. However, this concept might cause other issues, such as a low graphene electro-absorption efficiency, which can lead to a small OMA. Also, the extra system heat caused by the absorption can cause a resonant peak to drift towards longer wavelengths. Also, the post-fabrication processes for graphene layer growth are also more complex, as compared to PN or IRPH doping.

Reduction or elimination of crosstalk can allow MRR modulators to be cascaded and used as weight banks in (e.g. large-scale deep) neural networks. Examples of neural networks include feedforward neural networks, recurrent neural networks and convolutional neural networks.

Figure 5A:
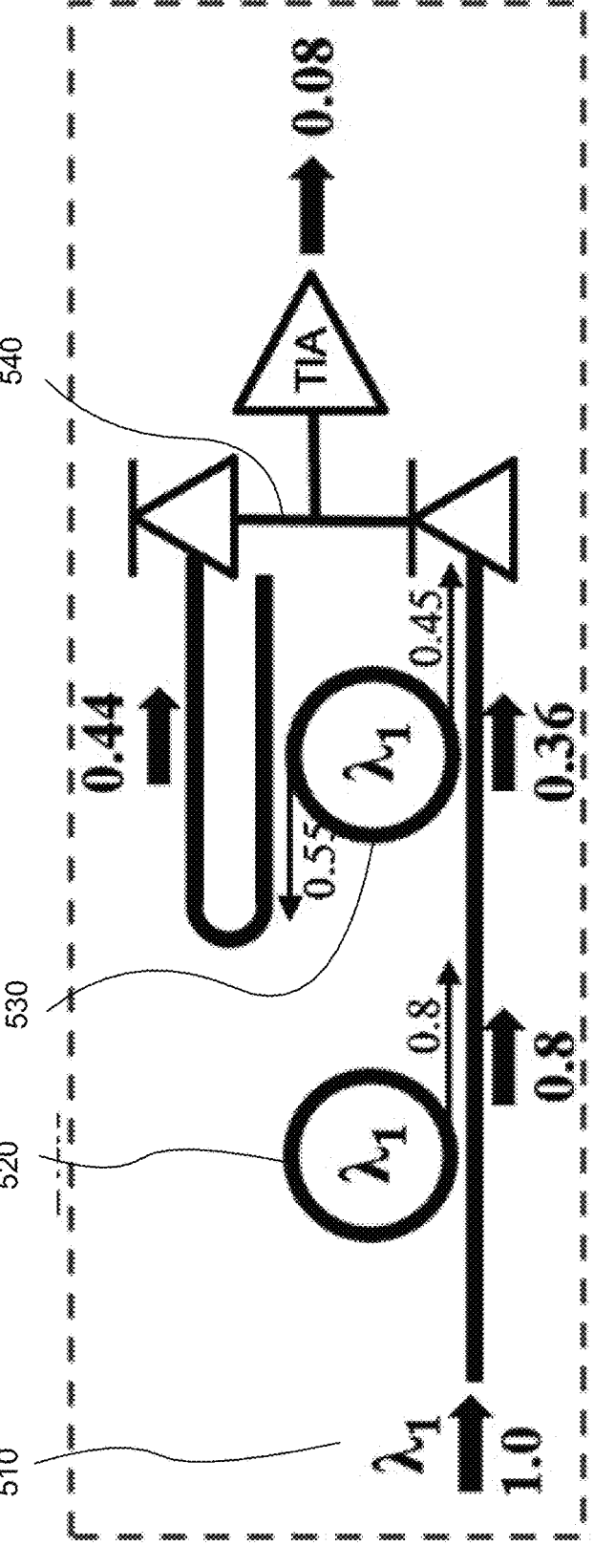
FIG. 5a is a diagram showing how an MRR modulator can be used in an electro-optical circuit to perform a vector multiplication, according to prior art.

FIG. 5a is a diagram showing how an MRR modulator can be used in an electro-optical circuit to perform a vector multiplication. A wavelength 510 is used to represent a vector dimension and a first vector component is encoded as an MRR modulated intensity 520 of that wavelength. The second vector component is encoded as a further intensity modulation through a MRR modulator 530, that modulation effectively performing the product of the first and second vector components. The component product is collected and summed with others if needed at a balanced photodiode 540.

Figure 5B:
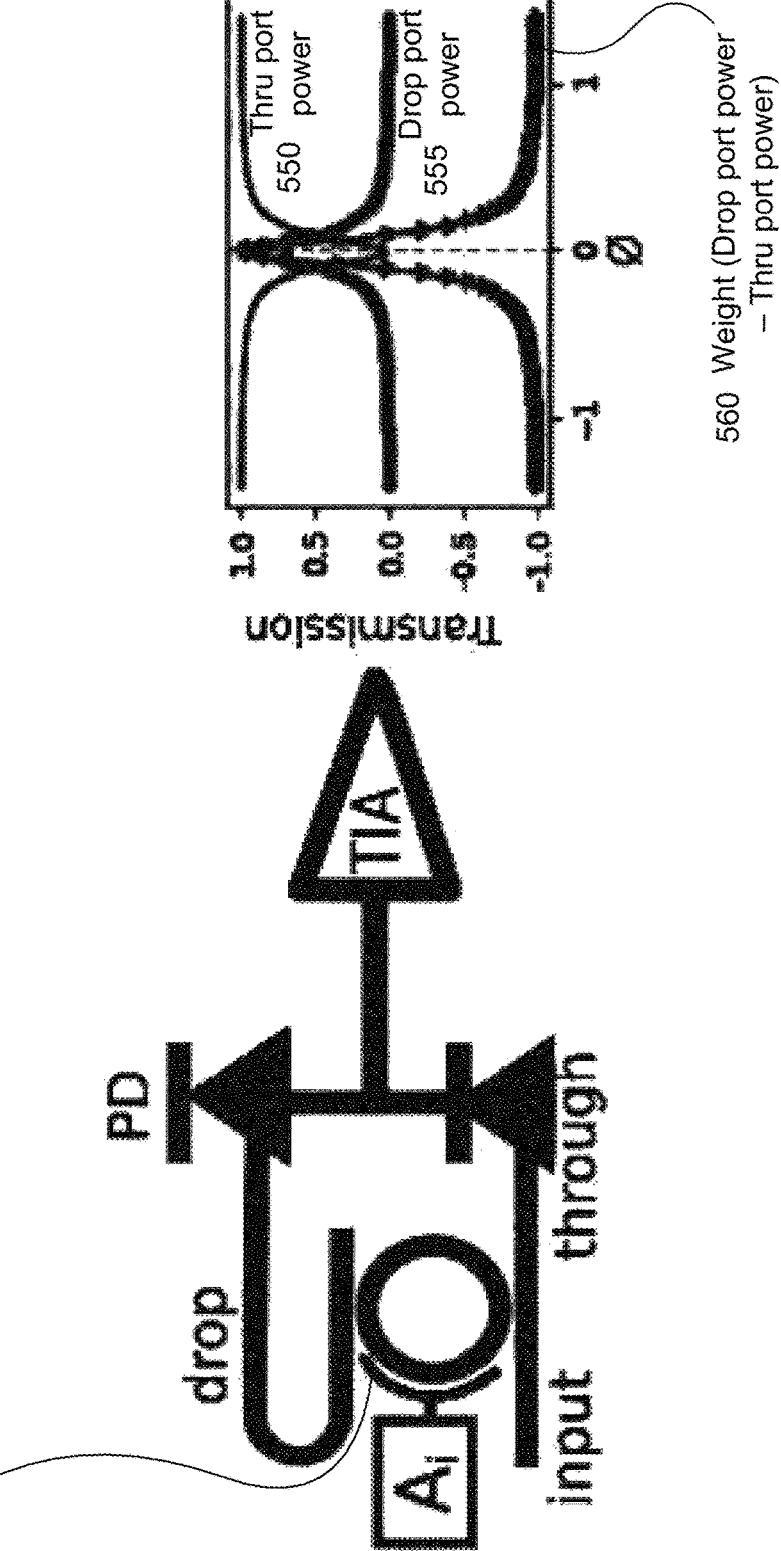
FIG. 5b is a diagram showing the transmission output of the drop and through ports of a MRR modulator, for different weights, according to prior art.

FIG. 5b is a diagram showing the transmission output power at the drop port 550 and through port 555 of a MRR modulator 530, as well as the output weight (Drop port power–Thru port power) 560.

Figure 5C:
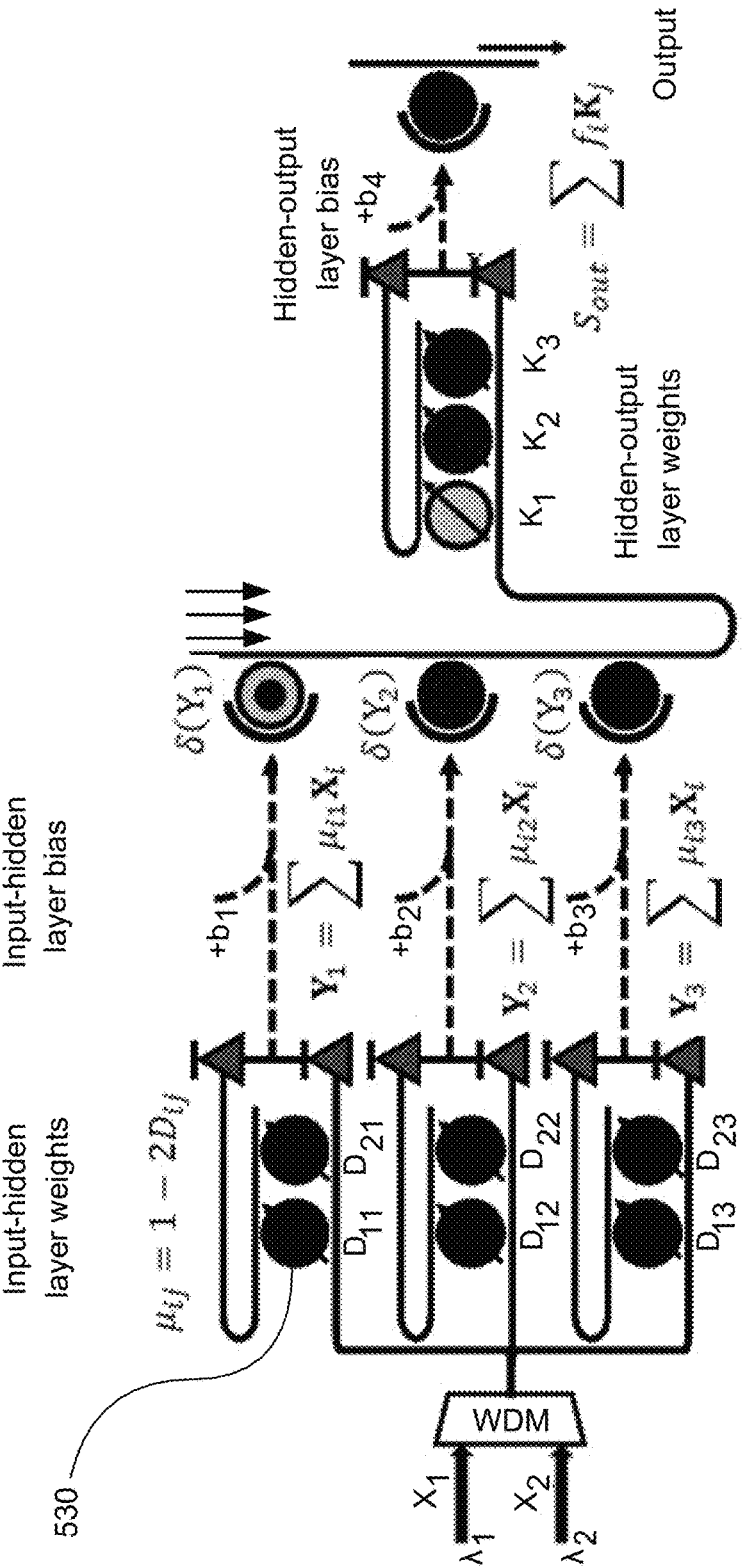
FIG. 5c is a diagram showing how MRR modulators can be integrated into a feedforward neural network, according to prior art.

FIG. 5c is schematic representation of a feedforward neural network. A set of MRR modulators 530 can play the role of a weight bank in the calculations of a feedforward neural network. Embodiments include feedforward neural networks in which MRR modulators are configured according to embodiments described further.

Figure 5D:
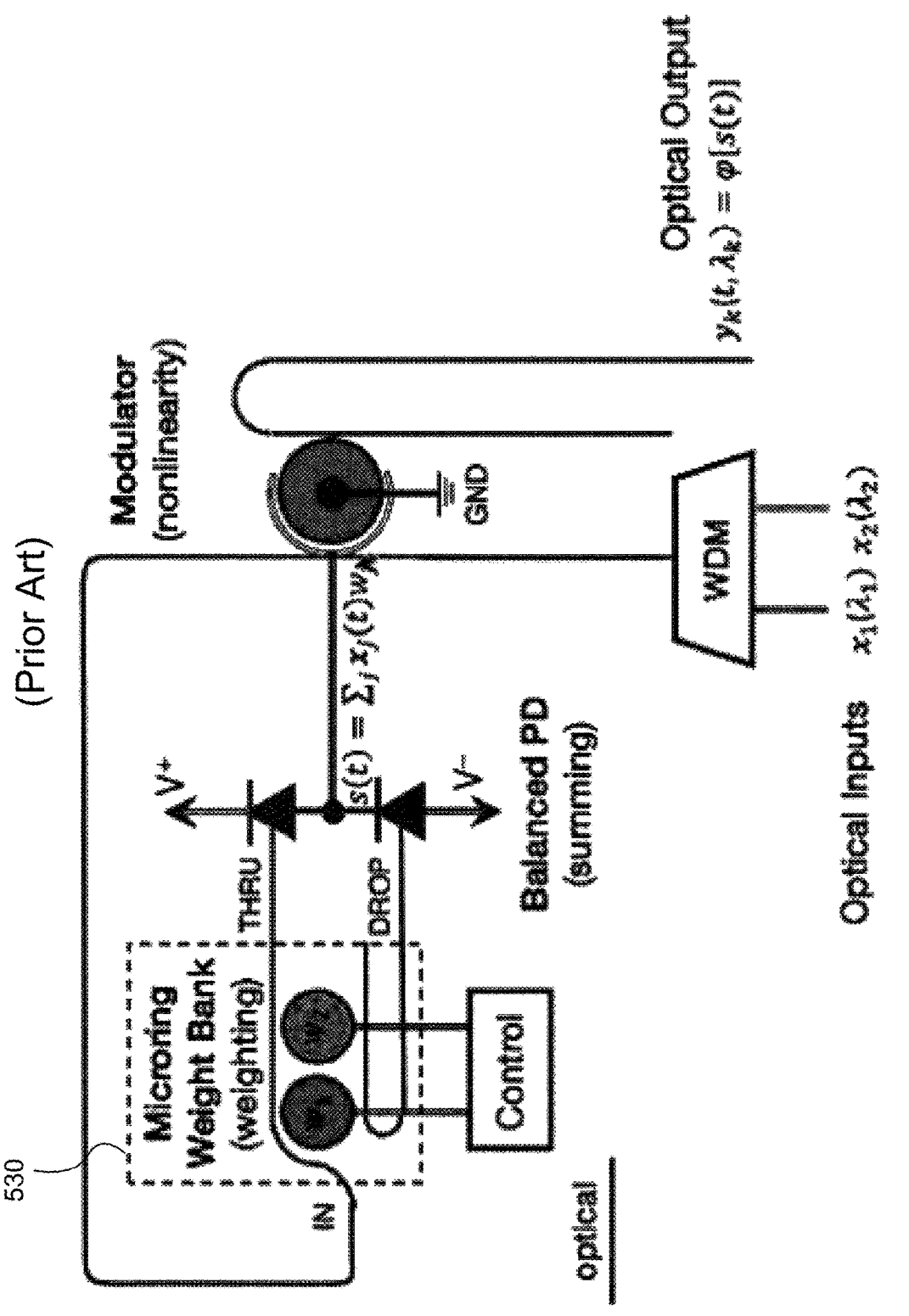
FIG. 5d is a diagram showing how MRR modulators can be integrated into a recurrent neural network, according to prior art.

FIG. 5d is schematic representation of a recurrent neural network. A set of MRR modulators 530 can play the role of a weight bank in the calculations of a recurrent neural network. Embodiments include recurrent neural networks in which MRR modulators are configured according to embodiments described further.

Figure 5E:
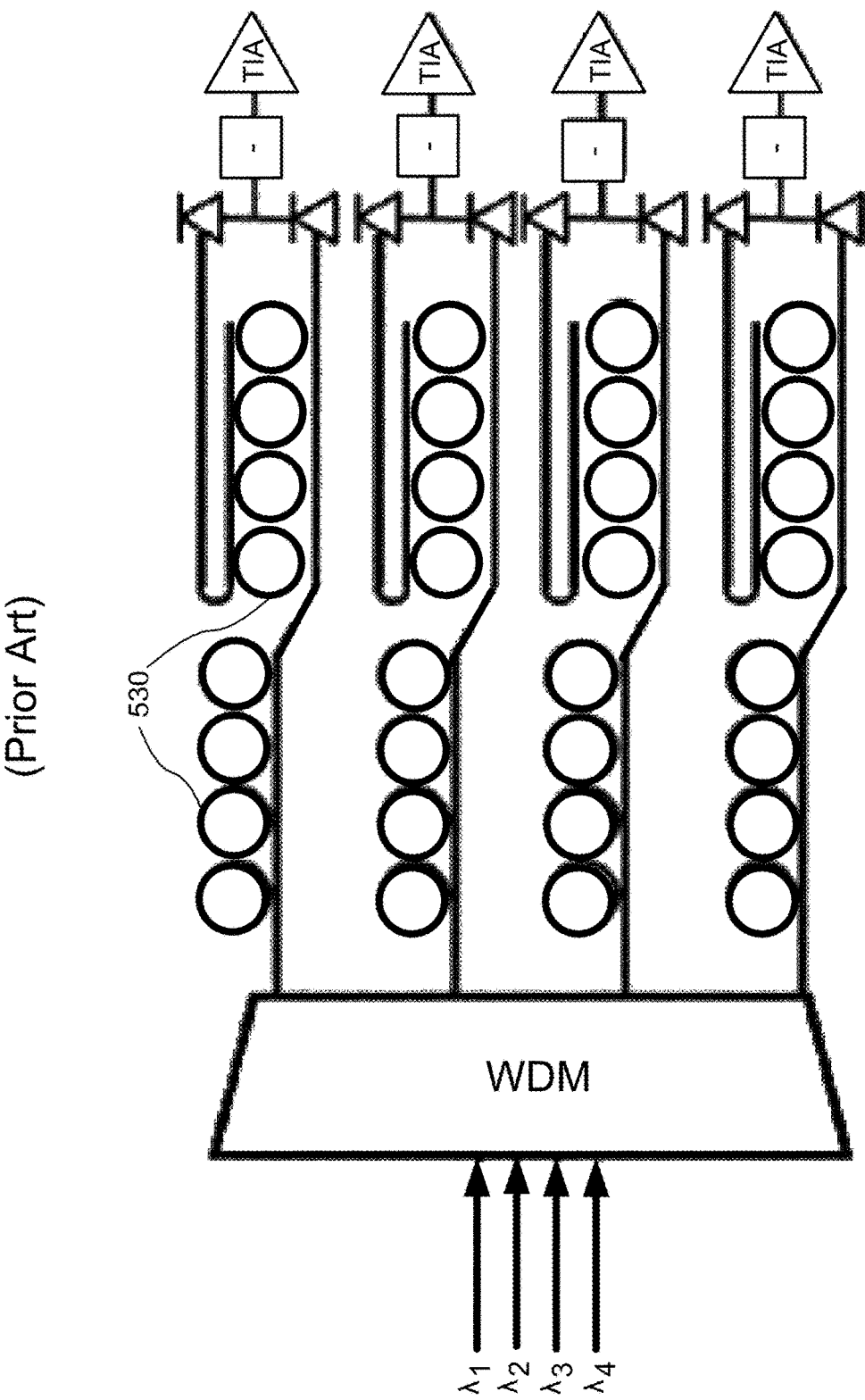
FIG. 5e is a diagram showing how MRR modulators can be integrated into a convolutional neural network, according to prior art.

FIG. 5e is schematic representation of a convolutional neural network. A set of MRR modulators 530 can play the role of a weight bank in the calculations of a convolutional neural network. Embodiments include convolutional neural networks in which MRR modulators are configured according to embodiments described further.

Silicon photonics integration opens fundamentally new opportunities for large-scale analog information processing systems, with potentially low cost. Embodiments aim to solve the aforementioned problems, and in particular the crosstalk issue, in order to facilitate the development of large-scale optical processors on the SOI platform. Instead of tuning wavelengths, embodiments, using an interferometric coupling-based modulation approach, apply intensity tuning at a substantially fixed wavelength. This approach can potentially eliminate the cross-talk issues. According to intensity tuning, the transmission spectrum of a modulator is adjusted with respect to the height (depth) of the resonant peak, while maintaining the resonant wavelength at a relatively constant value. That is, the extinction ratio applied by the modulator at the resonant wavelength is adjusted, where this extinction ratio measures a change in optical power between a certain input and a certain output of the photonic device (e.g. between add and through ports). This can also be described as an intensity tuning, or a coupled power adjustment. The refractive index of the coupler can change based on control signals, which changes a proportion of optical input coupled into the ring waveguide of the MRR.

Because the intensity variation of an embodiment occurs at a fixed spectral position, namely at the resonant wavelength, there is no less (or no) influence on adjacent wavelength channels. Furthermore, if there is influence on adjacent channels, adjustment of the photonic device extinction ratio rather than the wavelength may affect the other channels to a lesser degree. Further, embodiments offer a doubled free spectral range (FSR) range compared to standard modulators having a same radius, allowing large-scale integrated systems to have a greater number of wavelength channels.

In an embodiment, a length of waveguide, acting as a two-point interferometric coupler, is introduced as an adjoining part of a MRR. The length of the additional waveguide may be configured in order to provide for a required modulation efficiency of modulation element inside. This allows for embodiments to be able to adjust the coupling strength, in order to adjust the power coupled on and off the resonator, thus offering a substantially full range of intensity variation at the output. The intensity variation can range from substantially zero to substantially 100% of the input power. A device that includes the MRR, the additional waveguide, and any component used to modulate the properties of the MRR can collectively be referred to as a modulator, or more generally a photonic device. The additional waveguide can be referred to as a coupler, a coupler arm, and an interferometric coupler.

Figure 6A:
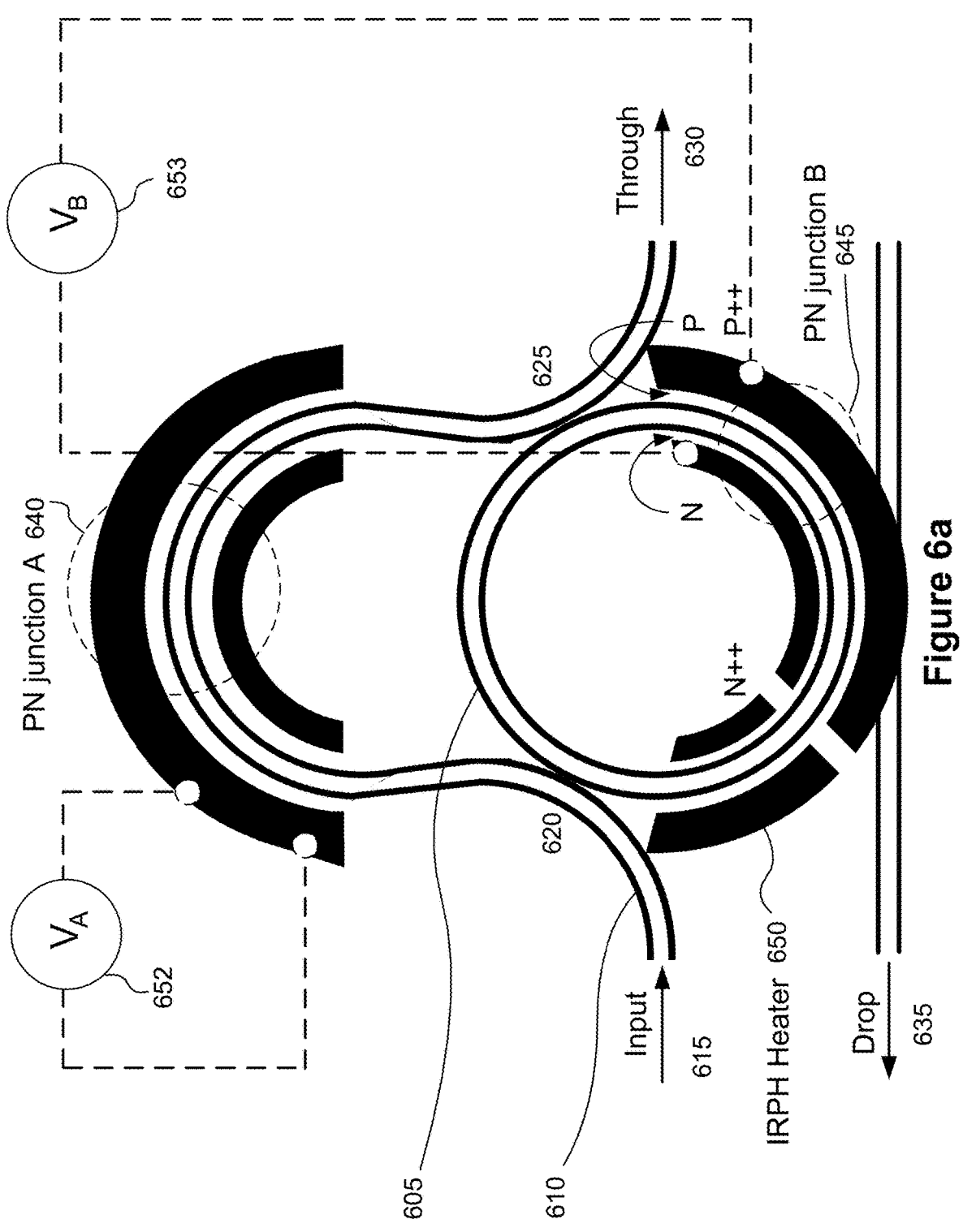
FIG. 6a illustrates an embodiment of an interferometric coupling-based MRR modulator, according to an embodiment.

FIG. 6a illustrates an embodiment of an interferometric coupling-based MRR modulator. A microring resonator (MRR) ring waveguide 605 is coupled to a separate waveguide 610 at two sites. The coupled waveguide serves as an arm of a Mach-Zehnder interferometer and can be referred to as an interferometric coupler. An input signal 615 can be split at a first coupling site 620 and recombine at a second coupling site 625 such that the throughput signal 630 has an intensity that depends on the path length difference between the two waveguide sections propagating the two parts of the split signal (i.e. the middle section of the waveguide 610 and the ring waveguide 605). A drop port 635 from the MRR modulator can also release part of the signal in the ring. A PN junction A 640 can be used to modulate the refractive index of the coupler, and a PN junction B 645 can be used to separately modulate the refractive index of the MRR modulator. PN junctions A and B are parts of control elements. An in-resonance photoconductive heater (IRPH) 650 can also be used to adjust the MRR modulator. In an embodiment, modulation can be performed with an electronic circuit including a first controllable voltage source 652 operatively coupled to the PN junction A 640, and a second controllable voltage source 653 operatively coupled to the PN junction B 645. The first controllable voltage source and PN junction A can be referred to as a first control element and the second controllable voltage source and PN junction B can be referred to as a further control element. A controller can operate the first and second controllable voltage sources 652, 653 in a complementary manner to adjust an extinction ratio of the MRR modulator, as described herein.

To achieve an intensity modulation at a fixed wavelength, an embodiment can include electrical modulation components in both the coupler arm (PN junction A) and the MRR (PN junction B). By tuning the voltage of a PN junction (PN junction A), the N-doped and P-doped materials being on either side of the coupler, a power coupling coefficient ($\kappa_2$) from each of the two coupling interfaces can be adjusted, resulting in a modulated transmission output. This however, can cause the resonant wavelength (i.e. peak wavelength) of the MRR to drift slightly, due to a change in its effective refractive index of the waveguide. To lock the resonant wavelength at a fixed value, a compensation modulation can be applied by simultaneously tuning the MRR's PN junction independently (PN junction B). This compensation modulation can readjust the resonant wavelength to its original wavelength. In other words, PN junction A and PN junction B are controlled and operated in a complementary manner, to adjust the photonic device extinction ratio at the resonant wavelength, while maintaining the resonant wavelength. Maintaining the resonant wavelength can involve keeping the resonant wavelength unchanged, substantially unchanged, or significantly limiting the change in resonant wavelength. Some change in resonant wavelength may be tolerated, however because it is not the primary means by which modulation is achieved, this change is deemed to be secondary and can be reduced. Adjusting the extinction ratio is also referred to as adjusting an amount of attenuation applied by the photonic device at the resonant wavelength, and also referred to as intensity tuning of the photonic device. For further clarity, operating multiple control elements in a complementary manner (also referred to as complementary operation) involves controlling the multiple control elements in mutually compensatory ways so that the resonant wavelength is maintained substantially constant.

In some embodiments, complementary operation involves the following. When the refractive index of the middle section of the first or second waveguide is adjusted (tuned), the coupling strength of the light from the first or second waveguide to the ring waveguide can also be adjusted. Adjusting the coupling strength of light from the first or second waveguide to the ring waveguide (e.g. using a first control element) can be used to control the extinction ratio at the output of the photonic device. However, the index changes in the coupler (e.g. as part of the first control element) will also tend to drift the resonant peak position (in the shorter wavelength direction). To fix the resonant peak at a substantially constant wavelength while also implementing the extinction ratio modification, embodiments of the present invention use another control element (index modulation element) in the ring waveguide. The other control element is operated to shift the resonant peak back (toward the higher wavelength direction). This other control element may be another index modulation element in the ring, and may be referred to as a wavelength complementary element. As such, complementary operation is based on the wavelength complementation to lock the peak, achieved by using two index modulation elements (first and other control element) in the coupler and ring, respectively.

Figure 6B:
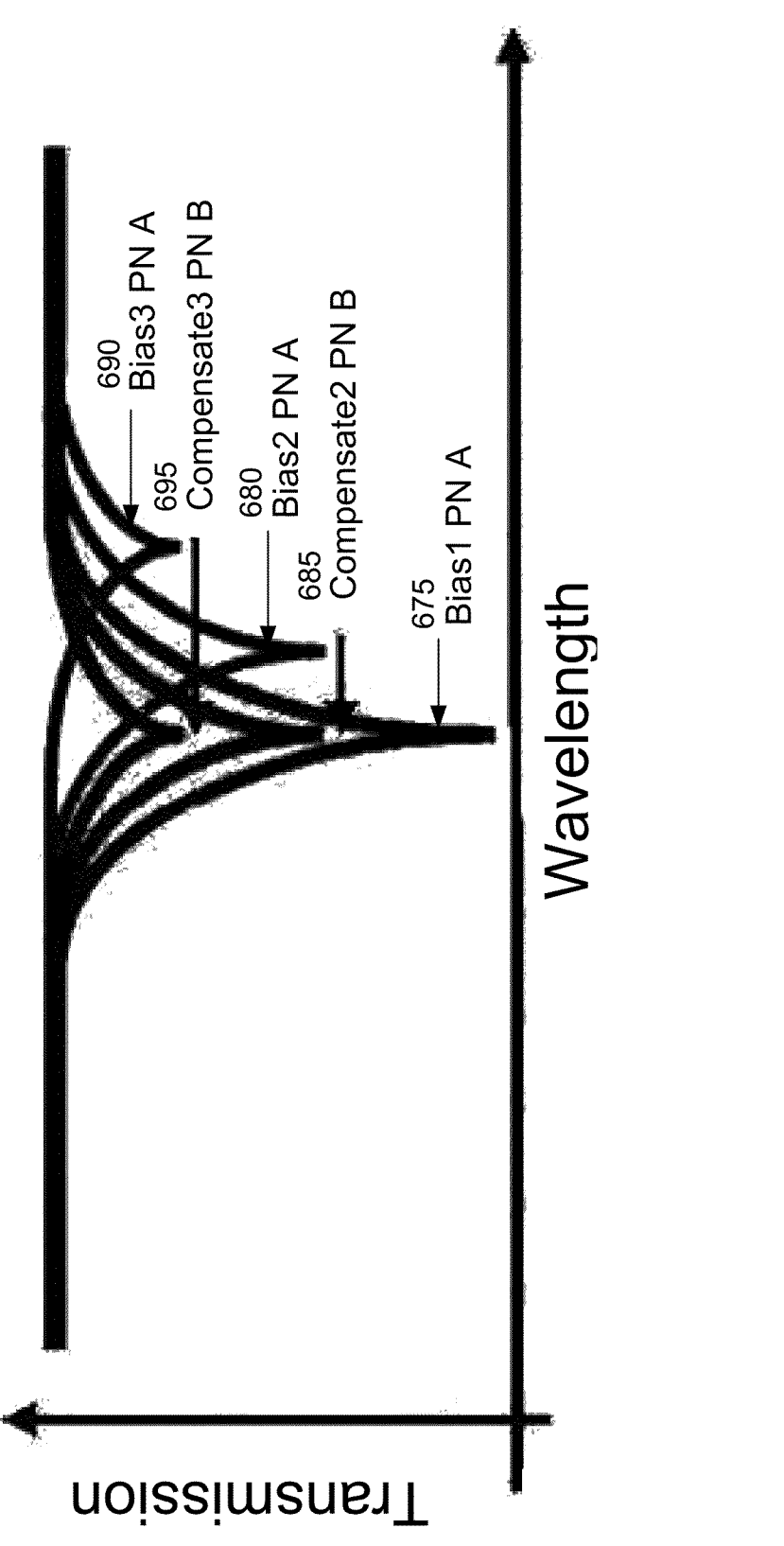
FIG. 6b shows five (5) transmission spectra for an interferometric coupling-based MRR modulator according to an embodiment, where the interferometric coupler and the MRRs are operated in a complementary manner to allow for a wavelength locking scheme.

FIG. 6b shows the transmission spectra at the output of a MRR modulator, such as illustrated in FIG. 6a having an interferometric coupler, according to an embodiment. When a reference voltage Bias1 PN A is applied at PN junction A 640, a first transmission spectrum 675 is obtained. When a different voltage Bias2 PN A is applied at junction PN A 640, the transmission spectrum 680 shows a different intensity level (extinction ratio) as well as a wavelength shift. However, because of separately tunable PN junction B 645 of the MRR, the transmission spectrum 680 can be shifted to coincide 685 with original spectrum position 675, by applying to PN junction B 645 a voltage Compensate2 PN B in addition to Bias2 PN A. Similarly, when a voltage Bias3 PN A is applied at PN junction A, the transmission spectrum 690 is obtained. When a voltage Compensate3 PN B is applied at PN junction B in addition to Bias3 PN A being applied at PN junction A, the transmission spectrum 695 is obtained.

Accordingly, by applying different combinations of voltages at PN junctions A and B, that is, by operating two control elements in a complementary manner, the transmission spectrum can be adjusted in intensity while keeping the resonant wavelength substantially constant. The different spectra 675, 685, 695 illustrate this effect, in which the extinction ratio is adjusted. The extinction ratio refers to the amount to which an input signal at the resonant wavelength can be adjusted. The extinction ratio can be between an input to the photonic device (e.g. an input to the first waveguide) and an output of the photonic device (e.g. an output of the first waveguide, such as the through port). A continuum of different spectra may be achievable, for example intermediate between spectra 675 and 695.

In an embodiment, the coupling strength modulation between the interferometric coupler arm and the MRR can be used to realize an output intensity interrogation scheme at a fixed wavelength. This can effectively eliminate the optical cross-talk issue when using wavelength shift modulation scheme. The interrogation scheme may involve a feedback control scheme which is used to maintain desired input/output power level behaviours of the photonic device. The feedback can be obtained during a separate offline calibration operation. According to the interrogation scheme, testing can be done in order to obtain a lookup table, or other relationship information. This information indicates the combinations of control signals, to be sent to the multiple control elements of the photonic device, which result in different extinction ratios while also maintaining a substantially fixed resonant wavelength. The calibration operation can be performed with a constant (e.g. minimum) power level of optical signal.

In an embodiment, a coupler arm can be coupled to an MRR ring waveguide at two sites and this can be modulated to adjust the extinction of the resonant peak. This two-site coupling is characterized in that a middle section of the coupler arm waveguide is generally further away from the MRR ring waveguide than the two coupling sites. For example, in FIG. 6a, the middle section of the waveguide 610 is further away from the ring waveguide 605 than either of the coupling sites 620, 625. The power coupling strength between an MRR and a two-site coupler arm, each acting as an arm of a Mach-Zehnder interferometer (MZI), can be adjusted by applying a bias voltage to a control element in the coupler. For example, the middle section of the two-site coupler can be $\pi R$ longer than the coupled part of the ring ($L_{MRR}$) if a thermal-based modulation element is added. However, for a PN-junction-based modulation element, the middle section may be 20 times longer than the coupled part of the ring, in order to obtain a similar modulation efficiency for full coupling strength modulation (between 0% and 100% of input power).

Figure 7A:
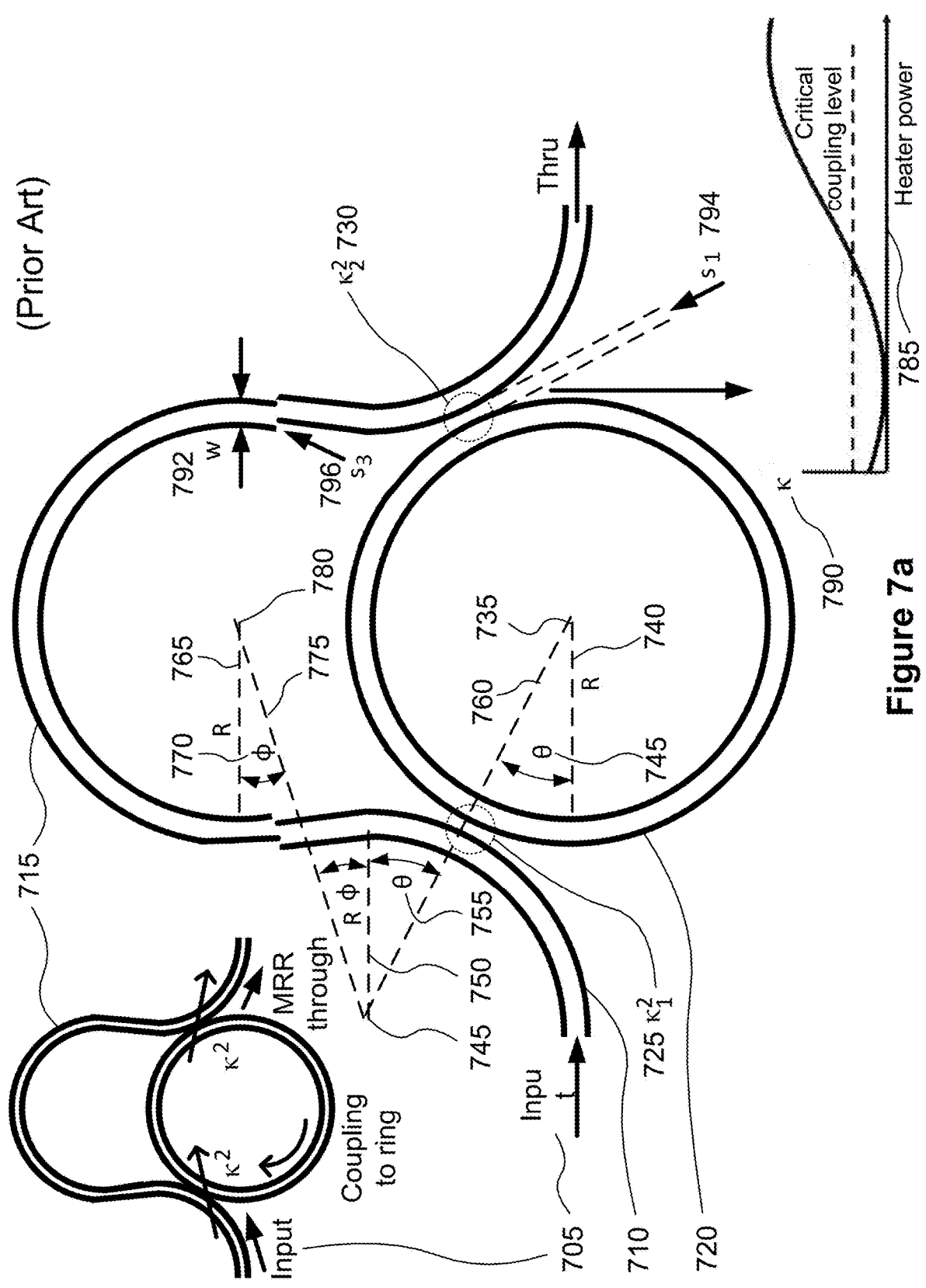
FIG. 7a illustrates an interferometric coupling-based MRR modulator, according to prior art, as well as component parameters that can be mathematically related, including angles and coupling coefficients.

FIG. 7a illustrates the geometry of an interferometric coupling-based MRR modulator. It is an example topology that can be adapted for use in embodiments of the present invention. Adaptations can include making the topology symmetrical by adding a second waveguide coupled at the bottom of the ring waveguide, adding and operating control elements in a complementary manner, adjusting the shape and length of the waveguide middle section, or a combination thereof. The second waveguide is shown. Regarding FIG. 7a, an input signal 705 is applied at a waveguide 710, which is extended as a two-point interferometric coupler 715 to a length $\pi R$, R being the radius of a microring resonator ring (MRR) waveguide 720. This length can further be extended in other embodiments. A first coupling occurs at a MRR input interface 725 and has a certain power coupling coefficient. A second coupling occurs at an MRR's output interface 730 and also has a power coupling coefficient. In an embodiment, the couplings have symmetrical geometry and the power coupling coefficient at each interface is $\kappa^2$. With the MRR ring waveguide's center 735 positioned on a first horizontal 740 axis and the center of curvature 745 of the input waveguide 710 positioned on a second horizontal axis 750, angle $\theta$ 755 can be defined as the angle between the first horizontal axis and the line 760 joining the two centers of curvature.

Further on FIG. 7a, with the center of the two-point interferometric coupler's curvature set on third horizontal axis 765, angle $\varphi$ 770 can be defined as the angle between the third horizontal axis 765 and the line 775 joining the center of curvature 780 of the two-point interferometric coupler and the center of curvature 745 of the input waveguide.

Further on FIG. 7*a*, in an embodiment where the MRR ring waveguide and the coupler waveguide are the same width, the common width can be referred as w 792. In an embodiment where the first coupling interface 725 and the second coupling interface 730 each have a similar gap and there is symmetry, the gaps can have a same width which can be referred to as $s_1$ 794.

Further on FIG. 7*a*, as the MRR ring waveguide and coupler are heated 785, the power coupling coefficient $\kappa^2$ is modulated 790. With the parameters defined as in FIG. 7, a calculation for the power coupling coefficient $\kappa^2$ in an embodiment is possible. By selecting the path difference $\Delta L$ between the coupler arm and the MRR to be equal to half way of the ring, as with a MZI, the second resonant peaks from the MRR can be suppressed by the MZI's doubled FSR, where the coupling strength is fully suppressed. Geometric considerations indicate that the correct path length is arrived at from the following constraints:

$$\theta + \phi = \frac{\pi}{4}$$
$$\frac{\cos(\theta)}{\cos(\phi)} = \frac{2R + w + s_3}{2(R + w) + s_1}$$

Where, again, $\theta$ and $\phi$ are angles as depicted in FIG. 7*a*, R is the MRR radius, w is the waveguide's width, $s_1$ is the separation between adjacent waveguides, and $s_3$ is a jog (i.e. a fault line) introduced between waveguide arcs to improve mode-matching. Combining the above equations, we arrive at the following solution for angle $\phi$.

$$\phi = \tan^{-1}\left[\sqrt{2}\left(\frac{2R + w + s_3}{2(R + w) + s_1}\right) - 1\right]$$

Further, $\kappa^2$ can be obtained using the following equation:

$$\kappa = \kappa_0(1-\kappa_0) \times (t_b + t_r - 2\sqrt{t_b t_r} \cos(\phi_b - \phi_r))$$

Figure 7B:
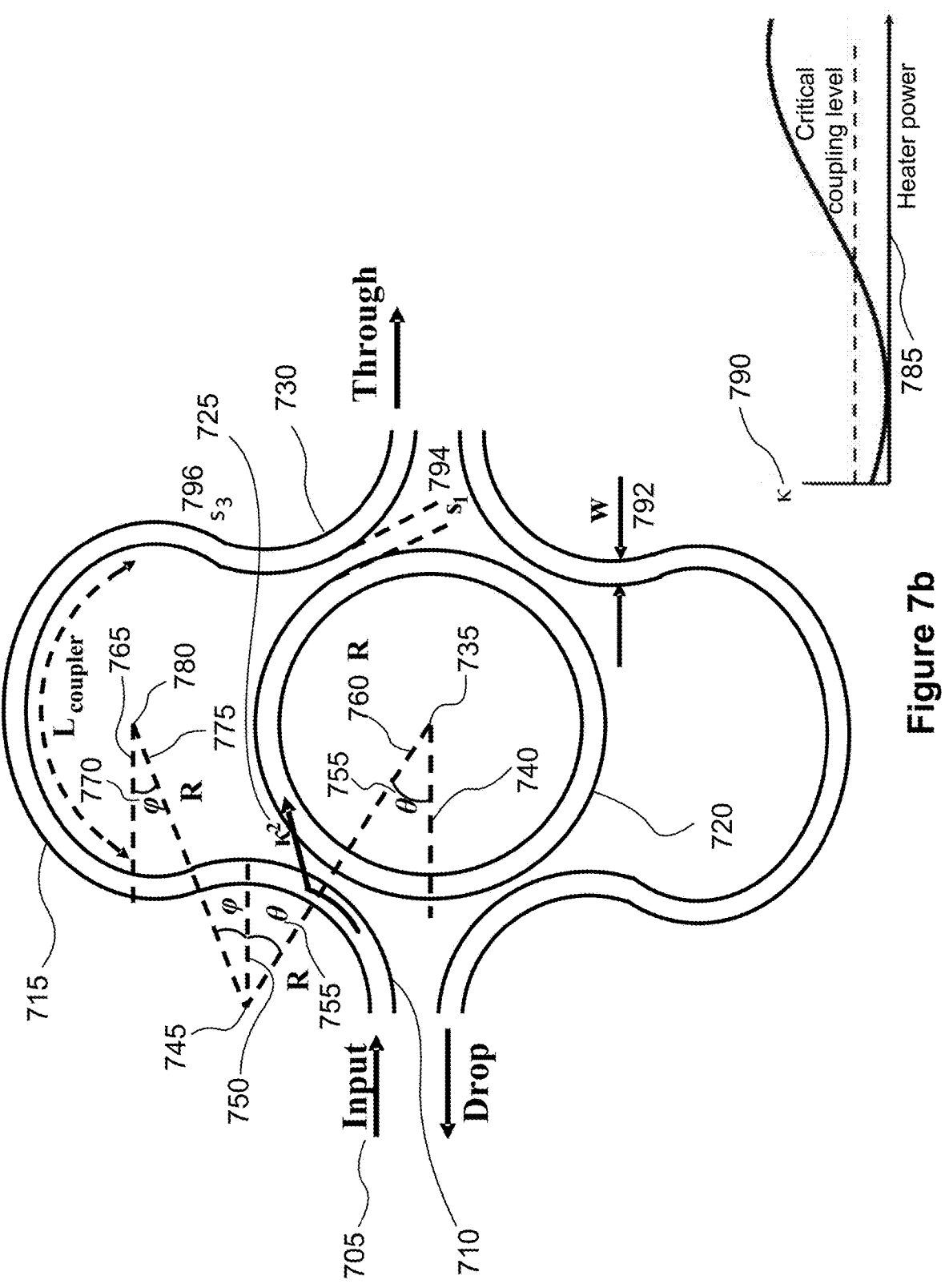
FIG. 7b illustrates an interferometric coupling-based MRR modulator, according to an embodiment, as well as component parameters that can be mathematically related, including angles and coupling coefficients.

FIG. 7*b* illustrates a configuration where two coupler arms are positioned symmetrically to the MRR ring. Equation parameters can be labelled in a similar manner as with the one arm case. This embodiment is discussed in further paragraphs.

By modulating the refractive (RI) of the waveguide serving as a coupler arm, the power coupling coefficient ($\kappa_2$) can be adjusted from a critical coupling to an over coupling or an under coupling, resulting in intensity variations at a resonant wavelength. The intensity modulation is achieved because one part of the input power is propagated to the through port and another part is trapped inside the resonator. However, this tuning changes not only the output intensity, but also the resonant peak's wavelength.

To fulfill the purpose of modulating the intensity without changing the wavelength of resonance, an embodiment makes use of a compensation tuning scheme that includes two refractive index (RI) control elements, one in the MZI coupler arm (also referred to as the first waveguide), and one in the MRR (ring waveguide) part. When a control element, which can be a PN-junction or a thermal heater, in the MZI coupler arm (e.g. first or second waveguide, coupled to the ring waveguide) is adjusted, the transmission intensity will change due to a change in the coupling strength. In various embodiments, the operation of this control element adjusts the coupling strength between the first waveguide and the ring waveguide. This adjustment ends to change the resonant wavelength of the photonic device. Another control element, coupled to the ring waveguide, is operated to counteract this change in resonant wavelength. The control elements are generally electrically controllable, for example controlled by a digital control circuit via a digital-to-analog converter, or by an analog control circuit. The control elements can be operated via voltage or current control, for example, as would be readily understood by a worker skilled in the art.

An interferometric coupler-based MRR modulator, in accordance with an embodiment can have a single interferometric coupler, heated with an IRPH. This may be referred to as an asymmetric IRPH MRR modulator design.

When the refractive index (RI) of the MZI coupler arm waveguide is tuned, the resonant will also be shifted. In an embodiment, this shifting can be compensated for by adding an independently controllable RI control element in the MRR part. By applying an appropriate bias voltage to the second control element, the resonant wavelength (also referred to as resonant peak) can be shifted in the opposite direction. Through a fine adjustment of both control elements, an intensity tuning at a fixed resonant wavelength can be realized. In an embodiment, a sufficiently fine adjustment can be achieved by detecting the through power in real-time. Both control elements are independently controllable. However, the control elements may be performed in a cooperative manner in the sense that the control signal provided to one control element compensates for the drift in resonant wavelength due to the control signal provided to the other control element. Two, three or more control elements may be cooperatively controlled in this manner.

In embodiments, a coupler arm can be added to each MRR in a weight bank of a "broadcast-and-weight" protocol architecture, and in further embodiments, a drop port for monitoring the modulation can also be added to each MRR.

Figures 8A, 8B:
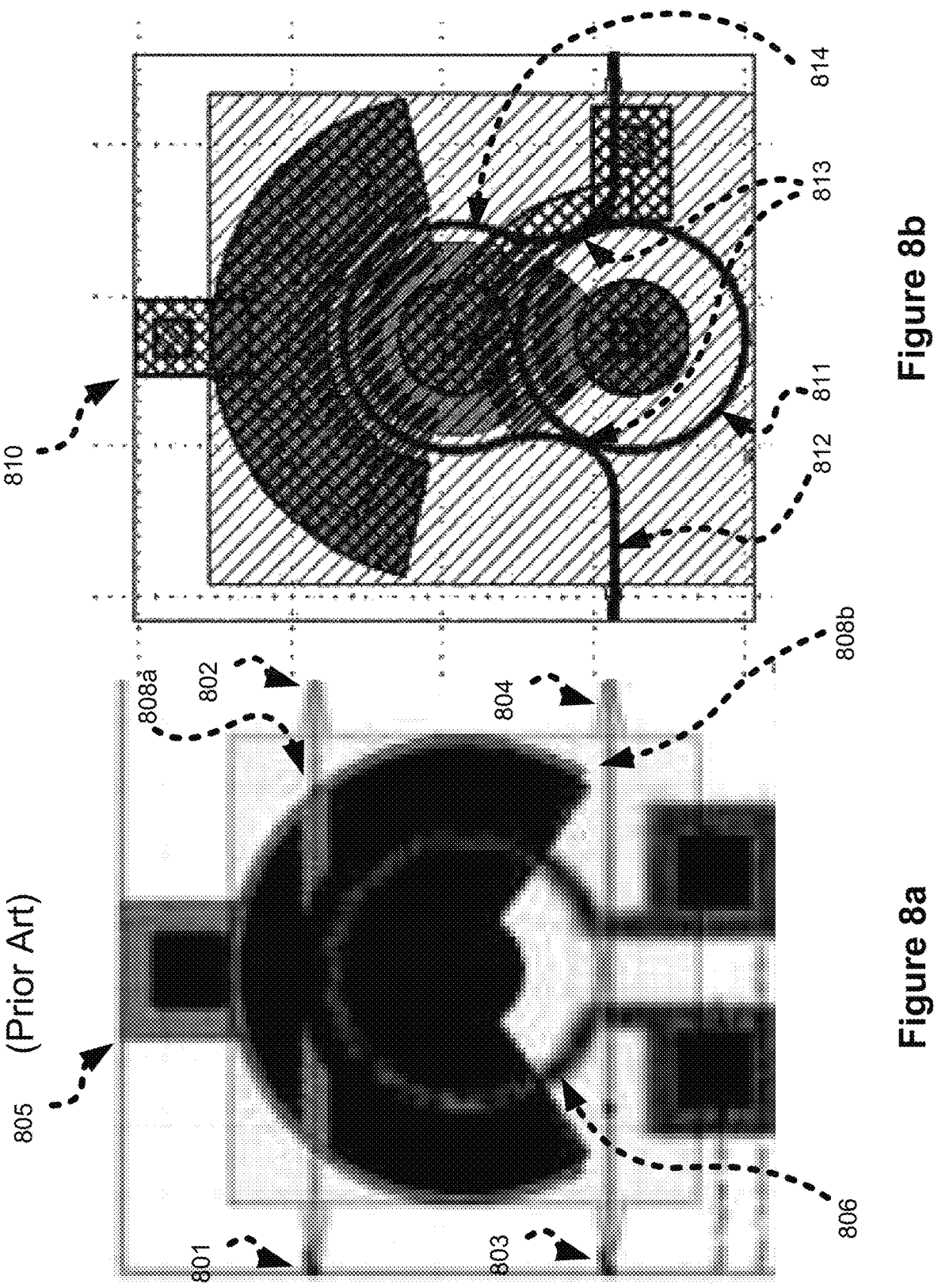
FIG. 8a is a schematic of an MRR modulator, according to prior art.
FIG. 8b is a schematic of an interferometric coupling-based MRR modulator, according to an embodiment.

FIG. 8*a* illustrates a MRR-based modulator 805 without an interferometric coupler 805, for comparison purposes with subsequent FIG. 8*b*. A substantially ring-shaped waveguide 806 is provided and closely coupled to a pair of straight waveguides 808*a*, 808*b* which provide for add, drop and through ports. This device is an add-drop or double-bus MRR-based modulator. The upper one of the two waveguides 808*a*, 808*b* terminates in two ports, referred to as add and drop ports. The lower one of the two waveguides 808*a*, 808*b* also terminates in two ports, referred to as input 803 and through 804 ports. Light received at the input port, if not coupled to the ring waveguide via resonance, will exit at the through port. Light received at the input port, to the extent that it couples to the ring waveguide via resonance, will exit at the drop port 801. An add port 802 is also shown, which may operate similarly to the input port, or else may be used to add light to the drop port 801.

FIG. 8*b* illustrates a MRR-based modulator photonic device 810 with an interferometric coupler, in accordance with an embodiment with an asymmetric IRPH MRR modulator design. A ring waveguide 811 is provided and coupled to a first waveguide 812 at a pair of coupling sites 813. A middle section of the first waveguide 814, extending between the coupling sites, bows away from the ring waveguide. Control elements are operably coupled to both the ring waveguide 811 and the middle section of the first waveguide 814. The first waveguide can terminate in add and through ports.

Due to the in-balanced coupling losses between the two waveguides, the insertion loss (IL) of an interferometric coupler can be high, and this can limit the weight range at the drop and through ports.

Figure 8C:
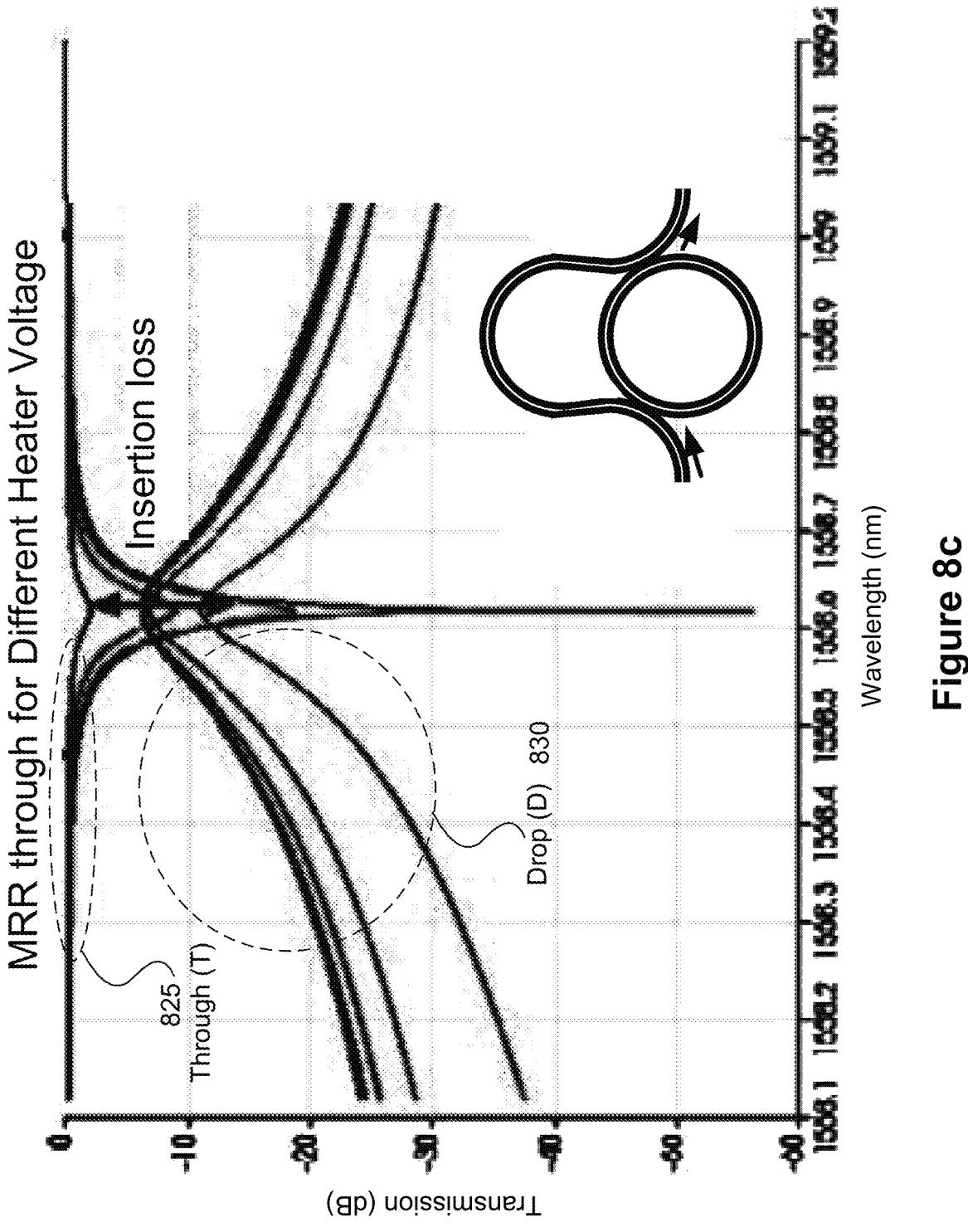
FIG. 8c shows a plurality of transmission spectra for a MRR modulator with an interferometric coupler arm, each spectrum corresponding to the output at either the through port or the drop port, at a different modulation level, according to an embodiment.

FIG. 8c shows a plurality of transmission spectra for a MRR modulator with a single interferometric coupler arm (unbalanced photonic device), according to an embodiment. A first plurality of spectra 825 corresponds to the output at the through port. A second plurality of spectra 825 corresponds to the output at the drop port 830. Each plurality of spectra includes different spectra, at different modulation levels. Both sets of spectra show adjustable extinction ratio while maintaining a same resonant wavelength. That is, the peaks or troughs in the graph all occur at a same wavelength. However, due to intensity control (extinction ratio control), the levels at the peaks or troughs are adjustable by suitable operation of the control elements of the photonic device, in a complementary manner, as previously described. FIG. 8c can be compared with FIG. 9b, which is for an embodiment with two symmetrical interferometric coupler arms, instead of one FIG. 9b shows that an embodiment has a decreased insertion loss.

When a signal propagates from one device to another, a power loss due to imperfect design can be expected. Such power loss can be referred to as an insertion loss. In an embodiment, an insertion loss can be expected between the optical power injected into the device, and the total output optical power (combined power at both through and drop ports) of a MRR modulator.

Figure 8D:
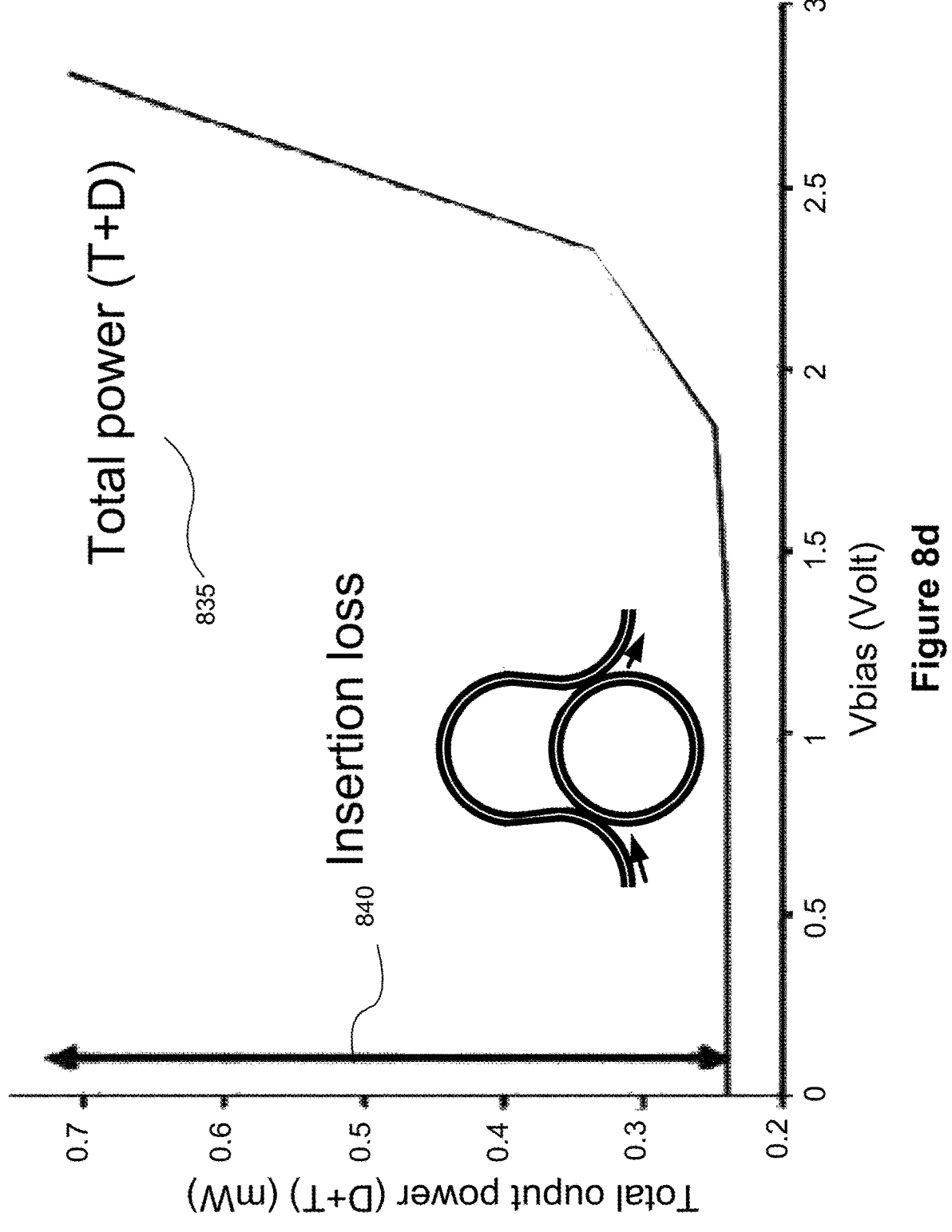
FIG. 8d is a graph of the total power output of a MRR modulator with an interferometric coupler arm as a function of bias voltage, according to an embodiment.

FIG. 8d is a graph of the total power output 835 of a MRR modulator with an interferometric coupler arm as a function of bias voltage, according to an embodiment. The insertion loss 840 in such an embodiment can be higher than desired. The insertion loss may be defined as the discrepancy between the total input power and the total output power of one device. Due to the intrinsic loss mechanism, the total output power will always lower than the input. FIG. 8d shows the total output power of the add-drop photonic device, which contains the power from through port (T) and drop port (D). For example, the input power may be 1 mW, and the total output power may be 0.25 mW (D+T) when the bias voltage ranging from 0 to 1.5V. Accordingly, the insertion loss may be significant when an asymmetric design is used. A symmetric design may improve the insertion loss.

Figure 8E:
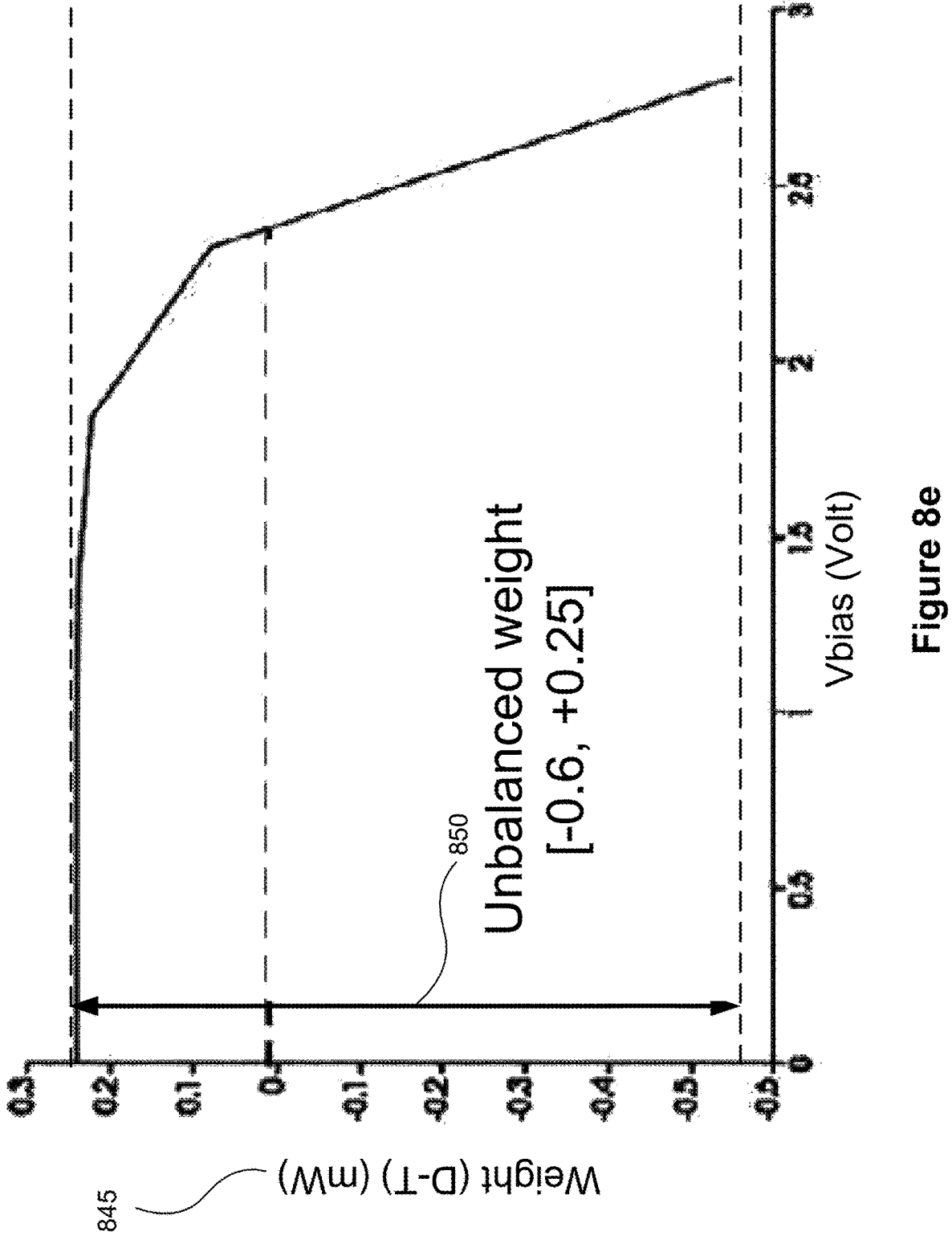
FIG. 8e is a graph of the power output difference between the drop port and the through port of a MRR modulator with an interferometric coupler arm as a function of bias voltage, according to an embodiment.

FIG. 8e is a graph where the weight W 845 of a signal, being the difference between the drop port power D and the through port power T (W=D−T), is shown as a function of a bias voltage applied to a one-arm interferometric coupler-based MRR modulator. The resulting weight range is from −0.6 to 0.25 (mW). This can be is also referred to as an unbalanced weight 850 photonic device.

Figure 8F:
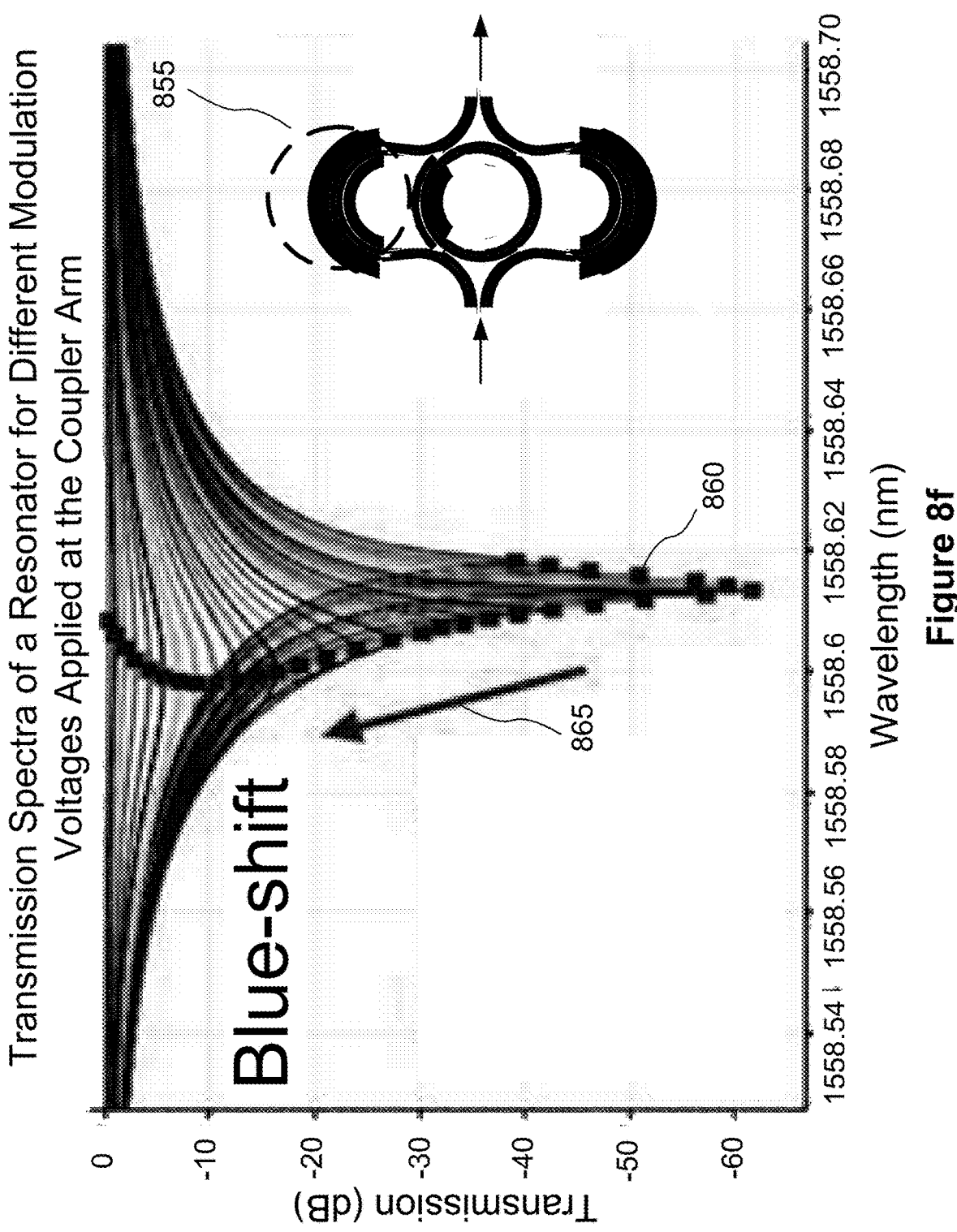
FIG. 8f shows transmission spectra for a simulated MRR modulator having one coupler arms, for different modulation levels applied at the interferometric coupler arm, according to an embodiment.

FIG. 8f shows a series of transmission spectra for a one-armed interferometric coupler-based MRR modulator, where a voltage 855 is applied to the coupler arm of a MRR modulator according to an embodiment. Each square 860 is a peak and they are generally blue-shifted (resonant wavelength is increased) as heater voltage is increased 865.

Figure 8G:
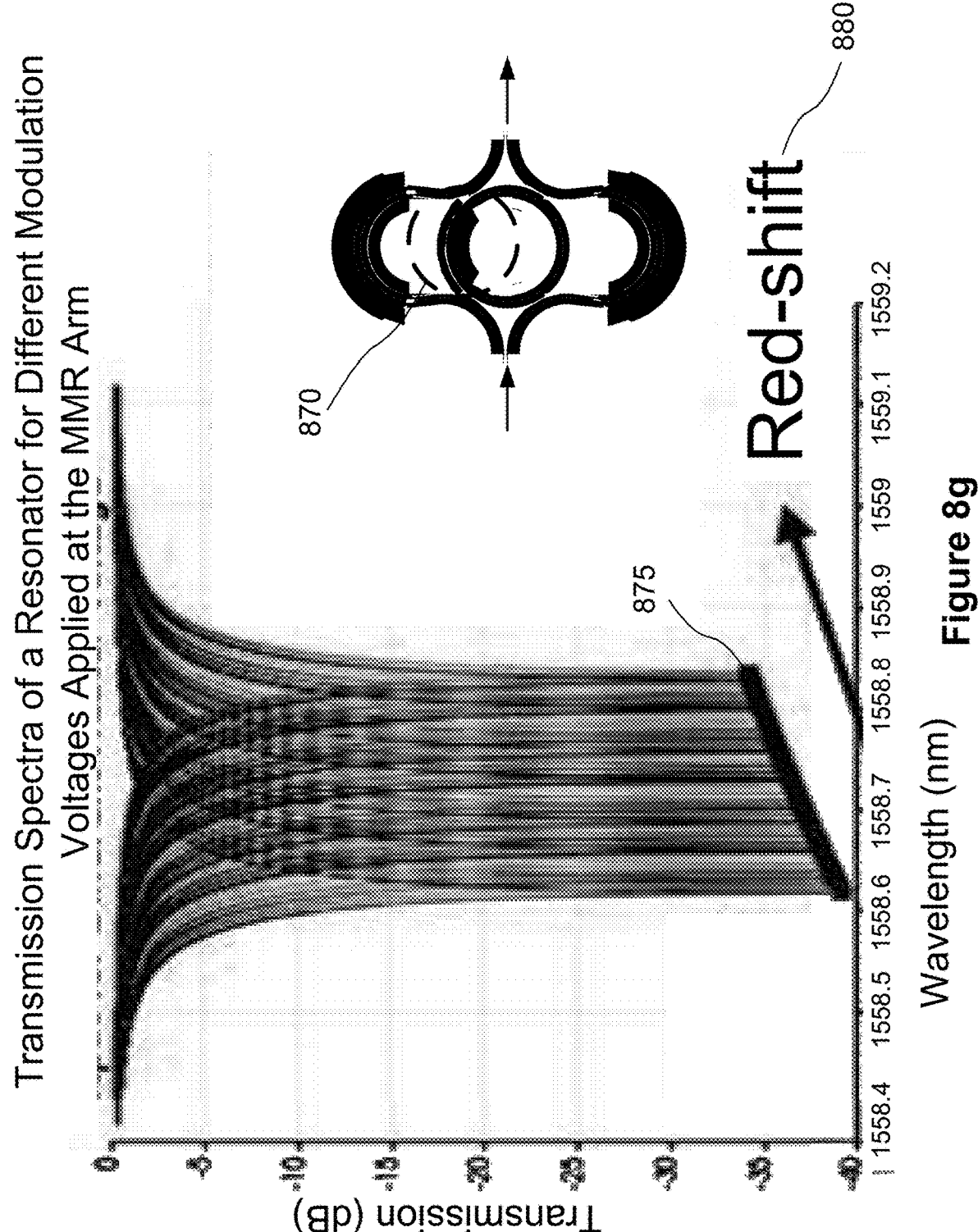
FIG. 8g shows transmission spectra for a simulated MRR modulator, for different modulation levels applied at the MRR, according to an embodiment.

FIG. 8g shows a series of transmission spectra for a one-armed interferometric coupler-based MRR modulator according to an embodiment, where a voltage is applied to the MRR modulator itself 870. Each square 875 is a peak and they are generally red-shifted as heater voltage is increased 880.

Figure 8H:
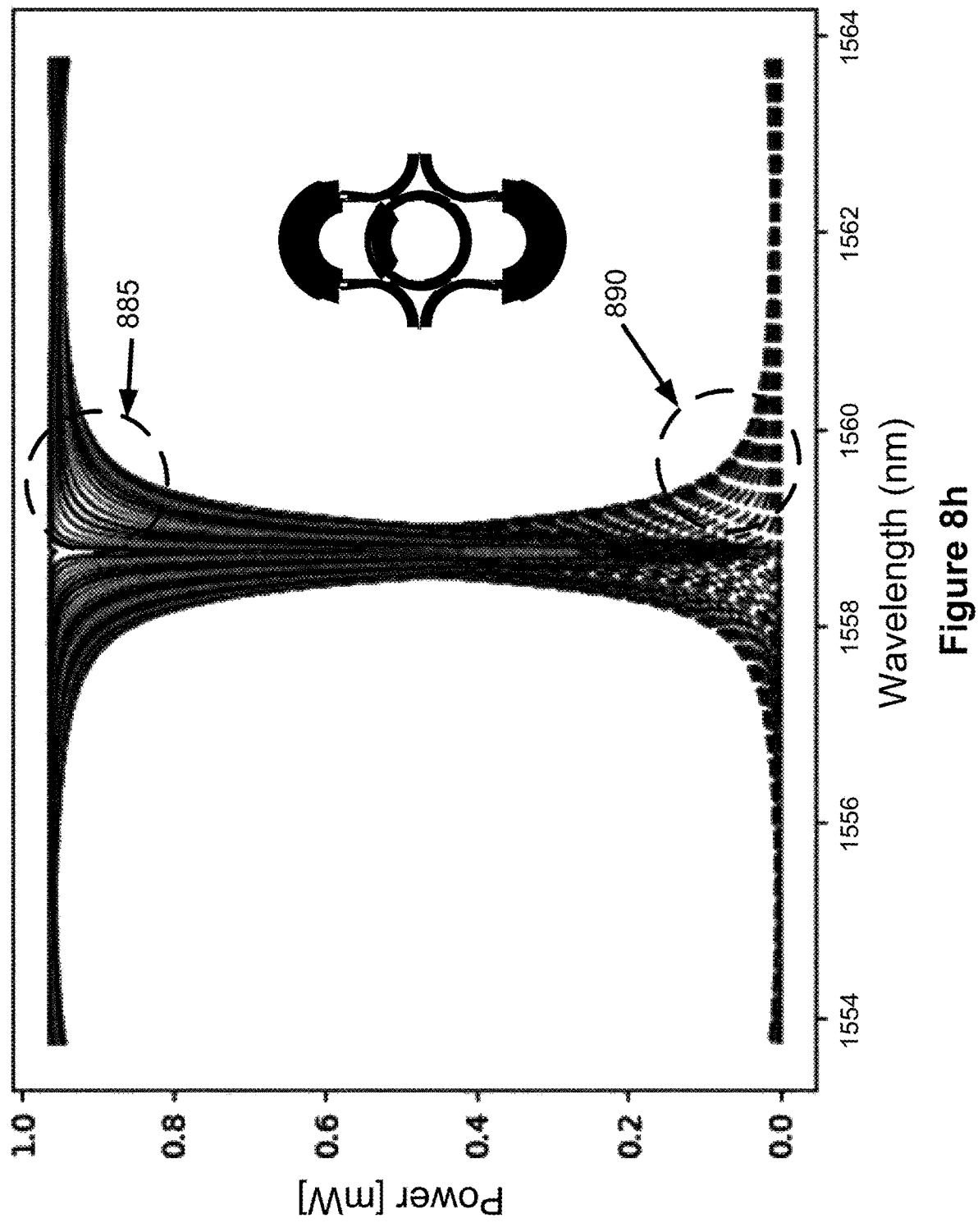
FIG. 8h shows transmission spectra at the drop and through ports of an interferometric-based simulated MRR modulator according to an embodiment, where the wavelength is kept locked through interdependent modulations at the coupler and the MRR.

FIG. 8h shows a series of transmission spectra for a one-armed interferometric coupler-based MRR modulator according to an embodiment. Output power spectra at the through port are shown from the top 885 and output power spectra at the drop port are shown from the bottom 890. The graph peaks remain near a same wavelength because independent tuning according to an embodiment, between the coupler arm and the MRR modulator, allows a user or an automatic control scheme to readjust peak position to a constant wavelength. By tuning two independent modulation elements simultaneously, one for each arm, the intensity of a wavelength of resonance (resonant peak) is changed. This can be referred to as locked wavelength spectra. The graph shows that for any selected power, the wavelength can be left constant.

Figure 8I:
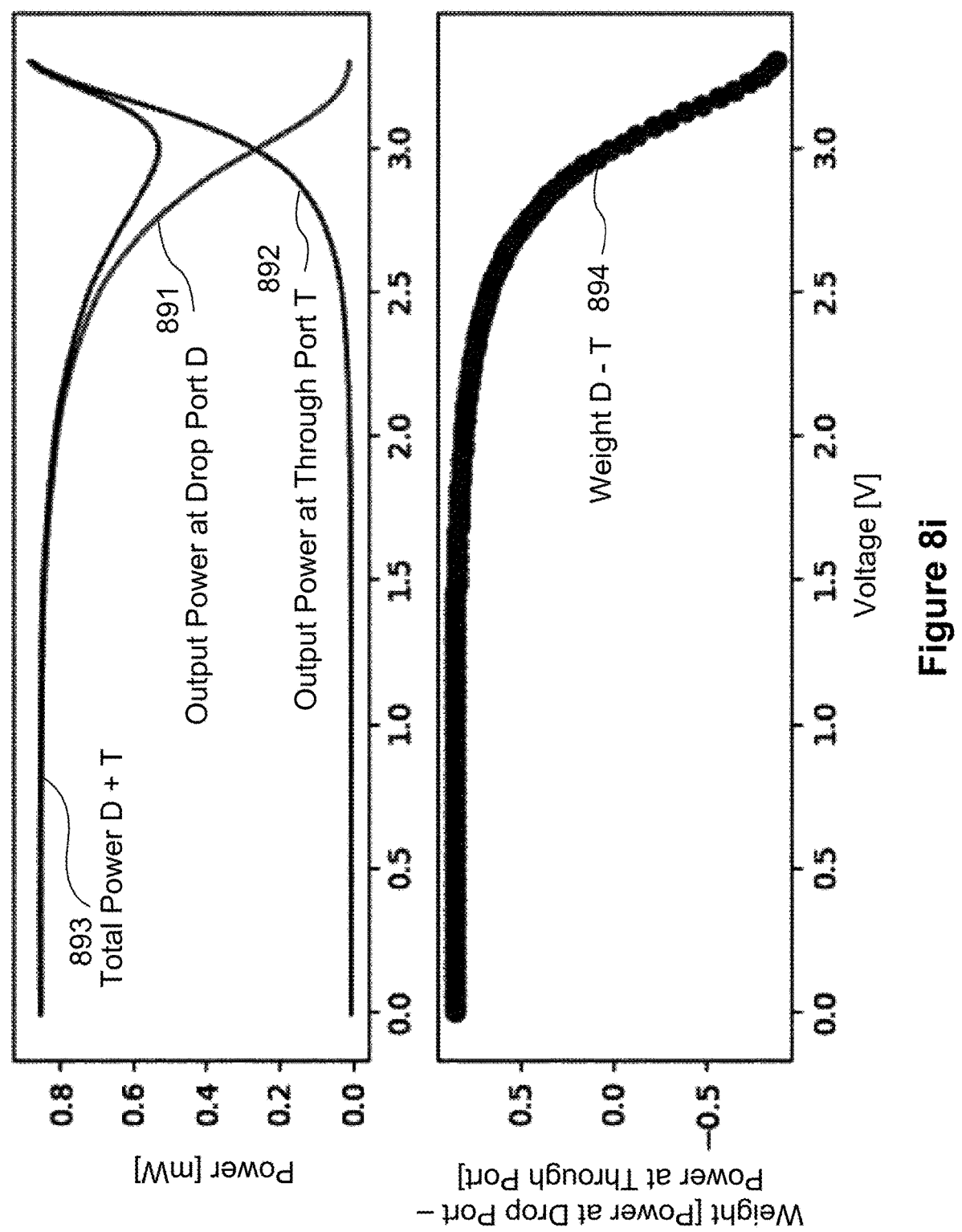
FIG. 8i shows transmission power at the through port and the drop port of a simulated MRR modulator, according to an embodiment.

FIG. 8i shows, as a function of applied voltage to an interferometric coupler-based MRR modulator according to an embodiment, the output power at the drop port 891, the output power at the through port 892, the total output power 893, and the resulting weight 894.

By subtracting the power between drop and through ports, the weight range, which is balanced to 0 with a large swing, can be obtained as a function of the bias voltage applied on coupler's control element. To redistribute the weight range to ±1, a normalization step can be added. Embodiments include a symmetric interferometric coupling-based modulator utilizing the intensity tuning interrogation scheme at the fixed wavelength.

Figure 8J:
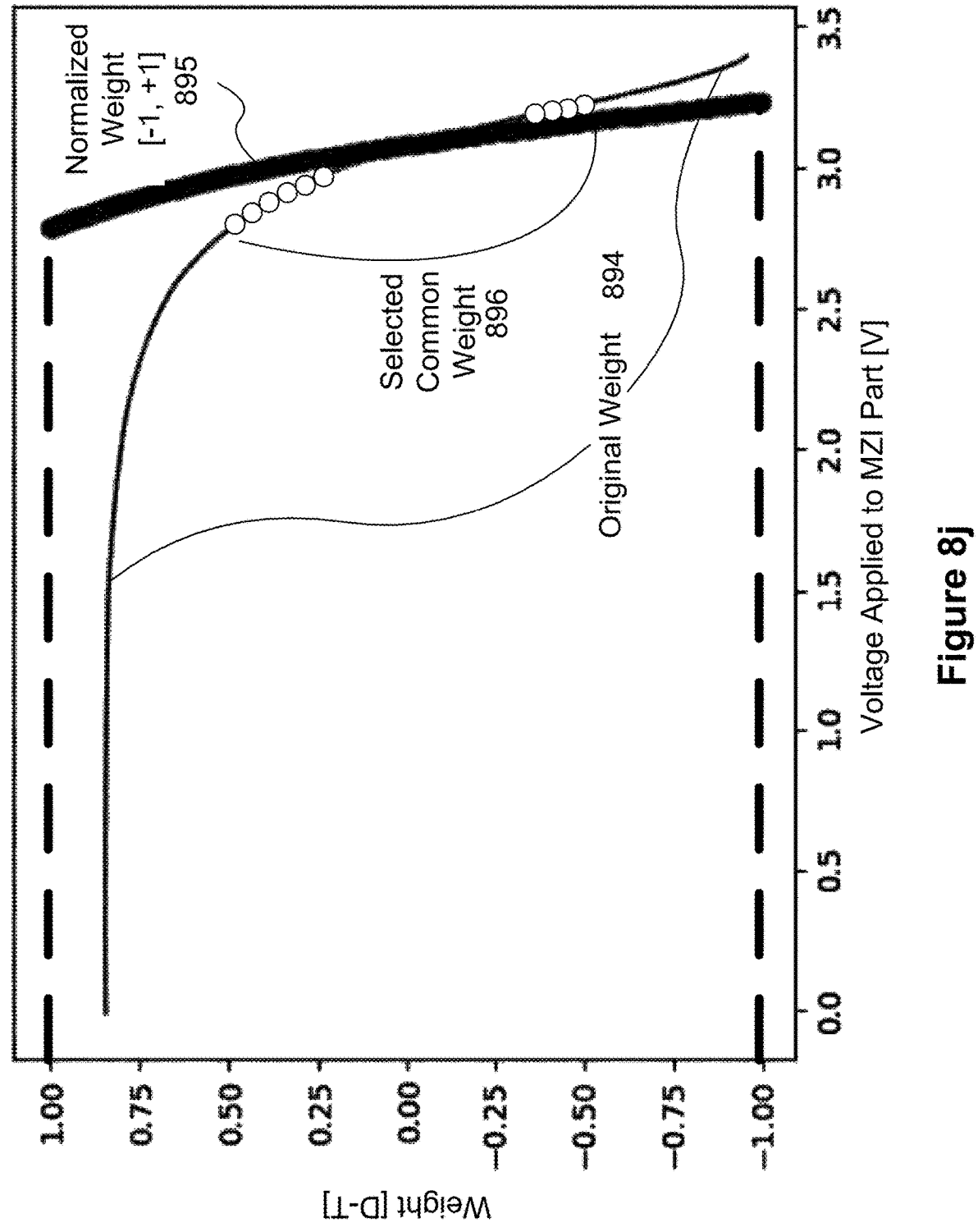
FIG. 8j shows power outputs and weight ranges, after normalization, at the drop and through ports of a simulated MRR, as functions of a bias voltage to a modulating control element, according to an embodiment.

FIG. 8j shows, as a function of applied voltage to the interferometric coupler arm of an MRR modulator according to an embodiment, the resulting original weight 894 as in FIG. 8j, but normalized in a [−1, +1] range 895, using a selection of common weights 896.

In order to limit or minimize the insertion loss (IL) of a modulator, an embodiment of an add-drop interferometric coupling-based modulator can include two coupler arms, positioned on opposite sides of an MRR, and modulation can be performed with a first in-resonator photoconductive heater (IRPH) for both coupler arms, and a second IRPH for the MRR. By separately controlling the first IRPH-control element for the coupler arms and the second IRPH-control element for the MRR, the resonant peak can be shifted in desired direction, or kept at a consistent value. In some embodiments, when tuning with the IRPH in the coupler, the transmission intensity at the through port can change significantly in a range from 0 to −60 dB.

By introducing two symmetric add-drop interferometric couplers to the modulator, the insertion loss of an embodiment can be limited or minimized due to the losses being equal on both arms. This allows the total power from drop and through ports to be relatively constant. The weight values, which can be obtained with a subtraction between the power at the drop port and the power at the through port, can be balanced at a zero point with a larger swing compared to the single arm one. In a "broadcast-and-weight" protocol application, this can be an important consideration.

Figure 9A:
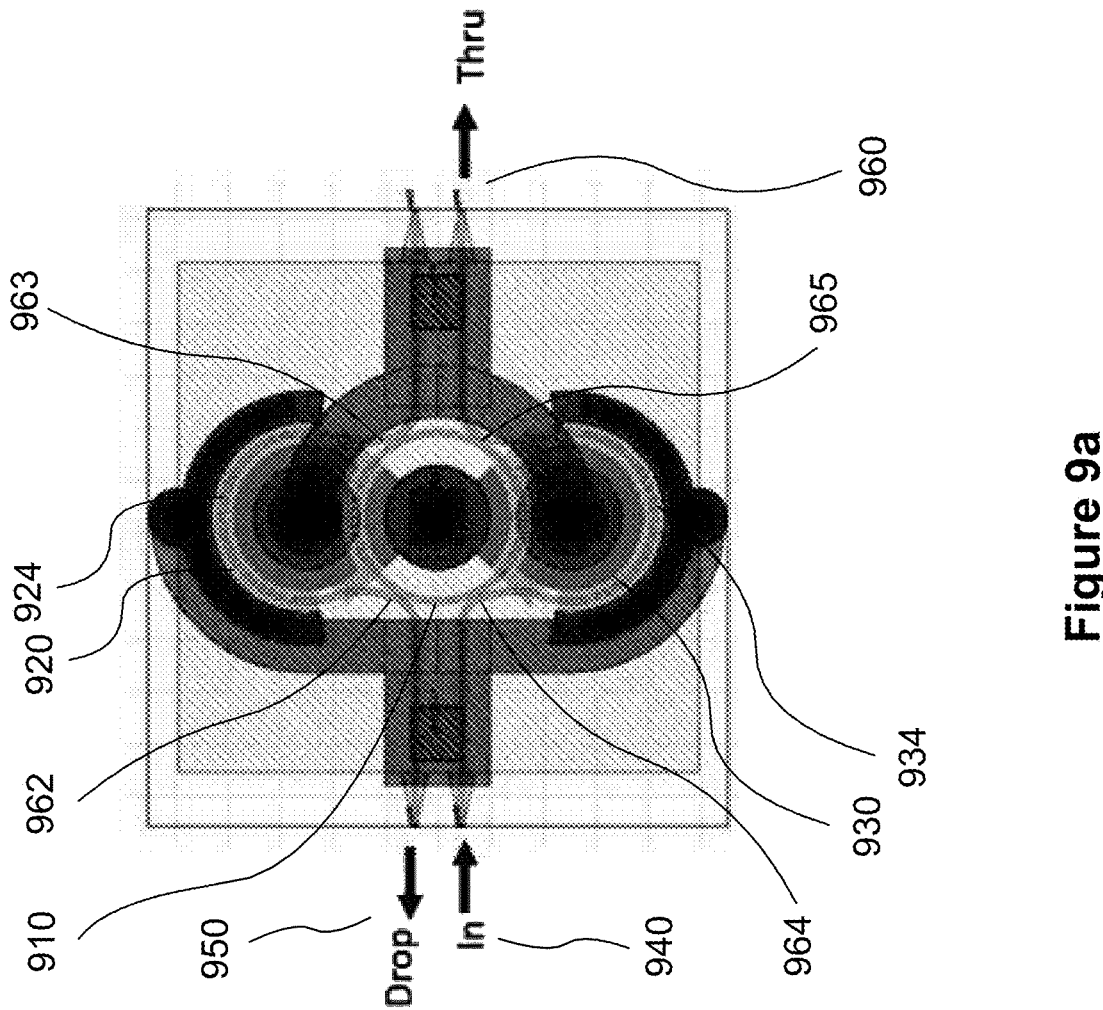
FIG. 9a is a schematic of an interferometric coupling-based MRR modulator having two coupler arms, according to an embodiment.
Figure 9B:
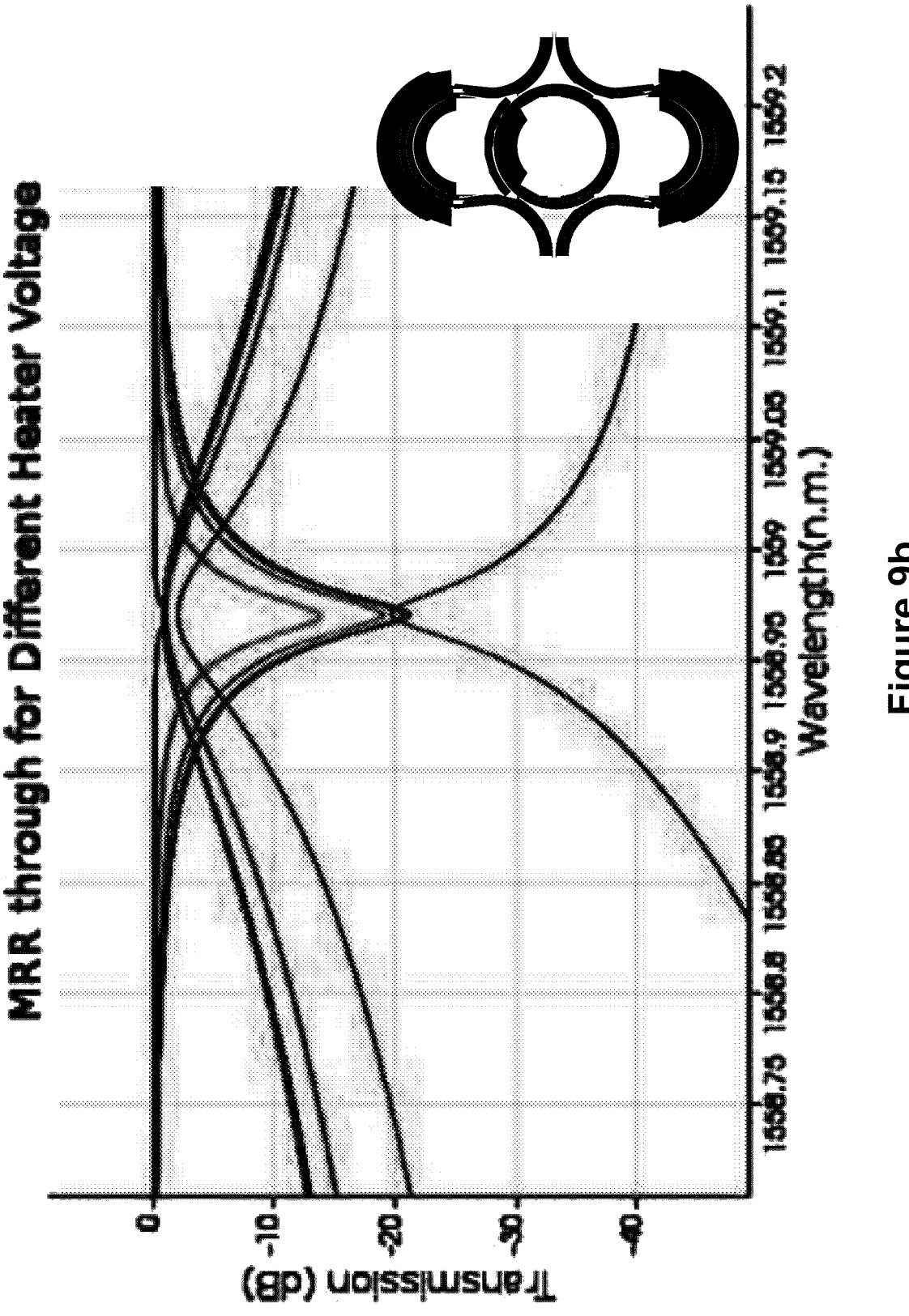
FIG. 9b shows transmission spectra at the through port and the drop port of a simulated MRR modulator for different modulation voltages, according to an embodiment having two symmetrical interferometric couplers that can be heated.

FIG. 9a is a schematic of an MRR modulator with two symmetrical interferometric coupling couplers, according to an embodiment. The apparatus can include a central MRR ring waveguide 910, an upper coupler arm first waveguide 920, a lower coupler arm second waveguide 930, an input port 940, a drop port 950, and a through port 960. The second waveguide 930 has a section which extends to the input port 940 and another section which extends to the through port 960. The first waveguide has a section which extends to the drop port 950. The first waveguide 920 couples to the ring waveguide 910 at a first coupling site 962 and a second coupling site 963. The second waveguide 930 couples to the ring waveguide 910 at a third coupling site 964 and a fourth coupling site 965.

The first waveguide 920 has a middle section 924 which is located between the two other sections of the waveguide, and which extends between the first and second coupling sites, while being bowed, i.e. further away from the ring waveguide than the coupling sites. The second waveguide 930 has another middle section 934 which is located between the two other sections of the second waveguide, and which extends between the third and fourth coupling sites, while being bowed, i.e. further away from the ring waveguide than these coupling sites. Control elements such as PN junction based control elements or IRPH based control elements are operatively coupled to the first waveguide, the second waveguide, and the ring waveguide.

In some embodiments, a single control element is coupled to the ring waveguide and operated in a complementary manner with the control element that is coupled to the first waveguide. This single control element can also be operated in a complementary manner with the control element that is coupled to the second waveguide, for example concurrently or at a different time. In some embodiments, multiple control elements can be coupled to the ring waveguide and either individually or collectively operated in complementary manners with the control elements coupled to the first and second waveguides. For example, the ring waveguide can be coupled to a first control element which is configured for complementary operation with the control element for the first waveguide, and the ring waveguide can be coupled to a second control element which is configured for complementary operation with the control element for the second waveguide.

In more detail, FIG. 9a shows an example of a symmetric photonic device (modulated for example by IRPH control elements). A first portion of the device, which includes the first waveguide 920 and an upper half of the ring waveguide 910, is mirror symmetric with a second portion of the device, which includes the second waveguide 930 and a lower half of the ring waveguide 910.

FIG. 9b shows transmission spectra with bias voltages applied on both IRPH control elements of an interferometric MRR modulator simultaneously, in order to change the output intensity while locking the resonant peak at a fixed wavelength. Because of the symmetric geometry, both add-drop and in-through waveguides have similar propagation losses and coupling losses, which facilitate the low insertion losses at the drop port. A comparison with FIG. 8c shows that with two symmetrical interferometric coupler arms, the insertion loss is reduced.

Figure 9C:
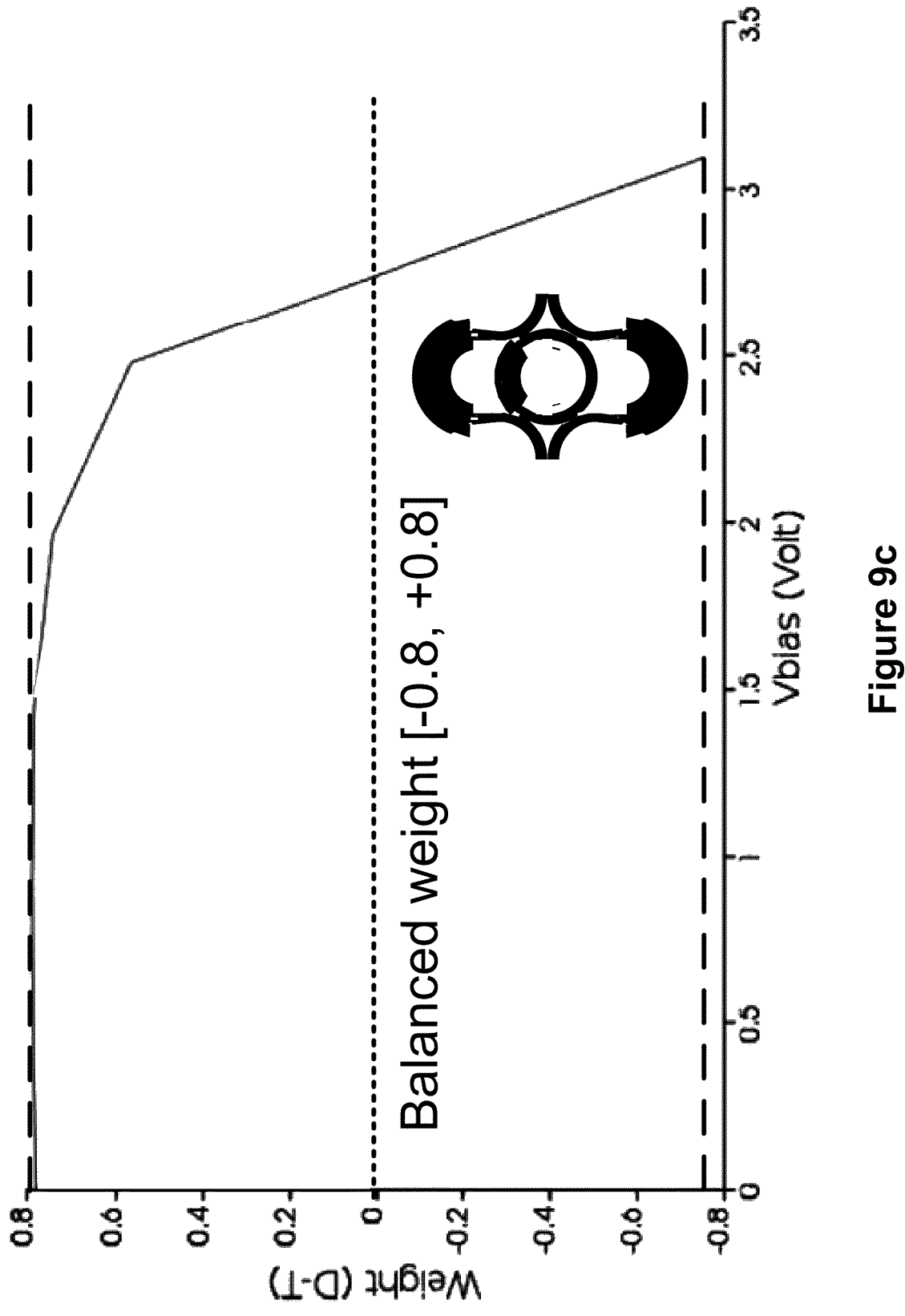
FIG. 9c is a graph of the power output difference between the drop port and the through port of a MRR modulator with two interferometric coupler arms as a function of bias voltage, according to an embodiment.

FIG. 9c shows, as a function of applied voltage to the interferometric coupler arms of an MRR modulator according to an embodiment, the resulting weight in a [−0.8, +0.8] range. The two-arm, symmetric interferometric device, having first and second waveguides coupled to a ring waveguide, can be said to be balanced. The bias voltages are applied to the first and second waveguides (two arms) at the same time. Comparing with FIG. 8e, representing a device with one coupler arm, the weight is much greater with a device having two coupler arms.

In some embodiments, a PN junction can be used to modulate a waveguide, instead of an in-resonator photoconductive heater (IRPH). Compared to a PN junction, an IRPH can have a higher tuning efficiency in that a change in the waveguide's refractive index can be greater for a same applied voltage. However, an IRPH has the drawback of having a low electro-optical bandwidth. The use of a PN junction can increase the electro-optical bandwidth to as high as 40 GHz, which is suitable for high-speed data communication and processing.

In order for embodiments to be applicable in the field of RF-speed communications, which is also critical to artificial neural network (ANN) systems, an embodiment includes a design for an interferometric coupling-based modulator based on at least one PN-junction. In some embodiments, the tuning efficiency of a PN junction can be around 20-50 pm/V, which for some applications is too low. To enhance the modulation efficiency of a PN-junction, some embodiments can include a coupling arm that is much longer than an arm that is simply RR. A PN junction based Mach-Zehnder modulator (MZM) with a longer modulation arm also has a higher tuning efficiency. To reduce the footprint, a longer arm coupler in an embodiment can have a spiral-shaped geometry, and regions of P-doped and N-doped materials can be positioned in parallel to the silicon spiral waveguide to form a PN junction with spiral geometry.

More generally, according to embodiments of the invention, the middle section of one of the waveguides (the portion of a waveguide between two coupling sites where the waveguide couples to the ring waveguide) is elongated. This elongation can be present in embodiments where the control element is a PN junction control element as described above, in order to improve coupling efficiency. However, this elongation can also be present in embodiments using other control elements, such as IRPH or other thermal based control elements. A longer waveguide portion allows for a longer control element, which is accordingly interfaced with the waveguide portion along a longer length. This in turn results in a higher coupling efficiency. A high coupling efficiency facilitates the intensity modulation as described herein. The length of the waveguide portion and corresponding control element (and interface between control element and waveguide portion) can be configured to provide for a predetermined coupling efficiency which is required for a particular application. It is noted that a longer length of the middle section may reduce FSR in some embodiments, and thus the length can be required to be within a particular range suited to the application.

The middle section length and corresponding control element length can be configured to provide for a coupling efficiency which is sufficiently high to facilitate a desired operability of the photonic device. For example, the coupling efficiency can be high enough that the control element, and the photonic device as a whole, can swing all of its input optical power between two output ports (e.g. drop and through ports). This in turn can be achieved by having sufficient coupling efficiency that substantially all of the optical power (a maximum value) is coupled into the ring waveguide at one extreme of operation, and substantially none of the optical power (a minimum value) is coupled into the ring waveguide at another extreme of operation.

The elongation of waveguide middle section can be achieved while also maintaining a limited two-dimensional footprint of the waveguide middle section. That is, the middle section can be bent back on itself or otherwise twisted and turned to fit within a limited area. This can be achieved by shaping part or all of the middle section as a spiral or meander line for example. More generally, by incorporating two, three or more opposing bends into the middle section waveguide, the footprint can be limited. In other words, a compact footprint for the middle section, and the device as a whole, can be achieved. A first bend and a second bend can be considered opposing when one bend is to the left and another is to the right, when travelling along the middle section waveguide in a same direction. It can be seen that the illustrated spiral shaped middle section waveguide has two such opposing bends. The spiral shape may be particularly employed where the control element is PN junction based.

Figure 10A:
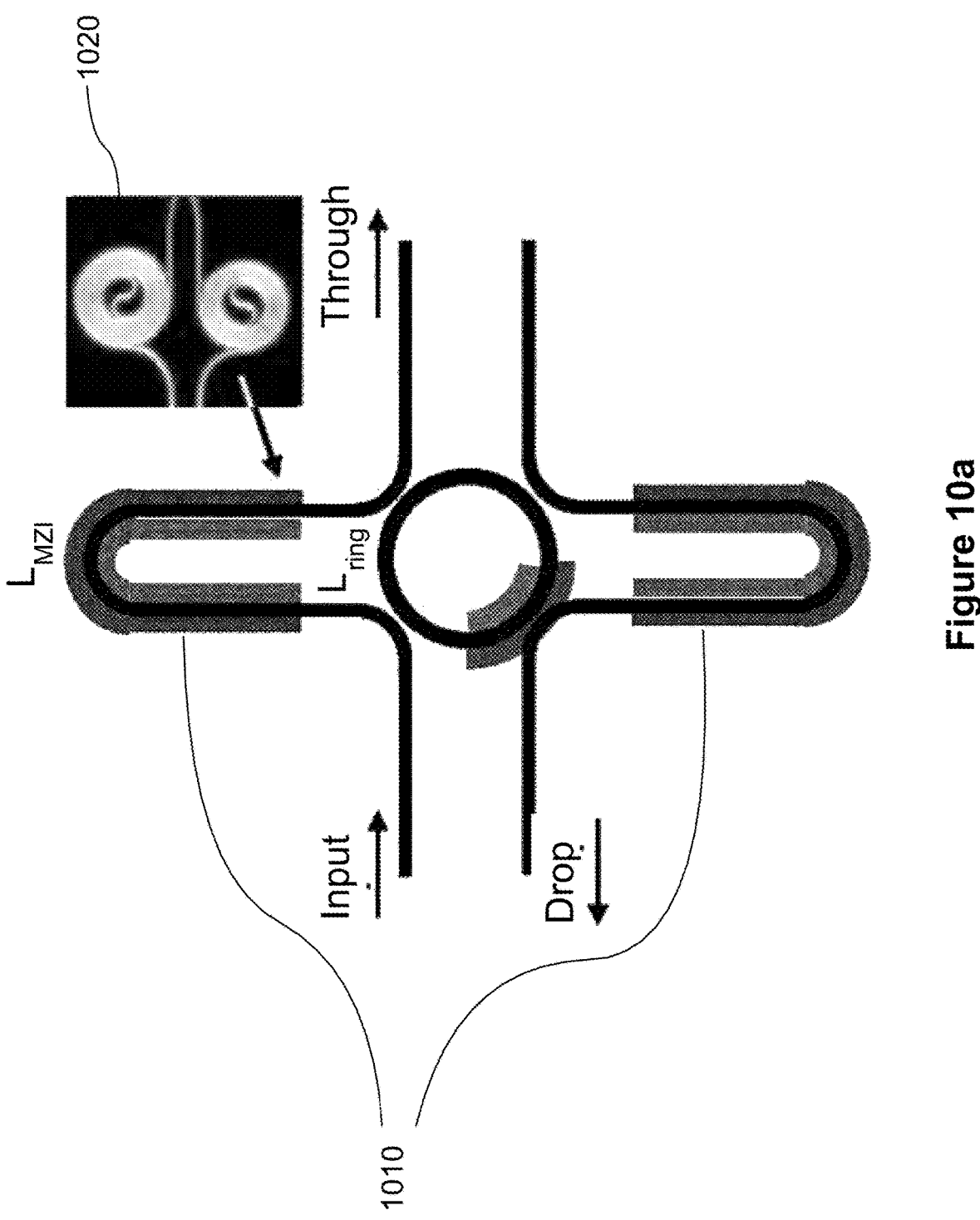
FIG. 10a is a schematic of an interferometric coupling-based MRR modulator having two coupler arms, according to an embodiment where the arms are elongated (e.g. to facilitate higher modulation efficiency) and optionally spiraled in order to reduce their footprint.
Figure 10A:
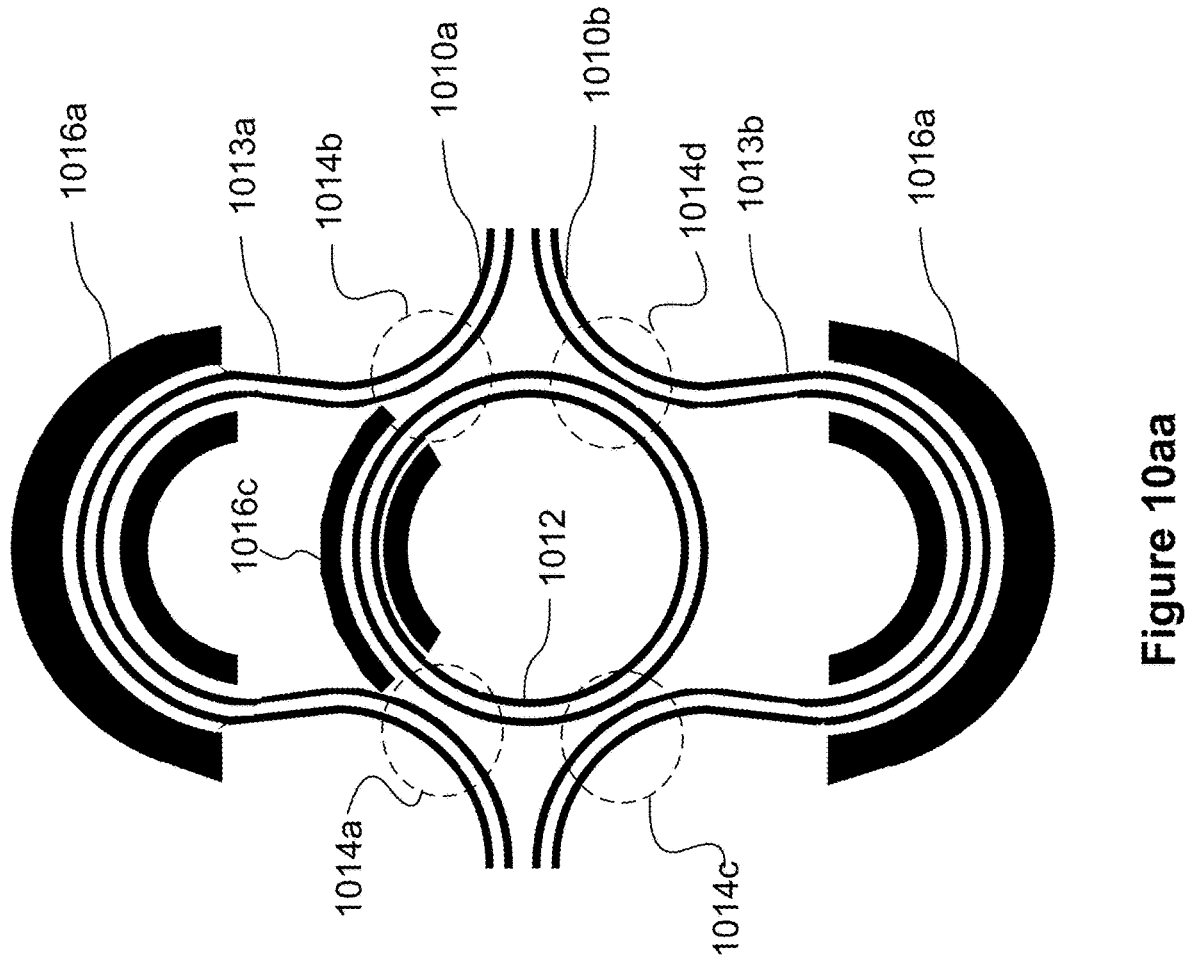

FIG. 10a illustrates a PN-junction based interferometric coupling-based modulator, according to an embodiment, where the coupler arms are long and spiraled. In an embodiment, two coupler arms 1010 are positioned symmetrically on either side of an MRR and the modulation is applied with a PN junction with spiral geometry shown in an insert 1020. The insert 1020 in FIG. 10a shows the cross-section of the spiral PN-junction, where P and N doping regions follow the spiral waveguide in parallel.

FIG. 10aa illustrates an interferometric coupling-based modulator (photonic device) according to an embodiment which is similar to FIG. 10a. A first coupler arm (waveguide) 1010a and a second coupler arm (waveguide) 1010b are coupled to an MRR (ring waveguide) 1012. The first waveguide 1010a is coupled to the ring waveguide 1012 at two coupling sites 1014a, 1014b. The second waveguide 1010b is coupled to the ring waveguide 1012 at two coupling sites 1014c, 1014d. The first waveguide 1010a has a middle section 1013a extending between and bowing away from the coupling sites 1014a, 1014b. The second waveguide 1010b has a middle section 1013b extending between and bowing away from the coupling sites 1014c, 1014d. A first control element 1016a is coupled to the middle section 1010a of the first waveguide, a second control element 1016b is coupled to the middle section 1010b of the second waveguide, and a further control element 1016c is coupled to the ring wave-guide. The first control element and the further control element are operated in a complementary manner to perform extinction ratio adjustments at a fixed wavelength. The second control element and the further control element may additionally be operated in a complementary manner to perform extinction ratio adjustments at a fixed wavelength.

Figure 10B:
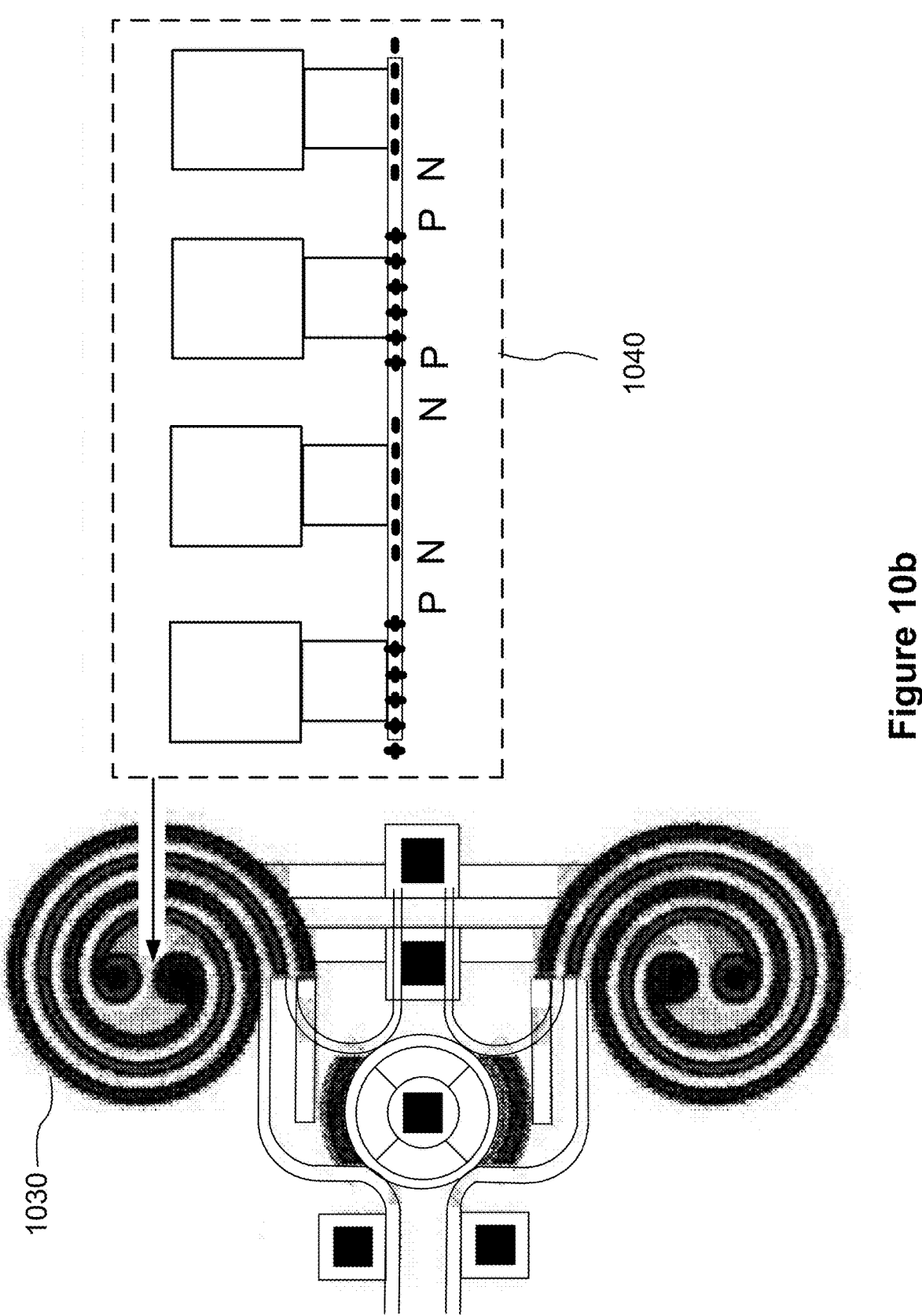
FIG. 10b is a schematic of an interferometric coupling-based MRR modulator having two spiral coupler arms with PN junctions, according to an embodiment.

FIG. 10b is a schematic of a symmetric interferometric coupling-based MRR modulator with a symmetrical pair of spiral PN junctions 1030 as the modulation components in the couplers. The insert image 1040 is a cross-section of the spiral PN-waveguide, where P and N doping regions run parallel to the spiral waveguide.

Simulation results show that an embodiment using a coupler arm that is twenty (20) times longer than the MRR part (ring waveguide) can achieve a larger intensity modulation than one where the coupler arm only $\pi R$ longer. In the first a case, a variation of approximately 30 percentage points can be achieved, while in the second case, the variation is approximately 12 percentage points. This corresponds to ranges from −30 dB to −60 dB.

Accordingly, in various embodiments, the waveguide middle section has an extended portion, along which the middle section is coupled to a control element, where the middle section, including the extended portion is at least 5 times longer than the ring waveguide, at least 10 times longer than the ring waveguide, or at least 20 times longer than the ring waveguide. The length of the middle section can be configured to provide for at least a given coupling efficiency. The coupling efficiency can be given by require-ments of the application, modulation schemes in use, and type of control elements in use.

Figure 10C:
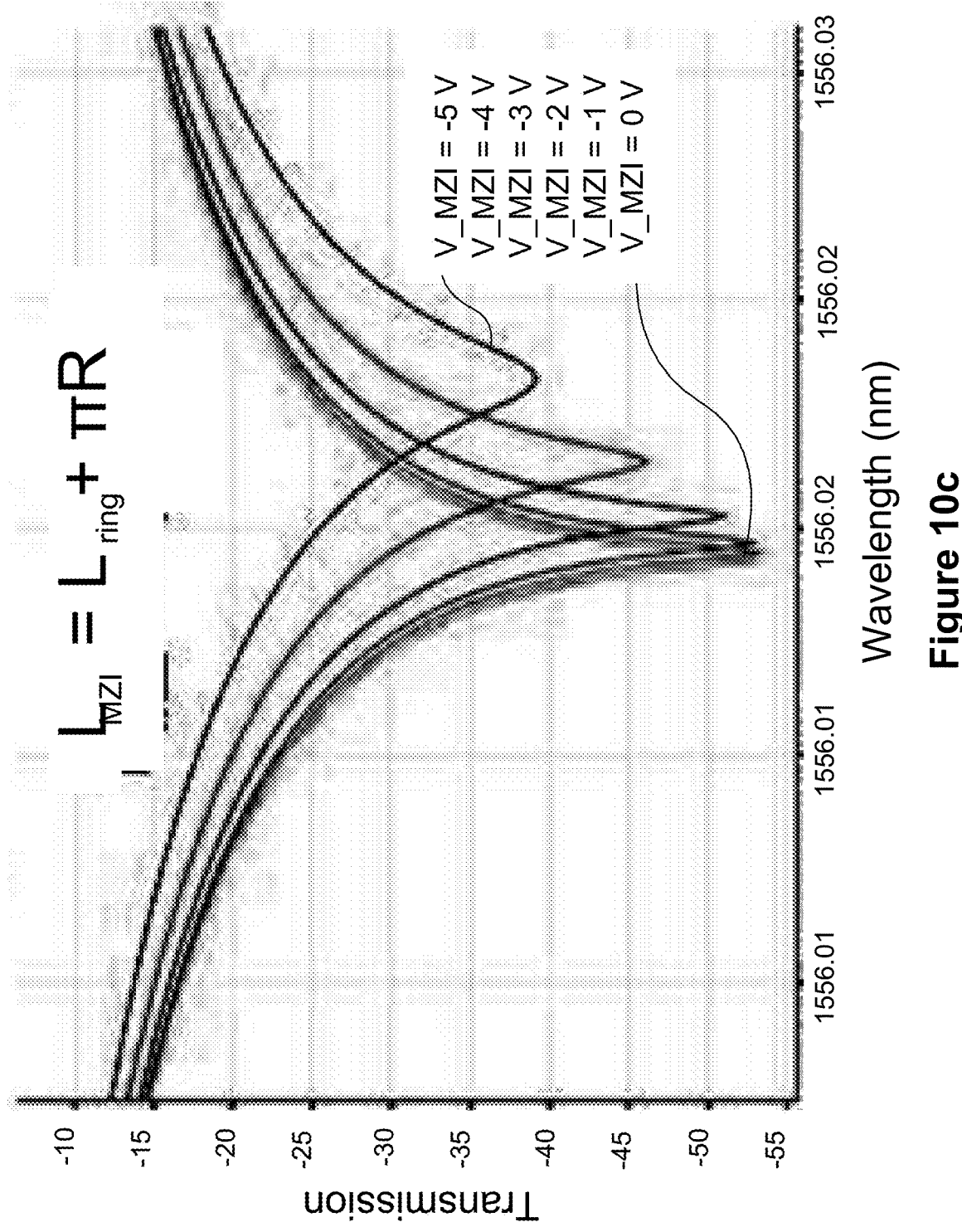
FIG. 10c shows transmission spectra of a simulated PN-junction-based interferometric coupling-based MRR modulator, as a function of bias voltages, where the upper coupler arm RR longer than the MRR circumference, R being the MRR radius, according to an embodiment.
Figure 10D:
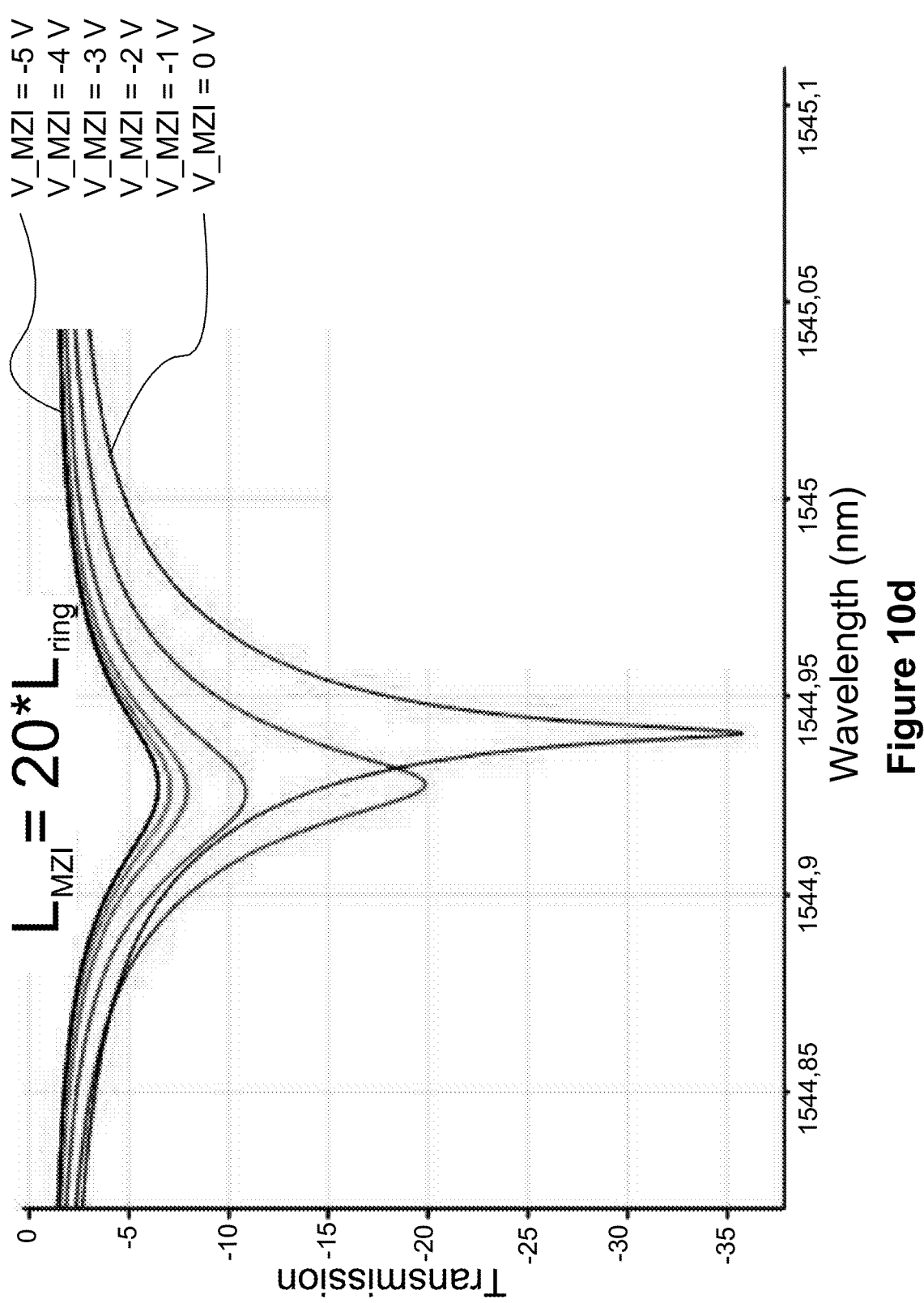
FIG. 10d shows transmission spectra of a simulated PN-junction-based interferometric coupling-based MRR modulator, as a function of bias voltages, where the upper coupler arm is 20 times the length of the MRR circumference, according to an embodiment.

FIG. 10c shows transmission spectra of a simulated PN-junction-based interferometric coupling-based MRR modulator, as a function of bias voltages, where the upper coupler arm is $\pi R$ longer than the MRR circumference 2R, as a comparison reference for subsequent FIG. 10d. It can be seen that the transmission modulation from 0V to −5V varies from about −39% to −53%, a difference of 14 percentage points.

FIG. 10d shows transmission spectra of a simulated PN-junction-based interferometric coupling-based MRR modulator, as a function of bias voltages, where the upper coupler arm is 20 times the length of the MRR circumference 2R. It can be seen that the transmission modulation from 0V to −5V varies from about −7% to −35%, a difference of 28 percentage points that is significantly greater than in the shorter MZI arm case of FIG. 10c.

Some embodiments include a single-bus interferometric coupling-based modulator. But to satisfy the weight bank requirements for large-scale "broadcast-and-weight" proto-col applications, they eliminate the insertion losses inside the resonator, and offer a larger balanced weight range. Other embodiments include two or more add-drop buses instead of a single-bus.

Further, in order to allow RF-signal modulation, some embodiments include a spiraling upper coupler arm and a spiraling PN-junction. These embodiments can increase the electro-optical speed (i.e. frequency) up to 40 GHz.

Figure 11:
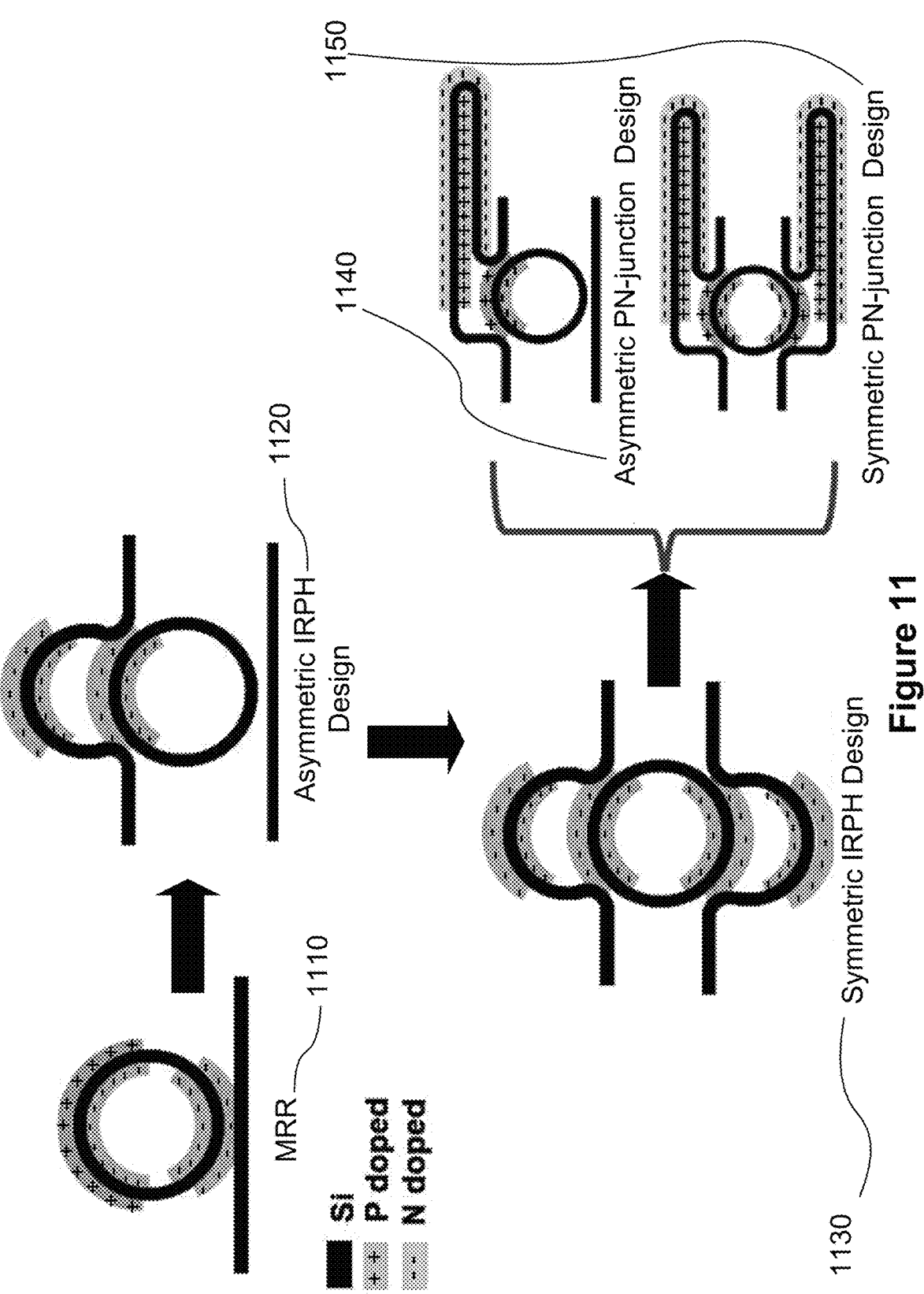
FIG. 11 is a roadmap showing how interferometric coupling-based MRR modulators, according to embodiments, can be used for the development of further embodiments.

FIG. 11 represents a roadmap for the development of embodiments for interferometric coupling-based MRR modulators. In the roadmap, once a MRR 1110 is acceptably produced, an asymmetric design with a MZI coupler arm 1120 can be developed. Then, a symmetric IRPH design 1130 can be developed. Then, a PN junction MRR design can be realized with either an asymmetric 1140 or a sym-metric 1150 configuration.

A modulator with a coupler arm according to embodi-ments can be used as a component to build up a large system, which as a result is also an embodiment. Due to a cross-talk issue existing in modulators based on wavelength tuning, it can be difficult to use MRR modulators for building a large system without them being subject to any optical interac-tions. This is especially true when hundreds or thousands of wavelength tuning modulators are operated at the same time. However, by using interferometric coupling-based modula-tors based on an intensity tuning scheme according to an embodiment, the optical cross-talk issue can be resolved.

Multiple interferometric coupling-based modulators based on an intensity tuning scheme according to an embodiment, can be used to build a computing system. Due to the intensity tuning mechanism having no wavelength drifting, there are no cross-talk issues. This enables each modulator to have a large Optical Modulation Amplitude (OMA), which can be critical when a driver applied in the system has a lower resolution.

In an embodiment, multiple interferometric coupling-based modulators based on an intensity tuning scheme according to an embodiment, are used to build a large-scale artificial neural network system (ANN) system.

The performance in terms of cross-talk of an optical modulation system according to an embodiment can be evaluated by comparing it to another type.

In a reference system, three MRRs, each having a differ-ent radius, are connected in series. Each MRR, because of its distinct radius, transmits a light signal at a wavelength that corresponds to the MRR's radius and the MRR's resonance wavelength. Each MRR therefore corresponds to a wave-length channel. The output of each MRR is a spectrum with a Lorentzian profile the center of which is the resonant wavelength of the MRR. The output of three MRR con-nected in series is therefore three consecutive Lorentzian curves, each of which representing a channel.

Figure 12A:
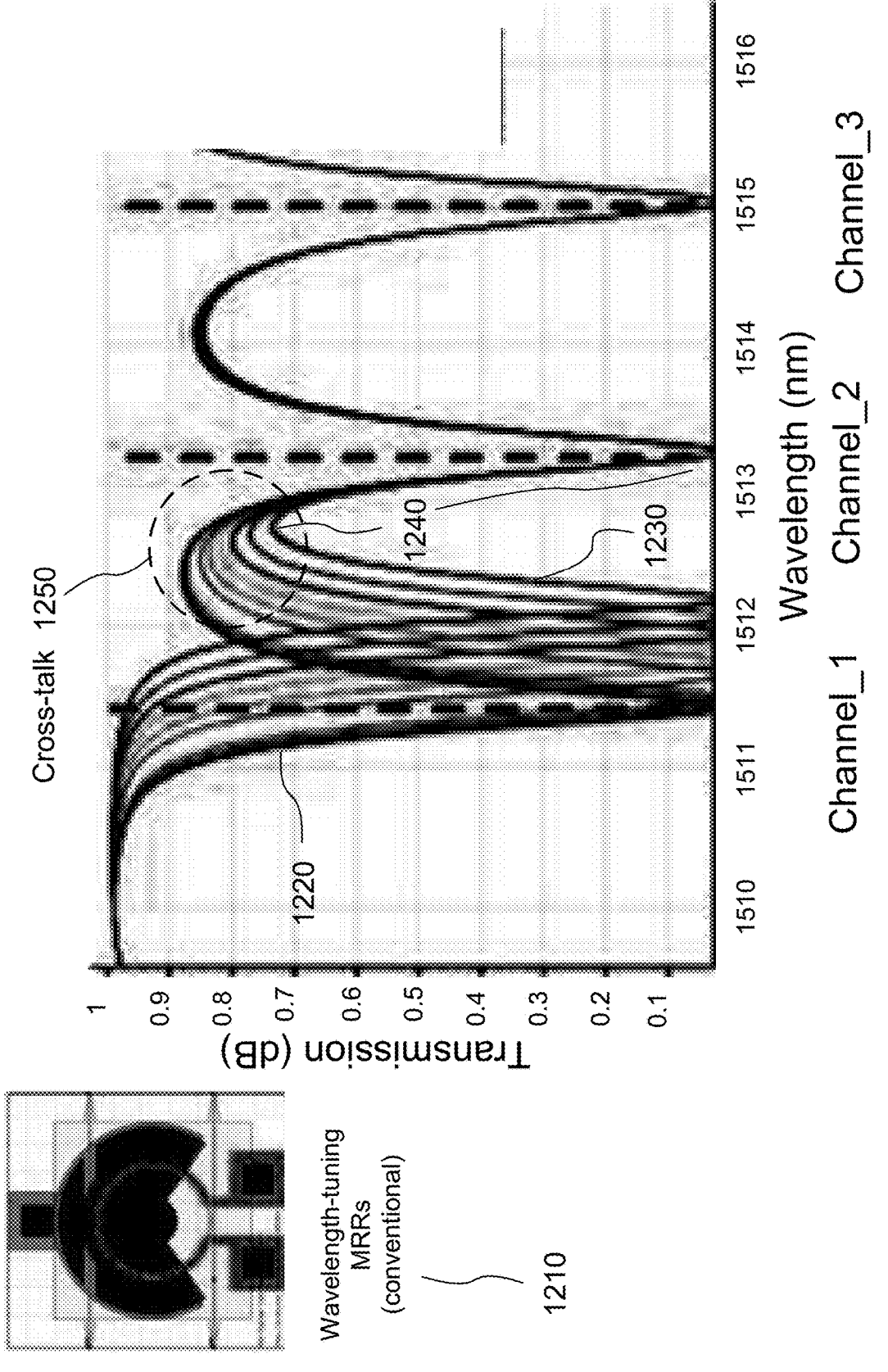
FIG. 12a is a spectral curve at the output of a simulated reference system containing a cascade of three connected MRR's, and where modulation of Channel_1 influences the optical modulation amplitude (OMA) of Channel_2.

FIG. 12*a* shows the spectral curve 1220 at the output of the three connected MRR's 1210 of a simulated reference system. When the intensity of Channel 1 is modulated, the peak wavelength of Channel 1 is also modulated, i.e. the curve shifts to the right 1230. Because of the Lorentzian shape of the curve, the forward tail overlaps the curve of Channel 2, and this diminishes the vertical distance 1240 between a minimum and a maximum in Channel 2, the vertical distance being Channel 2's optical modulation amplitude (OMA). This overlap is referred to as optical cross-talk 1250.

Figure 12B:
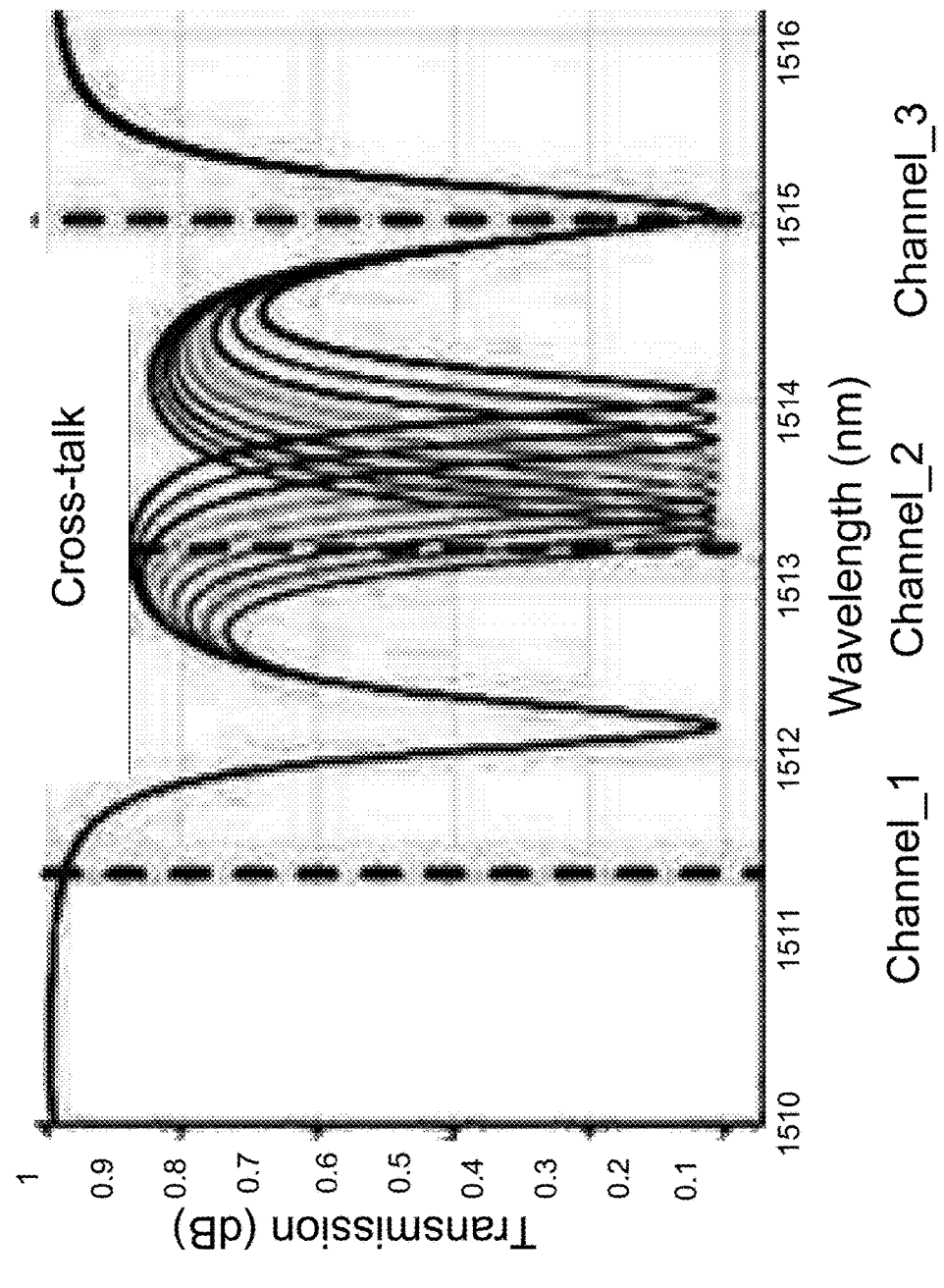
FIG. 12b is a spectral curve at the output of a simulated reference system containing a cascade of three connected MRR's, and where modulation of Channel_2 influences the optical modulation amplitude (OMA) of Channel_3.

FIG. 12*b* shows the spectral curve at the output of the three connected MRR's of a simulated reference system. Similarly to FIG. 12*a*, when the intensity of Channel 2 is modulated, the peak wavelength of Channel 2 is also modulated and because of the Lorentzian shape of the curve, the forward tail of Channel 2 overlaps the curve of Channel 3.

Figure 12C:
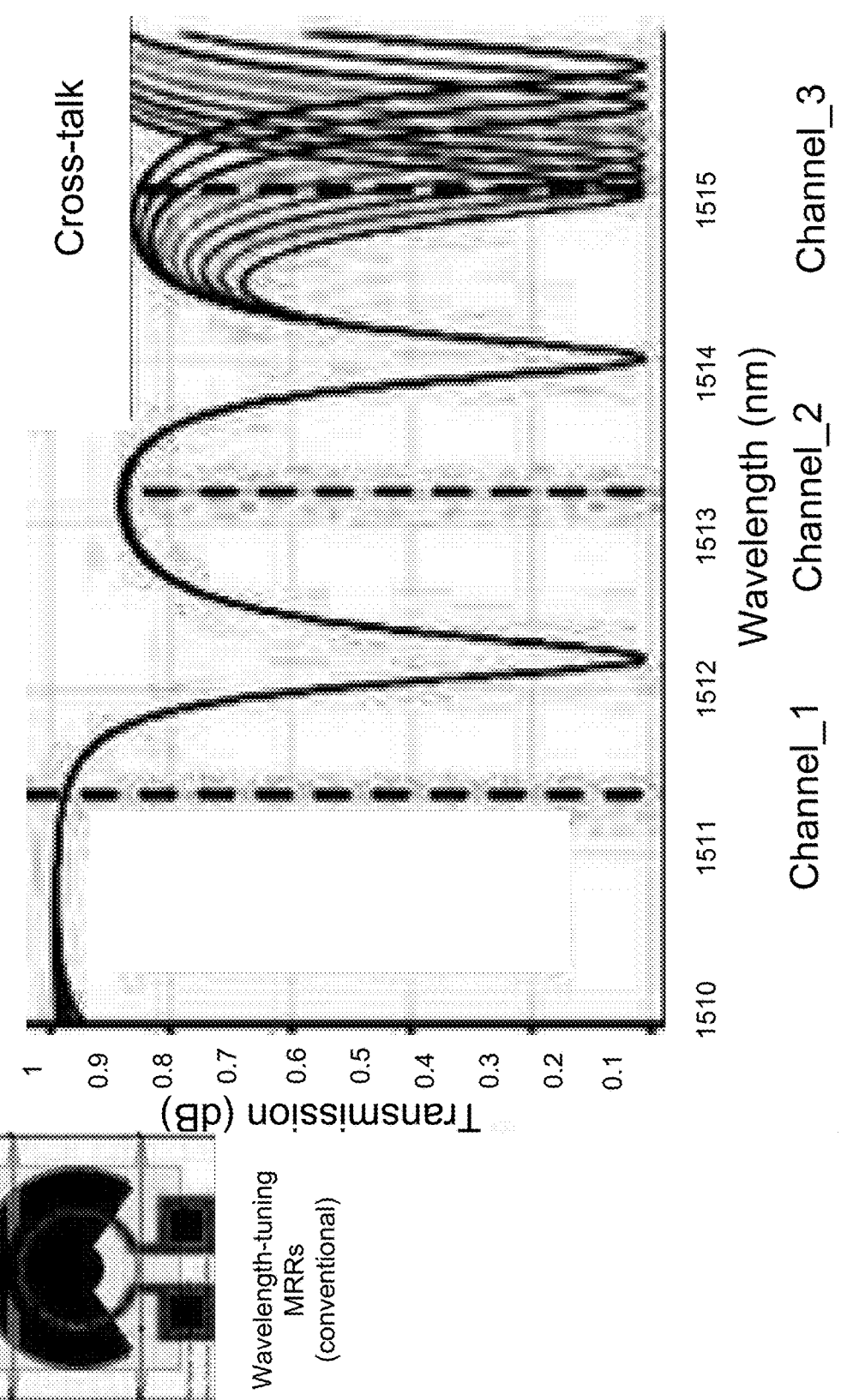
FIG. 12c is a spectral curve at the output of a simulated reference system containing a cascade of three connected MRR's, and where modulation of Channel_3 influences the optical modulation amplitude (OMA) of an unseen adjacent channel on the right.

FIG. 12*c* shows the spectral curve at the output of the three connected MRR's of a simulated reference system. Similarly to FIGS. 12*a* and 12*b*, when the intensity of Channel 3 is modulated, the peak wavelength of Channel 3 is also modulated.

In a system according to an embodiment, three MRRs, each having a different radius, are connected in series. According to an embodiment, each MRR is interfaced with a pair of coupler arms, one on either side of the MRR symmetrically, and each coupler arm is interfaced at two points of an MRR. The presence of coupler arms is to allow wavelength tuning for preventing wavelength shifting, and the symmetrical pairing is to minimize and balance insertion losses at the interfaces between coupler arms and MRRs. In such a system, cross-talk between the channels, each one corresponding to a different MRR radius, can be reduced or even eliminated.

Figure 13A:
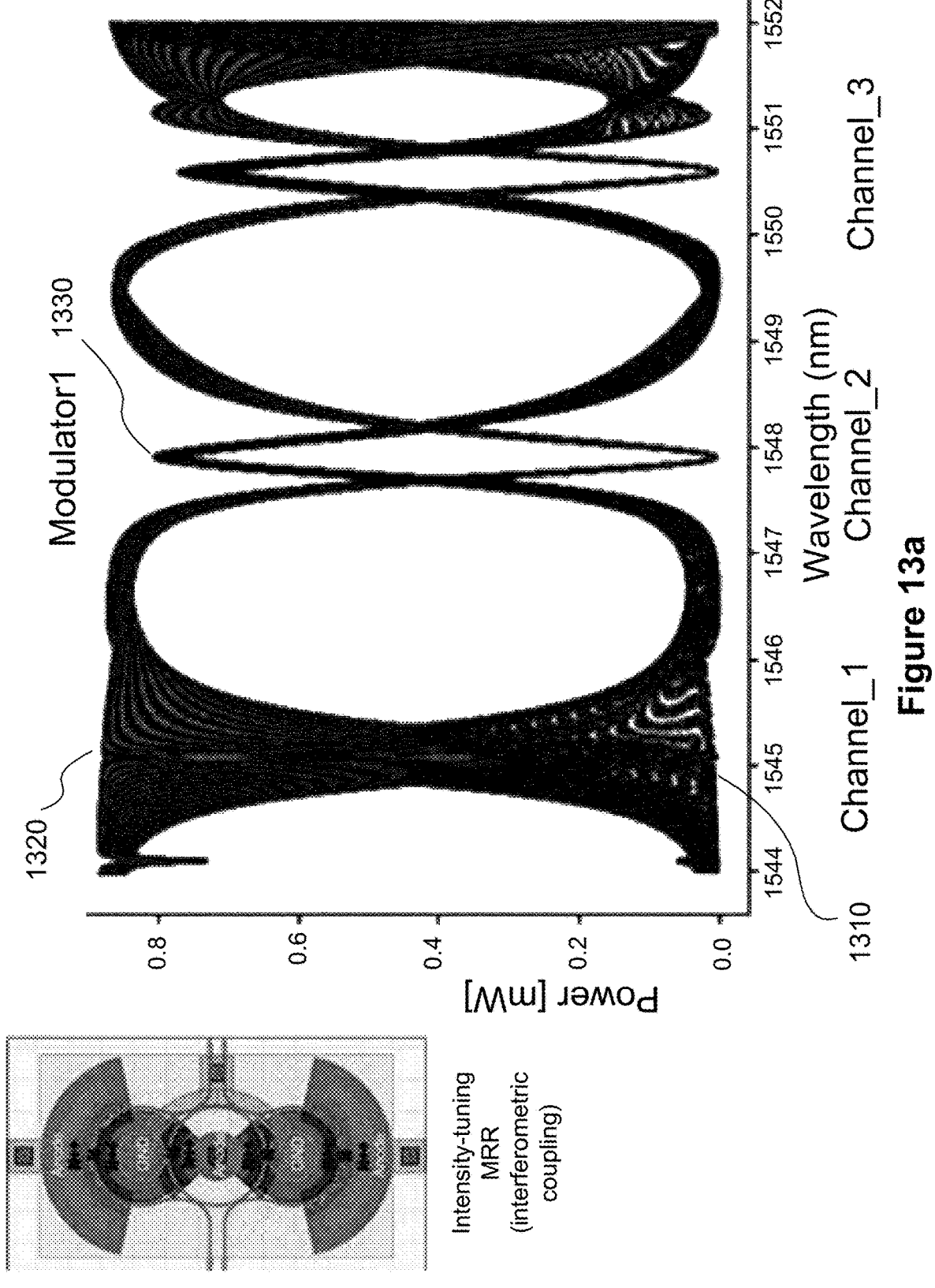
FIG. 13a is a spectral curve at the output of a simulated embodiment containing a cascade of three connected MRR's, and where modulation of Channel_1 does not influence does not influence the OMA of Channel_2.

FIG. 13*a* shows the spectral curve at the output of the three connected MRR's, according to a simulated, symmetrical embodiment. Unlike the reference system of FIG. 12*a*, when the intensity of Channel 1 is modulated, the resonance wavelength does not shift and it can stay fixed 1310. The forward tail of Channel 1's Lorentzian curve 1320 does not overlap with the Lorentzian curve of Channel 2 1330, and therefore the optical modulation amplitude (OMA) of Channel 2 is not affected by an intensity modulation of Channel 1.

Figure 13B:
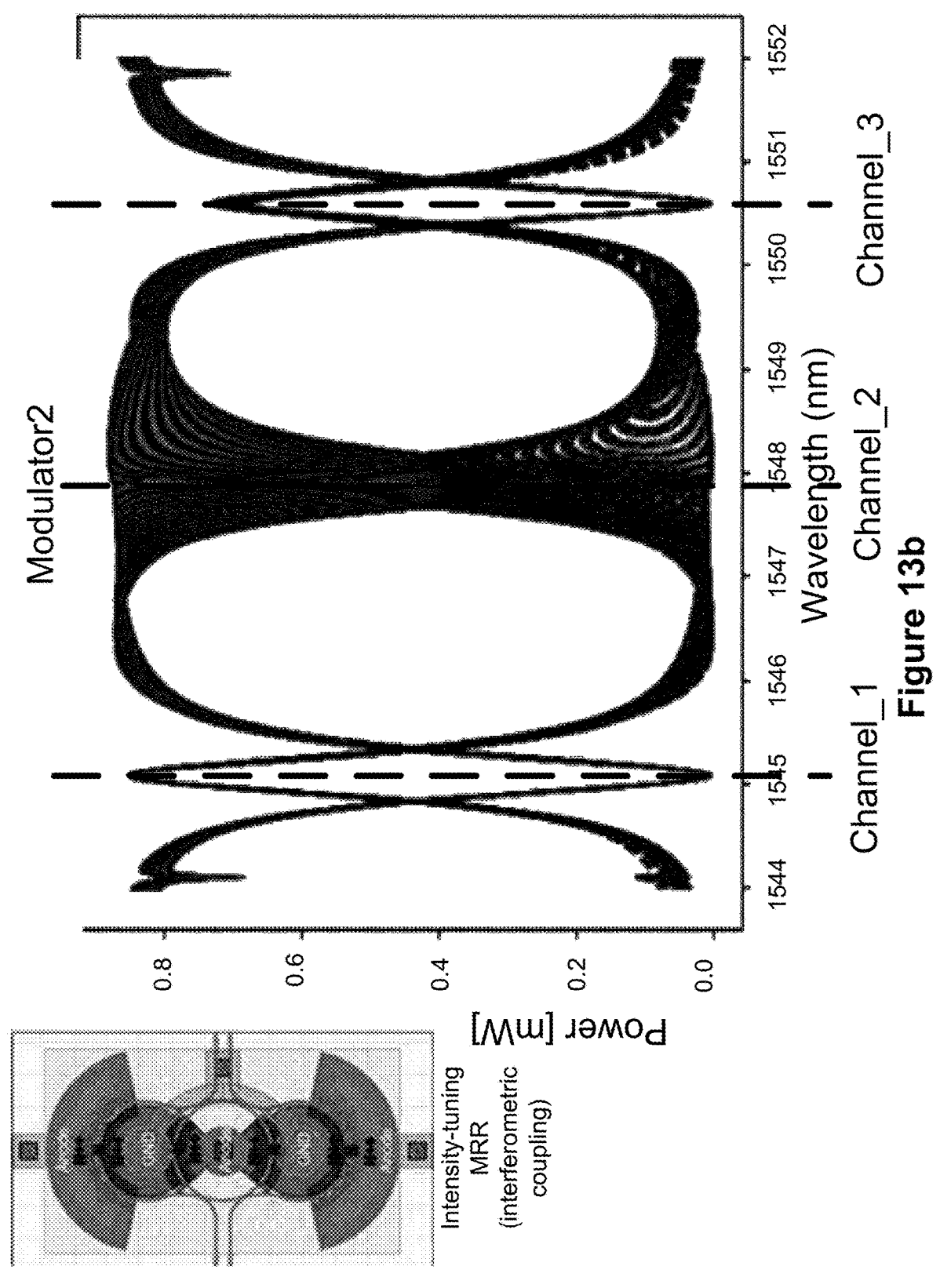
FIG. 13b is a spectral curve at the output of a simulated embodiment containing a cascade of three connected MRR's, and where modulation of Channel_2 does not influence the OMA of Channel_3.

FIG. 13*b* shows that an intensity modulation of Channel 2 does not affect Channel 3, similarly to a modulation of Channel 1 in FIG. 13*a*.

Figure 13C:
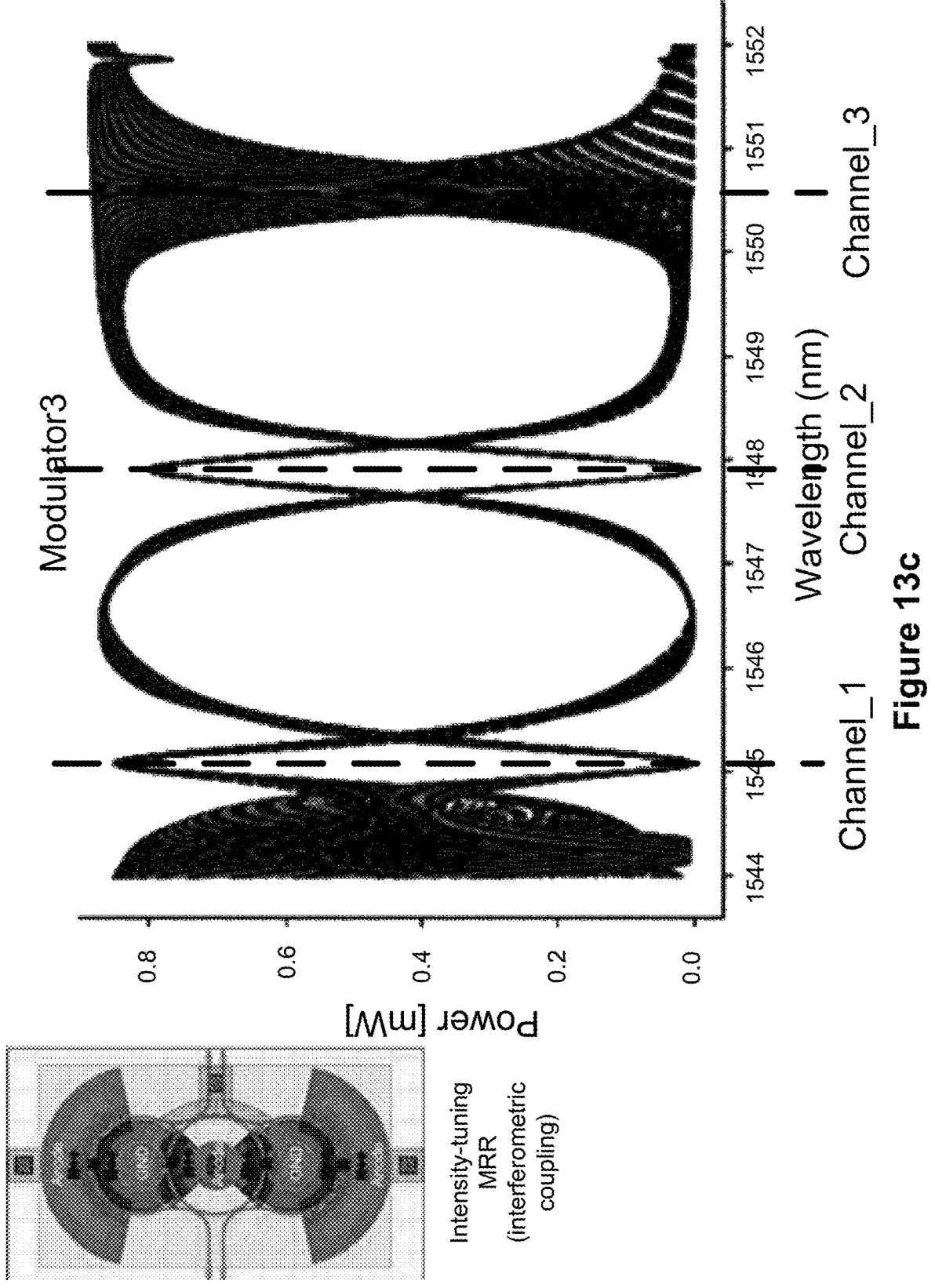
FIG. 13c is a spectral curve at the output of a simulated embodiment containing a cascade of three connected MRR's, and where modulation of Channel_3 does not influence the OMA of an adjacent channel.

FIG. 13*c* shows that an intensity modulation of Channel 3 does not affect other channels, similarly to a modulation of Channel 1 in FIG. 13*a* and of Channel 2 in FIG. 13*b*.

The lack of wavelength shifting is a significant advantage because it prevents a diminution of adjacent channels' OMA, i.e. little to no cross-talk is observed.

With a system using typical MRR modulators, because of the Lorentzian shape of a resonant peak, the tail of the peak from Channel 1 can influence the OMAs of peaks for Channel 2 and Channel 3. The greater the number of modulators cascaded in a row, the greater the cross-talk influence. However, by using interferometric coupling-based modulators according to embodiments, because the intensity modulation happens at a fixed wavelength, no cross-talk is observed. Therefore, the OMA for individual channels can remain unchanged.

By using coupling-based modulators according to embodiments, the common weight range can also be improved. Because each MRR in a cascade of MRR's has a different radius, not only the resonant wavelength of each one is different, but the transmission performance of each one is also different. Ideally, the modulation weight range of each MRR should be normalized to a common weight range. For normalization, the minimum weight swing among all modulators of a system can be selected as the system's common weight.

Because a first wavelength-tuned MRR modulator causes cross-talk issues, an adjacent MRR modulator will show a degenerated OMA, i.e. a shorter weight range, compared to the first one. By using modulators according to embodiments however, the minimum weight range does not shorten, because there is no wavelength shifting of the Lorentzian spectrum, i.e. no cross-talk issue. The weight range remains larger than with modulators where wavelength is shifted.

Cross-talk can be illustrated by comparing a cascade of two MRR modulators as they exist, with a cascade of two MRR modulators according to an embodiment.

Figure 14A:
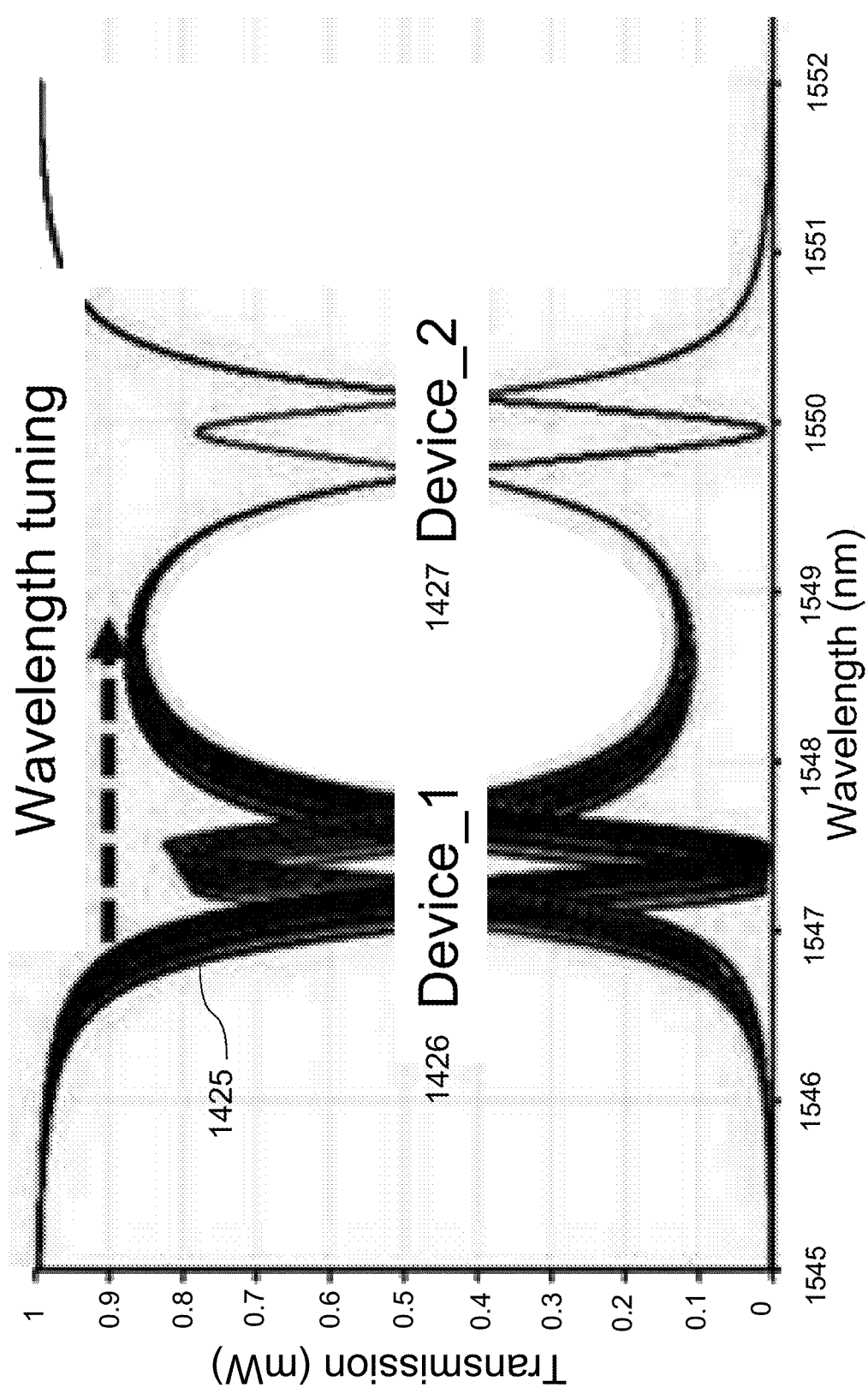
FIG. 14a is a series of overlapping transmission spectra for a cascade of two MRR modulators having two different diameters, and no coupler arms, where each spectrum corresponds to a different tuning voltage, according to prior art.

FIG. 14*a* shows a series of overlapping transmission spectra 1425 for a cascade of two MRR modulators having two different diameters, and no coupler arms, where each spectrum corresponds to a different tuning voltage, namely Device_1 1426 and Device_2 1427. As Device_1 1426 is tuned, its peak wavelength is shifted towards that of Device_2 1427.

Figure 14B:
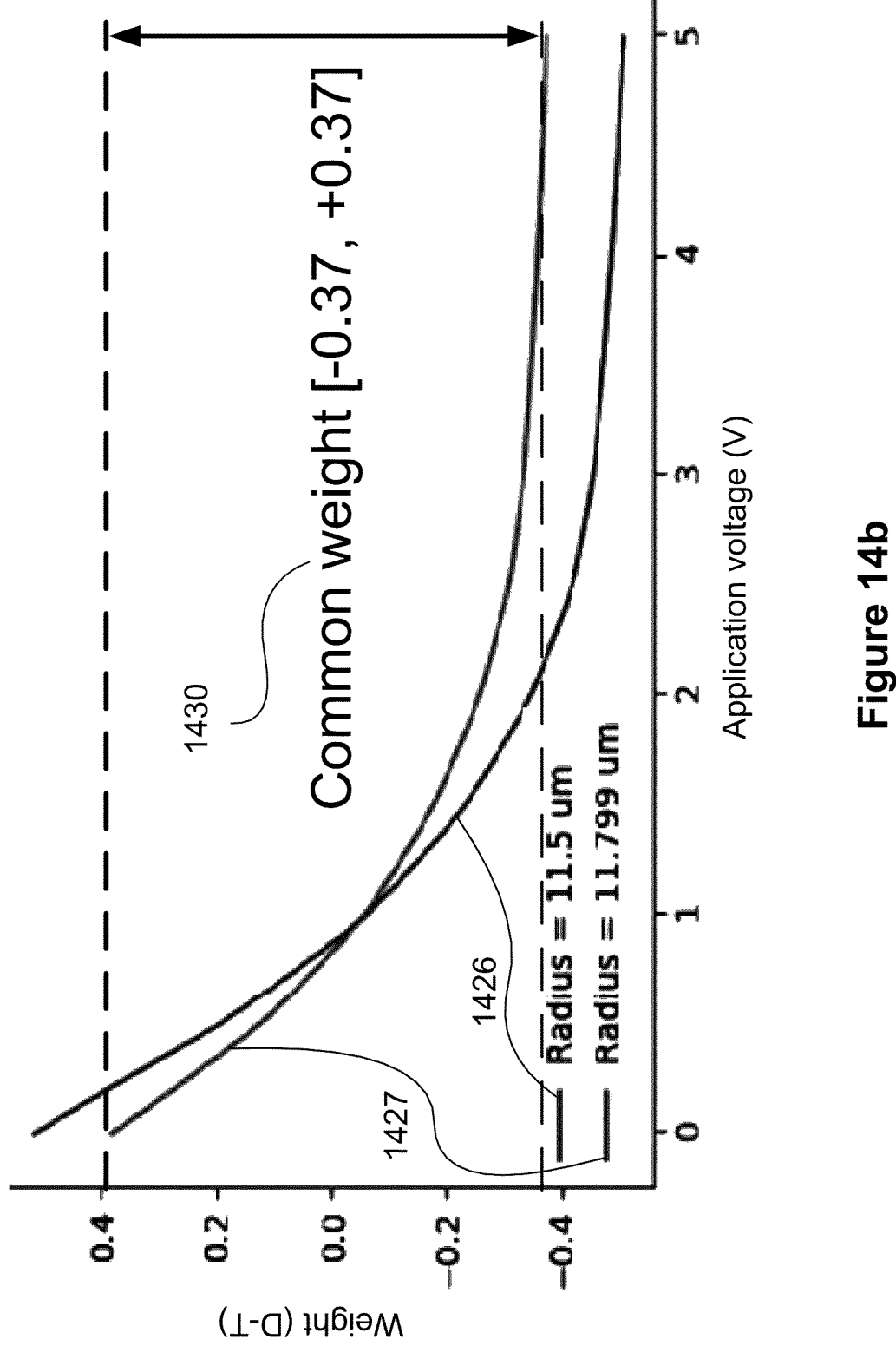
FIG. 14b shows two graphs showing the output weight (difference between a drop port transmission output and a through port transmission output) of a cascade of two MRR modulators having two different diameters, and no coupler arms, according to prior art.

FIG. 14*b* shows two graphs showing the output weight (difference between a drop port transmission output and a through port transmission output) of a cascade of two MRR modulators, Device_1 1426 and Device_2 1427, having two different radii, and no coupler arms. The wavelength tuning of Device_1 1426 causes the weight range of Device_2 1427 to be reduced, and the common weight to be ±0.37 1430.

Figure 14C:
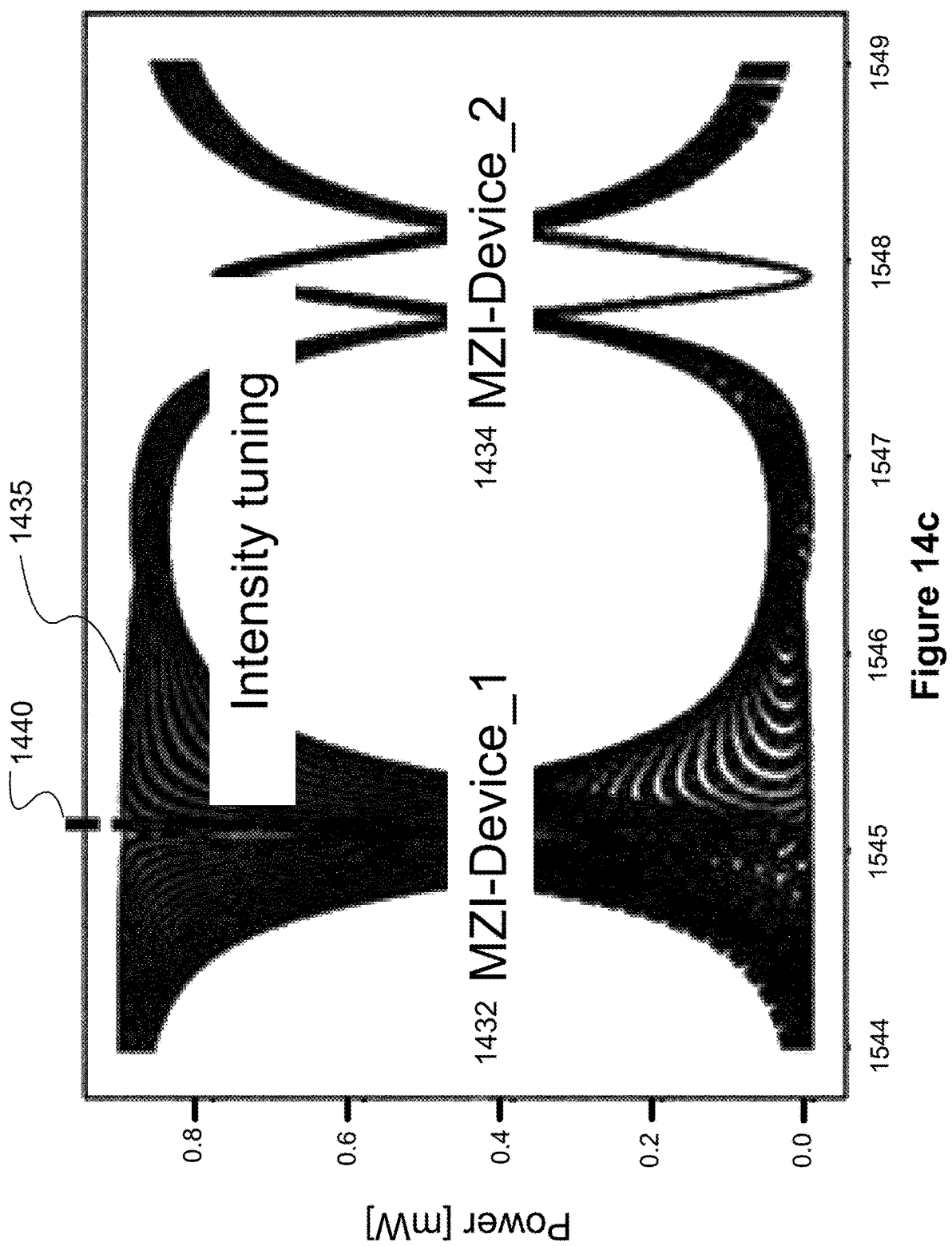
FIG. 14c is a series of overlapping transmission spectra for a cascade of two MRR modulators having two different diameters, each one having a pair of symmetrical coupler arms, where each spectrum corresponds to a different tuning voltage, according to an embodiment.

FIG. 14*c* shows a series of overlapping transmission spectra 1435 for two MRR modulators according to an embodiment, namely MZI-Device_1 1432 and MZI-Device_2 1434. In this case, the intensity in MZI-Device_1 1432 is tuned, but not its peak wavelength 1440, and because there is no wavelength shifting, there is no cross-talk, and therefore no effect on the weight range of adjacent MZI-Device_2 1434.

An interferometric MRR modulator according to an embodiment can show an enhanced weight range compared to a wavelength-tuned MRR, especially when multiple MRR modulators are cascaded. The enhanced weight range enables more channels in one free spectral range. A larger common weight range resulting from an embodiment can also provide a better signal-to-noise ratio when the resolution of its voltage driver is low.

Figure 14D:
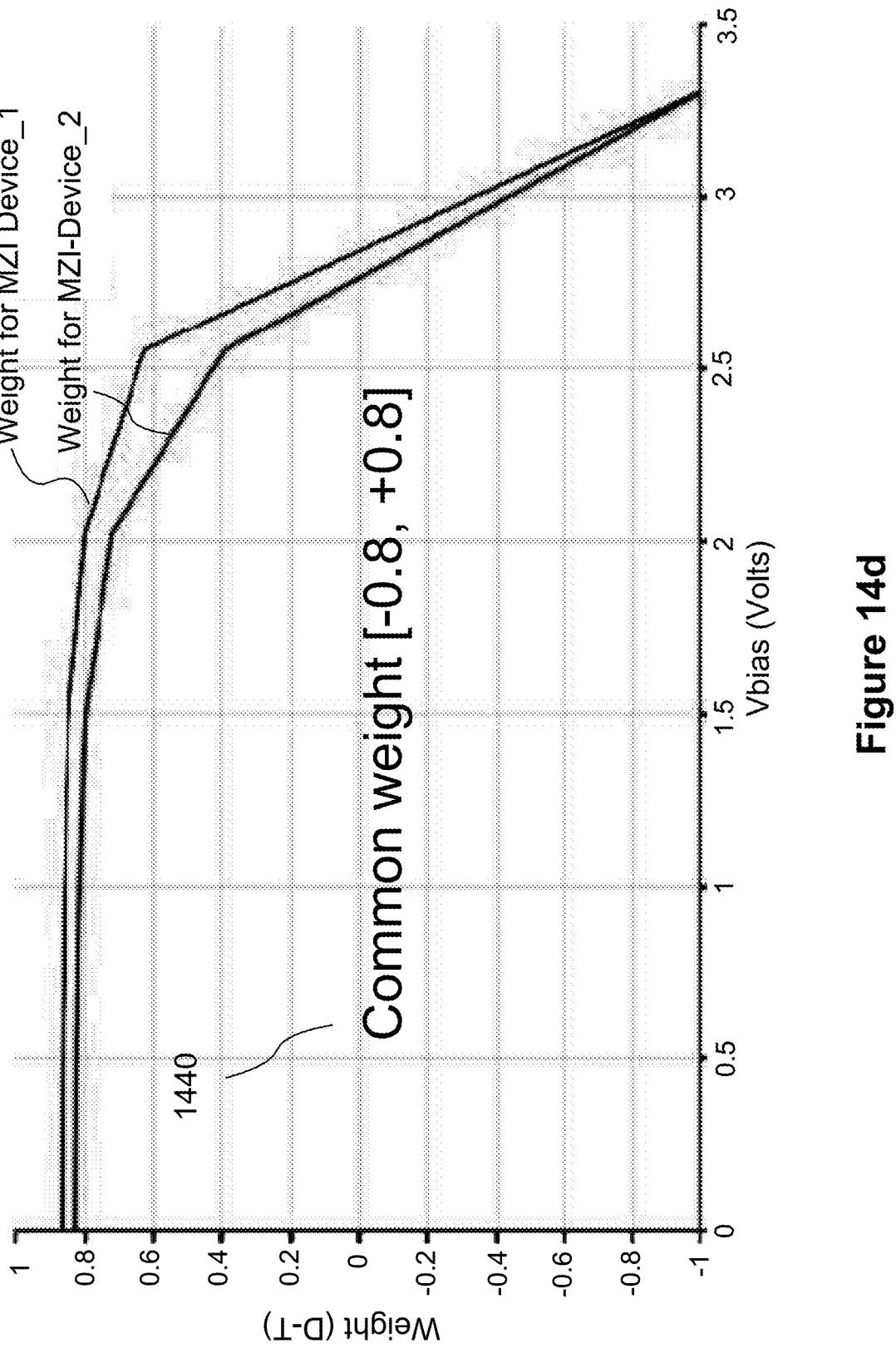
FIG. 14d shows two graphs showing the output weight (difference between a drop port transmission output and a through port transmission output) of a cascade of two MRR modulators having two different diameters, and each one having a pair of symmetrical coupler arms, according to an embodiment.

FIG. 14*d* shows two graphs of the output weight (difference between a drop port transmission output and a through port transmission output: W=D−T) of a cascade of two MZI-MRR modulators, MZI-Device_1 1432 and MZI-Device_2 1434, having two different diameters, and each one having a pair of symmetrical coupler arms. Because there is no cross-talk issue, both modulators show a similar weight range, which in this case is ±0.8 1440. When cascading two modulators in a row, the use of modulators according to embodiments allows the common weigh range to be twice that of a similar system using reference MRRs. This can result in a more robust system overall, because when the resolution of a MRR driver is low, a larger common weight range can provide a better signal-to-noise ratio (SNR).

With respect to FIG. 1*a*, FIG. 1*b*, FIG. 2*a*, FIG. 3, FIG. 4*a*, FIG. 5*a*, FIG. 5*b*, FIG. 5*c*, FIG. 5*d* and FIG. 5*e*, if any of the MRR modulators is a MRR modulator according to an embodiment, then the electro-optical circuit of the respective figure is also an embodiment.

Interferometric modulators with coupler arms according to embodiments can be used as part of a system to perform a matrix multiplication, and such a system is a further embodiment.

An embodiment can be a matrix multiplication system, built by connecting in series, and with an add-drop configuration, two interferometric modulators according to embodiments, and feeding the outputs into a balanced photodetector (BPD). The photocurrent generated by the BPD can represent the dot product of input matrices represented by input light signals and input modulations to the interferometric MRRs according to embodiments.

In an embodiment performing the dot product of two matrices, each matrix is first vectorized and the vectors are normalized. The components of the first matrix can be mapped to the weight range of a first MRR modulator, and the components of the second matrix can be mapped to the weight range of a second MRR modulator. Then, each vector component can be converted to a bias voltage that can be applied to one of the MRR modulators. Each weighted modulation of an input signal realizes a multiplication of two components of the dot product, and the BPD realizes the summation of the dot product.

Returning to FIG. 5a, it illustrates an electro-optical circuit able to perform a dot product of matrices. If the MRR modulators for a first vector component 520, a second vector component 530, or for both vector components are MRR modulators according to an embodiment, then the electro-optical circuit of FIG. 5a is also an embodiment.

With respect to FIG. 5e, it is a diagram showing how MRR modulators can be integrated into a convolutional neural network performing a matrix multiplication. If the MRR modulators are MRR modulators according to an embodiment, then the electro-optical circuit of FIG. 5e is also an embodiment.

To monitor the accuracy of a dot product calculated with an embodiment, a lookup table representing all output dot products from the BPD can be used as a reference.

The optical processing performance of a matrix multiplication system according to embodiments can be compared with the optical processing performance of a reference system. When compared to a reference MRR modulator dot product, a matrix multiplication (MM) according to embodiments using a driver resolution of 7-bit, shows improved calculation accuracy and mean squared error (MSE), especially with larger input matrix size or input range. This indicates that embodiments are better suited than typical wavelength-tuning modulators for building up large-scale optical processors.

Figure 15A:
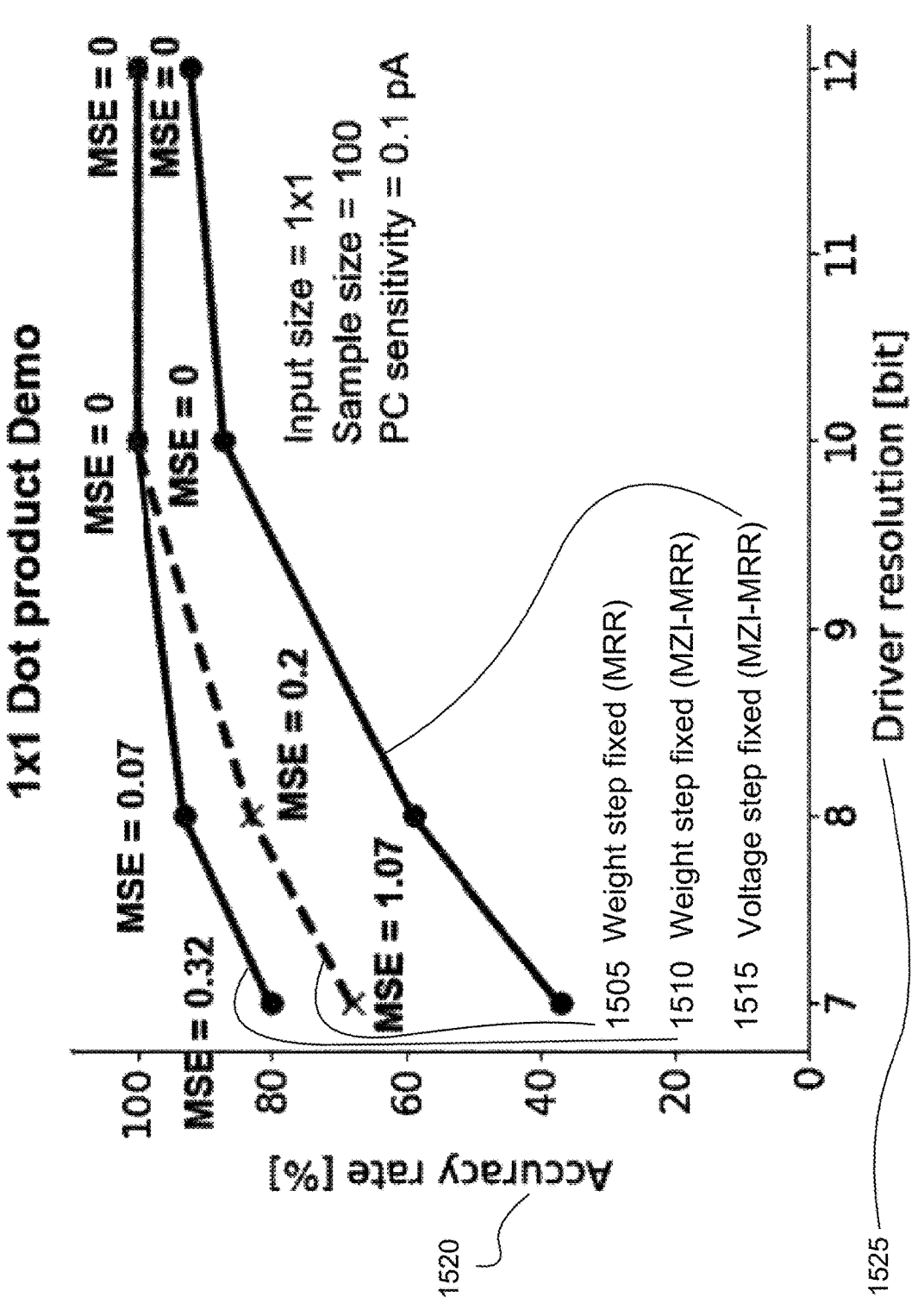
FIG. 15a is a graph showing the accuracy rate of a dot product calculation performed with embodiment and reference simulations, as functions of the modulating driver's bit resolution.

FIG. 15a shows the simulation results of a two-component multiplication for a MRR system 1505, a MZI-MRR system according to an embodiment where the weight step is fixed 1510, and a MZI-MRR system according to an embodiment where the voltage step is fixed 1515. The result accuracy rate 1520 is presented as a function of driver resolution 1525, with a mean squared error (MSE). It can be seen that the accuracy rate increases with driver resolution, and the best result is obtained with the MZI-MRR system according to an embodiment where the weight step is fixed 1510.

Figure 15B:
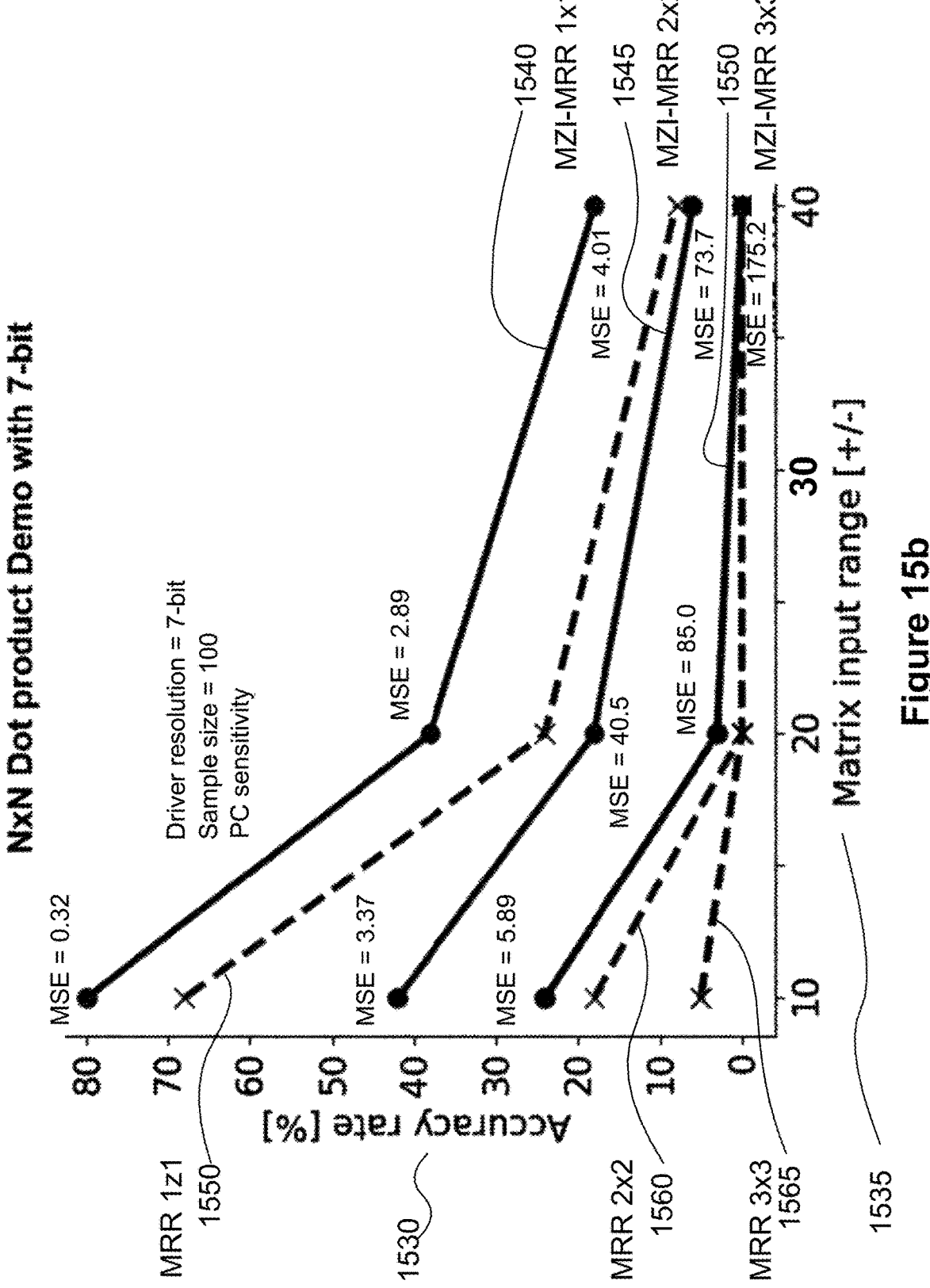
FIG. 15b is a graph showing the accuracy rate of matrix product calculations performed with embodiment and reference simulations, as functions of a matrix's input range.

FIG. 15b shows the results of a matrix multiplication simulation with a 7-bit resolution, as compared to those of a lookup table. The graph shows that the accuracy rate of a calculation 1530 is improved when the matrix input range 1535 is smaller, and is better than a conventional MRR system in all cases. For example, results for the MZI-MRR 1×1 1540 case, the MZI-MRR 2×3 1545 case and the MZI-MRR 3×3 1550 case, are correspondingly better than results for the MRR 1×1 1555 case, the MRR 2×2 1560 case, and the MRR 3×3 1565 case.

A technical benefit of embodiments is that they prevent cross-talk issues. Due to the embodiments' ability to maintain a fixed wavelength while signal intensity is modulated, the optical cross-talk between channels, caused by wavelength drifting is absent. When multiple modulators are cascaded and operated at the same time, the lack of optical cross-talk can facilitate all the modulators performing at or near their full OMA without influencing each other, or with limited influence.

Another technical benefit of embodiments is that they provide a larger common weight range, compared to typical modulators based on a wavelength-tuning scheme, meaning they have a greater tolerance for the driver's resolution and system noise, making them more robust overall. For large systems and artificial neural networks (ANN) especially, this can be critical.

Figure 16A:
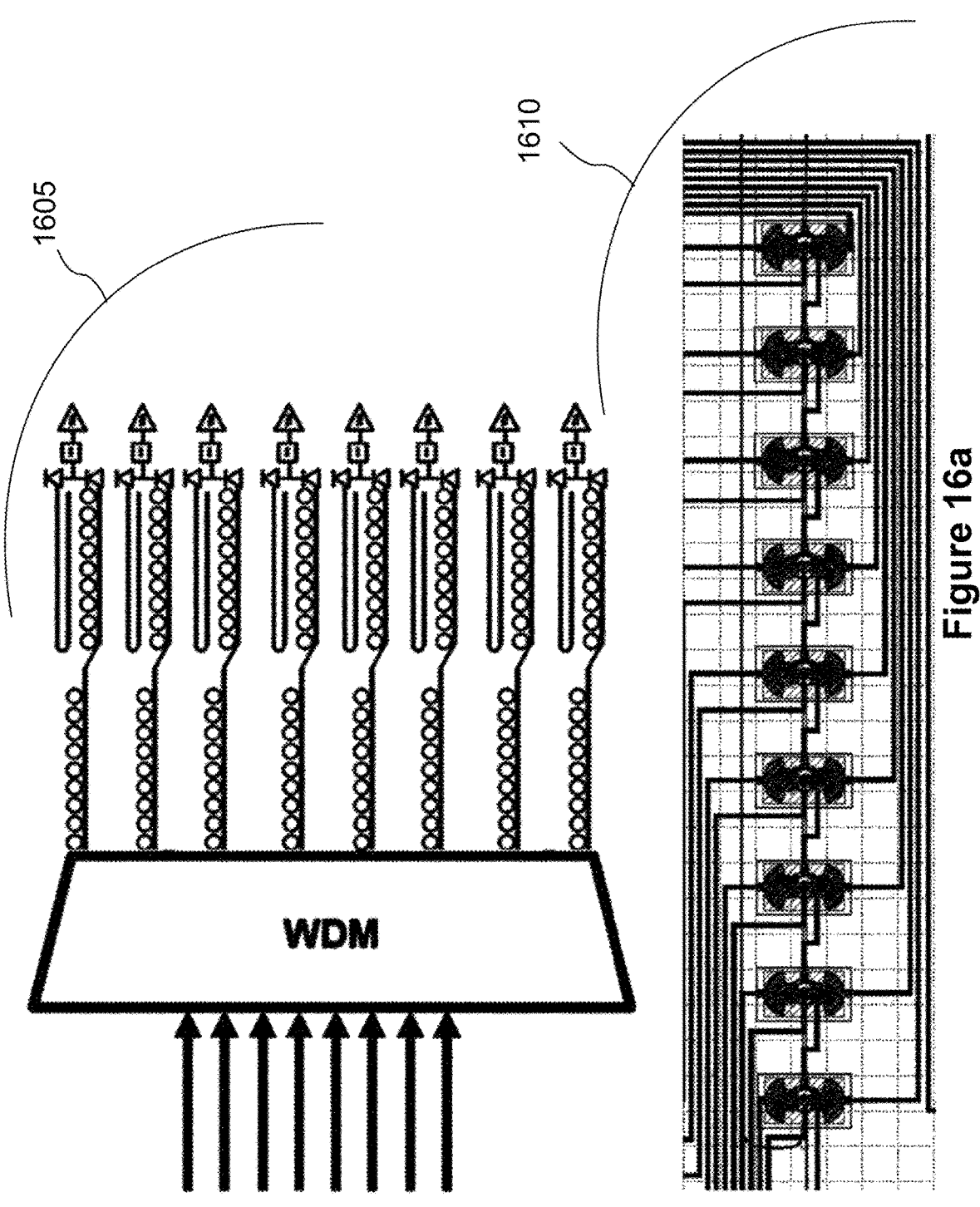
FIG. 16a illustrates a convolutional neural network that can be built using MRR modulators, according to an embodiment.

FIG. 16a illustrates how a convolutional neural networks, similar to that of FIG. 5e, with cascades of nine MRRs 1605 instead of four. Each cascade can be connected to tuning circuitry 1610. With similar assemblies, weight banks for larger-scale neural network can be realized. The reduced cross-talk and improved weight range can allow MRR modulators according to embodiments to be preferred for such large-scale systems.

Figure 16B:
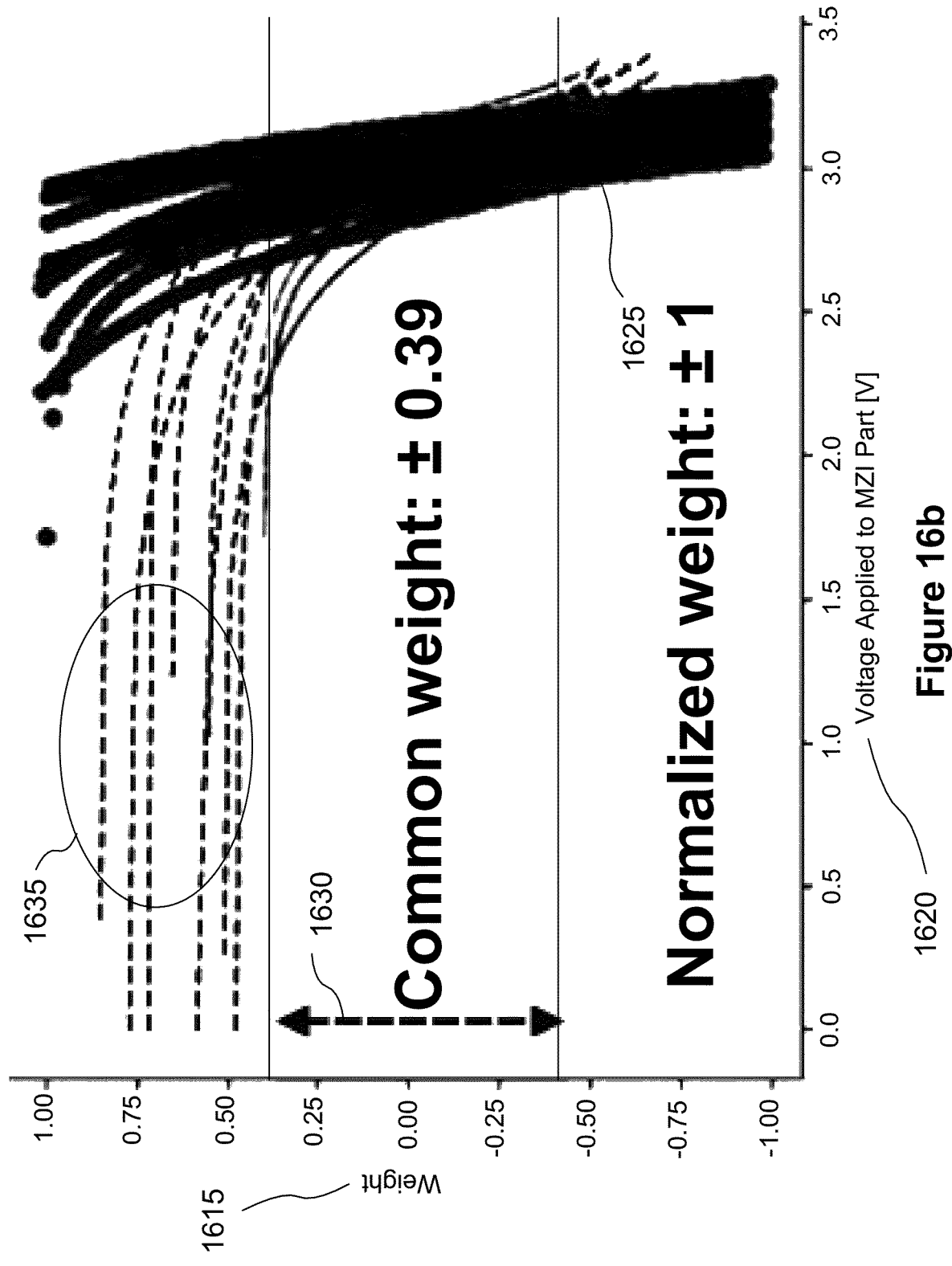
FIG. 16b is a graph showing the common and normalized weights for nine cascaded MRR modulators, according to an embodiment.

FIG. 16b is a graph presenting the weights 1615 of an 8-channel, 9×9 kernel system, as a function of the voltage 1620 applied to each coupler arm of an MRR modulator according to an embodiment. The graph is shown normalized 1625, but the range of common weights 1630 for original weights 1635 is also shown.

Figure 16C:
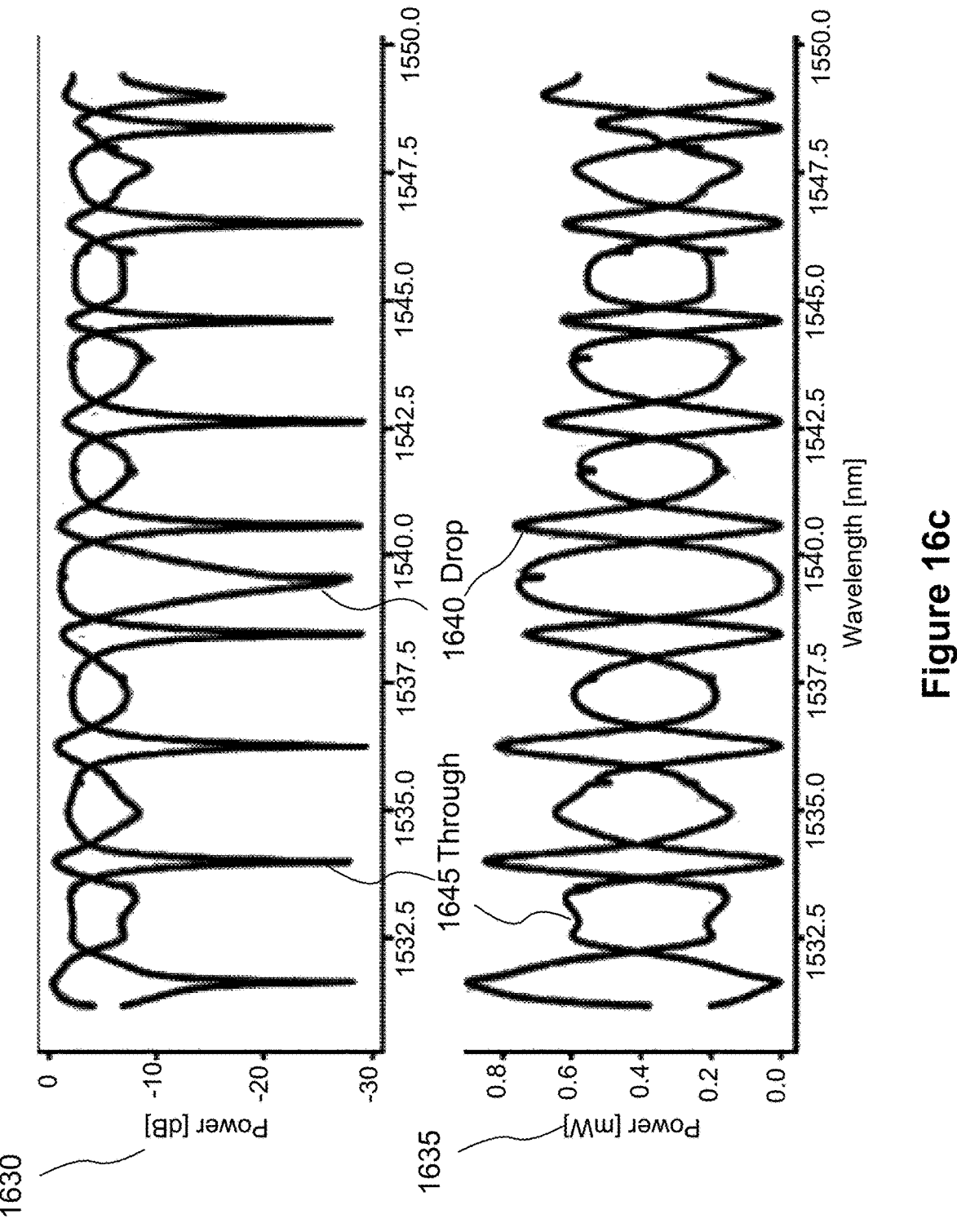
FIG. 16c includes transmission graphs for the drop port and through port of a cascade of nine MRR modulators according to an embodiment, in both decibels and milliwatts.

FIG. 16c shows a same transmission graph presented in two different power units, one in decibels (dB) 1630 and one in milliwatts (mW) 1635, each one with transmission graph for the drop port 1640 and the through port 1645 of a 9-unit cascade of MZI-MRR modulators according to an embodiment. It can be noted that as the power is modulated, the wavelength peaks remain in their original position, and there is consequently no cross-talk.

Embodiments include a signal modulator that can tune the signal intensity without changing its wavelength. By introducing a two-site interferometric coupler to a MRR modulator, the coupling strength at the sites can be adjusted by biasing a control element in the coupler, resulting in a modified MRR transmission at the resonant wavelength. However, to compensate any unwanted wavelength shifting, a second control element is added to the MRR part. The second control element can be used to lock the wavelength.

Embodiments include an MRR modulator having two interferometric couplers, each one having two sites of interface, and each one positioned symmetrically to the other side of an MRR. To utilize an embodiment as part of a weight bank in a "broadcast-and-weight" protocol, a balanced weight range is required, each weight being function of a bias voltage that has a low insertion loss in the modulator. Embodiments introduce symmetric interferometric couplers for building an add-drop modulator. Due to symmetric interferometric coupler arms having equal propagation loss and coupling loss, the insertion loss at the drop port is minimized, thus enabling a large weight range balanced at 0, because the weight is the difference between the output power at the drop port and the output power at the through port (W=D−T).

Embodiments include an MRR modulator having two interferometric couplers, each of which is PN junction based coupler having a spiral shape. In order to enhance the electro-optical modulation efficiency of the PN junction in embodiments, a longer coupling arm is implemented, which not only improves the tuning efficiency but also maintains an electro-optical speed on the order of tens of gigahertz (GHz). Furthermore, the long coupling arm can be formed in a spiral with the p- and n-doping regions parallel to the coupler's silicon waveguide core. This geometry can reduce their footprint and can also allow the implementation of electrical control for travelling-waves. A travelling wave electrode may be employed for PN junction based control elements. Modulation efficiency can depend on the doping concentration of the PN junction of the control element or, alternatively, on the distance between the waveguide being modulated and the thermal heater control element. Coupling can depend on the refractive index variation in the waveguide adjacent to the control element.

Embodiments of the present invention include a controller. The controller can be an electronic or electro-optic circuit. The controller can include an integrated circuit such as a microprocessor, microcontroller, FPGA, ASIC, or the like, or a combination thereof. The controller can be implemented as a hardware-only circuit, or as a combination of hardware and software or firmware. The controller can include analog-to-digital converters, digital-to-analog converters, amplifiers, comparators, clock circuits, logic circuits, and various other digital circuitry, analog circuitry, or a combination thereof, as would be readily understood by a worker skilled in the art. The controller may be configured in part to respond to an input signal by generating output signals for controlling two or more control elements in a complementary manner, as described elsewhere herein. The control signals can be generated based on a pre-configuration operation such as a lookup table or other rule. The control signals can be generated based at least in part on feedback. For example, wavelength shift can be monitored and compensated for by the controller. The control signals can be generated based on prior calibration procedures.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A photonic device comprising:
a ring waveguide;
a first waveguide coupled to the ring waveguide at a first site and a second site,
the first waveguide having:
a first section extending from the first site;
a second section extending from the second site; and
a first middle section located between the first section and the second section and extending between the first site and the second site, the first middle section being further from the ring waveguide than the first site and the second site;
a second waveguide coupled at to the ring waveguide at a third site and a fourth site, the second waveguide having:
a third section extending from the third site;
a fourth section extending from the fourth site; and
a second middle section located between the third section and the fourth section and extending between the third site and the fourth site, the second middle section being further from the ring waveguide than the third site and the fourth site;
a first control element operatively coupled to the first middle section;
a second element control operatively coupled to the second middle section; and
a further control element operatively coupled to the ring waveguide; and
a controller configured to operate the first control element and the second control element to adjust an extinction ratio of the photonic device at a resonant wavelength, and to simultaneously operate the further control element to counteract a shift in the resonant wavelength induced by the operation of the first control element and of the second control element, thereby maintaining the resonant wavelength at a substantially constant value during said adjustment of the extinction ratio.

2. The photonic device of claim 1, wherein one or more of the first control element, the second control element and the further control element are electrically controllable in-resonator photoconductive heaters (IRPHs).

3. The photonic device of claim 1, wherein one or more of the first control element, the second control element and the further control element are electrically controllable PN junction carrier density control elements.

4. The photonic device of claim 1, wherein the first middle section and the first control element interface along an extended portion of the first middle section having a length, said length being configured to provide for a coupling efficiency of the first control element, which is sufficient to control an amount of optical power coupled from the first waveguide to the ring waveguide between a minimum value and a maximum value, the minimum value being substantially zero and the maximum value being substantially equal to all of optical power input to the photonic device.

5. The photonic device of claim 1, wherein the first middle section is shaped to have a compact footprint at least in part by incorporating at least two opposing bends.

6. The photonic device of claim 1, wherein at least part of the first middle section is spiral-shaped.

7. The photonic device of claim 1, wherein one or more of the first control element, the second control element, and the further control element comprise a travelling wave electrode.

8. The photonic device of claim 1, wherein the first middle section and the first control element interface along an extended portion of the first middle section, and wherein the first middle section, including the extended portion, has a length which is at least 20 times a length of the ring waveguide.

9. The photonic device of claim 1, wherein a first portion of the photonic device comprising the first waveguide and a first half of the ring waveguide is symmetrical with a second portion of the photonic device comprising the second waveguide and a second half of the ring waveguide.

10. A photonic device comprising:
a ring waveguide;
a first waveguide coupled to the ring waveguide at a first site and a second site, the first waveguide having:
a first section extending from the first site;
a second section extending from the second site; and
a first middle section located between the first section and the second section and extending between the first site and the second site, the first middle section being further from the ring waveguide than the first site and the second site;
a first control element operatively coupled to the first middle section;
a further control element operatively coupled to the ring waveguide; and
a controller configured to operate the first control element to adjust an extinction ratio of the photonic device at a resonant wavelength, and to simultaneously operate the further control element to counteract a shift in the resonant wavelength induced by the operation of the first control element, thereby maintaining the resonant wavelength at a substantially constant value during said adjustment of the extinction ratio,
wherein the first middle section and the first control element interface along an extended portion of the first middle section having a length, said length being configured to provide for a coupling efficiency, of the first control element, which is sufficient to control an amount of optical power coupled from the first waveguide to the ring waveguide between a minimum value and a maximum value, the minimum value being substantially zero and the maximum value being substantially equal to all of optical power input to the photonic device.

11. The photonic device of claim 10, wherein one or more of the first control element and the further control element are electrically controllable PN junction carrier density control elements.

12. The photonic device of claim 10, wherein the first middle section is shaped to have a compact footprint at least in part by incorporating at least two opposing bends.

13. The photonic device of claim 10, wherein at least part of the first middle section is spiral-shaped.

14. The photonic device of claim 10, wherein one or both of the first control element and the further control element comprise a travelling wave electrode.

15. A photonic device comprising:
a ring waveguide;
a first waveguide coupled to the ring waveguide at a first site and a second site, the first waveguide having:
a first section extending from the first site;
a second section extending from the second site; and
a middle section located between the first section and the second section and extending between the first site and the second site, the middle section being further from the ring waveguide than the first site and the second site;
a first control element operatively coupled to the middle section;
a further control element operatively coupled to the ring waveguide; and
a controller configured to operate the first control element to adjust an extinction ratio applied by the photonic device at a resonant wavelength of the photonic device, and to simultaneously operate the further control element to counteract a shift in the resonant wavelength induced by the operation of the first control element, thereby maintaining the resonant wavelength at a substantially constant value during said adjustment of the extinction ratio.

16. The photonic device of claim 15, wherein the middle section is a first middle section, the device further comprising:
a second waveguide coupled at to the ring waveguide at a third site and a fourth site, the second waveguide having:
a third section extending from the third site;
a fourth section extending from the fourth site; and
a second middle section located between the third section and the fourth section and extending between the third site and the fourth site, the second middle section being further from the ring than the third site and the fourth site; and
a second control element operatively coupled to the second middle section, the controller being further configured to operate the second control element to adjust a second extinction ratio of the photonic device at the resonant wavelength, and to simultaneously operate the further control element to counteract a corresponding shift in the resonant wavelength induced by the operation of the second control element.

17. The photonic device of claim 15, wherein one or both of the first control element and the further control element are electrically controllable in-resonator photoconductive heaters (IRPHs).

18. The photonic device of claim 15, wherein one or both of the first control element and the further control elements are electrically controllable PN junction carrier density control elements.

\* \* \* \* \*